(12) United States Patent
Hirose et al.

(10) Patent No.: US 10,553,855 B2
(45) Date of Patent: Feb. 4, 2020

(54) METHOD FOR FORMING ANODE HAVING SILICON ACTIVE MATERIAL LINKED TO CURRENT COLLECTOR

(71) Applicant: Murata Manufacturing Co., Ltd., Kyoto (JP)

(72) Inventors: Takakazu Hirose, Tokyo (JP); Kenichi Kawase, Fukushima (JP); Kazunori Noguchi, Fukushima (JP); Takayuki Fujii, Fukushima (JP); Rikako Imoto, Fukushima (JP)

(73) Assignee: MURATA MANUFACTURING CO., LTD, Kyoto (JP)

( * ) Notice: Subject to any disclaimer, the term of this patent is extended or adjusted under 35 U.S.C. 154(b) by 0 days.

(21) Appl. No.: 15/638,451

(22) Filed: Jun. 30, 2017

(65) Prior Publication Data

US 2017/0301911 A1 Oct. 19, 2017

Related U.S. Application Data

(63) Continuation of application No. 12/491,624, filed on Jun. 25, 2009, now abandoned, which is a (Continued)

(30) Foreign Application Priority Data

Apr. 8, 2008 (JP) ................. 2008-100185

(51) Int. Cl.
*H01M 4/134* (2010.01)
*H01M 4/70* (2006.01)
(Continued)

(52) U.S. Cl.
CPC ............. *H01M 4/134* (2013.01); *H01M 4/70* (2013.01); *H01M 10/0568* (2013.01); *H01M 10/0569* (2013.01)

(58) Field of Classification Search
CPC .... H01M 4/70; H01M 4/134; H01M 10/0568; H01M 10/0569
(Continued)

(56) References Cited

U.S. PATENT DOCUMENTS 7,195,842 B1 3/2007 Fujimoto et al.
2004/0023111 A1 2/2004 Ohshita et al.
(Continued)

FOREIGN PATENT DOCUMENTS

CN 1610171 4/2005
CN 1763993 4/2006
(Continued)

OTHER PUBLICATIONS

Japanese Office Action dated Feb. 5, 2013, issued in connection with counterpart Japanese Patent Application No. 2008-100185.
(Continued)

*Primary Examiner* — Sean P Cullen
(74) *Attorney, Agent, or Firm* — Dentons US LLP

(57) ABSTRACT

A secondary battery capable of improving the cycle characteristics and the initial charge and discharge characteristics is provided. The secondary battery includes a cathode, an anode, and an electrolytic solution. The anode has an anode active material layer on an anode current collector. The anode active material layer contains a crystalline anode active material having silicon as an element, and is linked to the anode current collector.

13 Claims, 16 Drawing Sheets

Related U.S. Application Data continuation-in-part of application No. 12/419,684, filed on Apr. 7, 2009, now abandoned.

(51) Int. Cl.
  *H01M 10/0568* (2010.01)
  *H01M 10/0569* (2010.01)

(58) Field of Classification Search
  USPC .............................................. 429/218.1, 330
  See application file for complete search history.

(56) References Cited

U.S. PATENT DOCUMENTS

| | | | |
|---|---|---|---|
| 2004/0043294 | A1 | 3/2004 | Fukui et al. |
| 2005/0048369 | A1* | 3/2005 | Koshina ............. H01M 4/0421 429/218.1 |
| 2005/0079421 | A1 | 4/2005 | Konishiike et al. |
| 2005/0095503 | A1 | 5/2005 | Adachi et al. |
| 2005/0214646 | A1 | 9/2005 | Kubota |
| 2005/0233066 | A1 | 10/2005 | Sunagawa et al. |
| 2006/0040182 | A1* | 2/2006 | Kawakami ............ H01M 10/052 429/218.1 |
| 2006/0083987 | A1 | 4/2006 | Konishiike et al. |
| 2006/0102473 | A1 | 5/2006 | Bito et al. |
| 2007/0122701 | A1 | 5/2007 | Yamaguchi |
| 2007/0207386 | A1 | 9/2007 | Konishiike et al. |
| 2008/0020281 | A1 | 1/2008 | Kogetsu et al. |
| 2008/0076031 | A1 | 3/2008 | Yamaguchi et al. |
| 2008/0176132 | A1 | 7/2008 | Hirose et al. |
| 2009/0311608 | A1* | 12/2009 | Hirose ................. H01M 4/134 429/331 |

FOREIGN PATENT DOCUMENTS

| | | |
|---|---|---|
| CN | 1895999 | 1/2007 |
| EP | 1939971 | 7/2008 |
| JP | 2002-083594 | 3/2002 |
| JP | 2003-7295 | 1/2003 |
| JP | 2003-007295 | 1/2003 |
| JP | 2004-319390 | 11/2004 |
| JP | 2005-085633 | 3/2005 |
| JP | 2005-235734 | 9/2005 |
| JP | 2005-310502 | 11/2005 |
| JP | 2006-114454 | 4/2006 |
| JP | 2006-155957 | 6/2006 |
| JP | 2006-155958 | 6/2006 |
| JP | 2007-134272 | 5/2007 |
| JP | 2007-141666 | 6/2007 |
| JP | 2007-188871 | 7/2007 |
| JP | 2007-194207 | 8/2007 |
| JP | 2007-257868 | 10/2007 |
| JP | 2007-273184 | 10/2007 |
| JP | 2007-280665 | 10/2007 |
| JP | 2007-299764 | 11/2007 |
| WO | WO/2007/046327 | 4/2007 |
| WO | WO 2007044315 A1 | 4/2007 |

OTHER PUBLICATIONS

Chinese Office Action issued in connection with related Chinese Patent Application No. CN 2009-10134402.X dated Aug. 29, 2013.
Chinese Office Action issued in connection with related Chinese patent application No. 2009-10134402.X dated Feb. 19, 2014.

* cited by examiner

Fig 4A
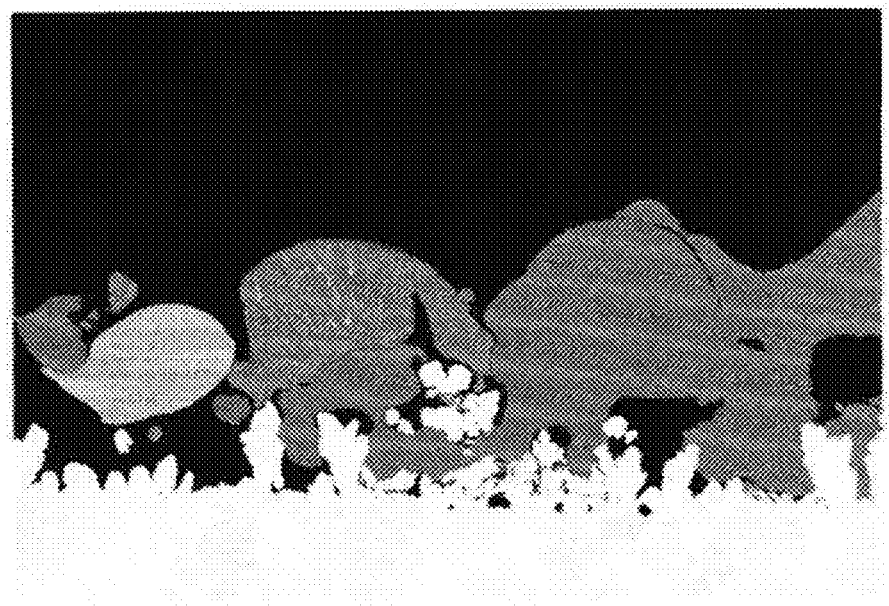
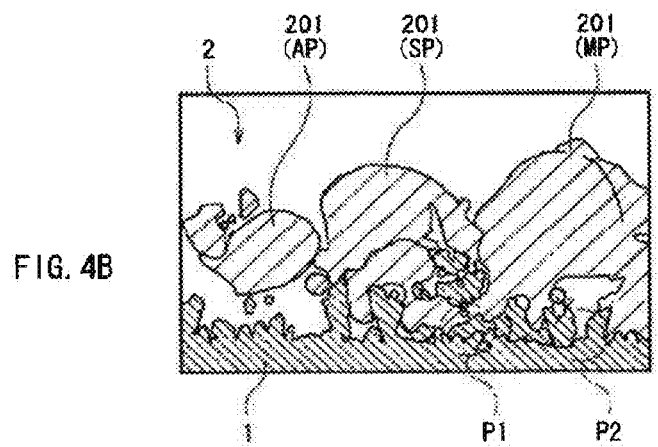
FIG. 4B

METHOD FOR FORMING ANODE HAVING SILICON ACTIVE MATERIAL LINKED TO CURRENT COLLECTOR

RELATED APPLICATION DATA

This application is a continuation of U.S. application Ser. No. 12/491,624, filed on Jun. 25, 2009, which is a continuation-in-part of U.S. application Ser. No. 12,419,684, filed on Apr. 7, 2009, now abandoned, which is fully incorporated herein for all purposed to the extent permitted by law. This application also claims priority under 35 U.S.C. Sec. 119 to Japanese Patent Application 2008-100185 filed in the Japanese Patent Office on Apr. 8, 2008, which is fully incorporated herein by reference to the extent permitted by law.

BACKGROUND OF THE INVENTION

The present invention relates to an anode having an anode active material layer on an anode current collector, and a secondary battery including the anode.

In recent years, portable electronic devices such as video cameras, mobile phones, and notebook personal computers have been widely used, and it is strongly demanded to reduce their size and weight and to achieve their long life. Accordingly, as an electric power source for the portable electronic devices, a battery, in particular a light-weight secondary battery capable of providing a high energy density has been developed.

Specially, a secondary battery using insertion and extraction of lithium for charge and discharge reaction (so-called lithium ion secondary battery) is extremely prospective, since such a secondary battery is able to provide a higher energy density than a lead battery and a nickel cadmium battery.

The lithium ion secondary battery includes a cathode, an anode, and an electrolytic solution. The anode has an anode active material layer on an anode current collector. The anode active material layer contains an anode active material contributing to charge and discharge reaction.

As the anode active material, a carbon material has been widely used. However, in recent years, as the high performance and the multi functions of the portable electronic devices are developed, further improvement of the battery capacity is demanded. Thus, it has been considered to use silicon instead of the carbon material. Since the theoretical capacity of silicon (4199 mAh/g) is significantly higher than the theoretical capacity of graphite (372 mAh/g), it is prospected that the battery capacity is thereby highly improved.

In the case where silicon is used as an anode active material, evaporation method is used as a method of forming an anode active material layer. In the evaporation method, the anode active material layer is linked to and united with an anode current collector, and thus the anode active material layer is less likely to expand and shrink in charge and discharge. However, in the case where silicon is deposited by using the evaporation method, there is concern that a silicon film becomes noncrystalline (amorphous). In the amorphous silicon film, the physical property is easily changed with time, and contact strength of the anode active material layer to the anode current collector is easily lowered by being affected by oxidation. Accordingly, the cycle characteristics, the charge and discharge characteristics and the like as important characteristics of the secondary battery may be lowered.

For using silicon as an anode active material, various technologies have been already proposed. Specifically, regarding a composition of an anode active material, a technique that an anode active material having silicon and a transition metal element as an element is used is known as described in, for example, Japanese Unexamined Patent Application Publication No. 2003-007295. Further, regarding a method of depositing an anode active material, a technique that particles primarily composed of silicon are not melted or evaporated but dispersed in air, and the surface of an anode current collector is sprayed with the dispersed particles, and thereby silicon is deposited is known as described in, for example, Japanese Unexamined Patent Application Publication No. 2005-310502. Furthermore, regarding a crystal state of an anode active material, for example, Japanese Unexamined Patent Application Publication No. 2002-083594 discloses a technique that amorphous or microcrystalline silicon is used and Japanese Unexamined Patent Application Publication No. 2007-194207 discloses a technique that crystalline (Raman shift is 490 $cm^{-1}$ to 500 $cm^{-1}$ and peak half-width is 10 $cm^{-1}$ to 30 $cm^{-1}$) silicon is used.

SUMMARY OF THE INVENTION

In these years, the high performance and the multi functions of the portable electronic devices are increasingly developed, and the electric power consumption tends to be increased. Accordingly, charge and discharge of the secondary battery are frequently repeated, and thus the cycle characteristics are easily lowered. Accordingly, further improvement of the cycle characteristics of the secondary battery has been aspired. In this case, to obtain superior cycle characteristics, it is also important to improve the initial charge and discharge characteristics.

In view of the foregoing, in the invention, it is desirable to provide an anode and a secondary battery capable of improving the cycle characteristics and the initial charge and discharge characteristics.

According to an embodiment of the invention, there is provided an anode including an anode active material layer on an anode current collector, in which the anode active material layer contains a crystalline anode active material having silicon as an element, and is linked to the anode current collector. Further according to an embodiment of the invention, there is provided a secondary battery including a cathode, an anode, and an electrolytic solution, in which the anode has the foregoing structure.

According to the anode of the embodiment of the invention, the anode active material layer contains the crystalline anode active material having silicon as an element, and is linked to the anode current collector. In this case, compared to a case that the anode active material is noncrystalline (amorphous) or a case that the anode active material layer is not linked to the anode current collector, the physical property of the anode active material is less likely to change with time, and the anode active material layer is less likely to expand and shrink in electrode reaction. Thus, according to the secondary battery using the anode of the embodiment of the invention, the cycle characteristics and the initial charge and discharge characteristics are able to be improved.

Other and further objects, features and advantages of the invention will appear more fully from the following description.

BRIEF DESCRIPTION OF THE DRAWINGS

FIGS. 4A and 4B are an SEM photograph illustrating a still another cross sectional structure of the anode illustrated in FIG. 1 and a schematic drawing thereof;

DETAILED DESCRIPTION OF THE PRESENTLY PREFERRED EMBODIMENTS

An embodiment of the invention will be hereinafter described in detail with reference to the drawings.

Figure 1:
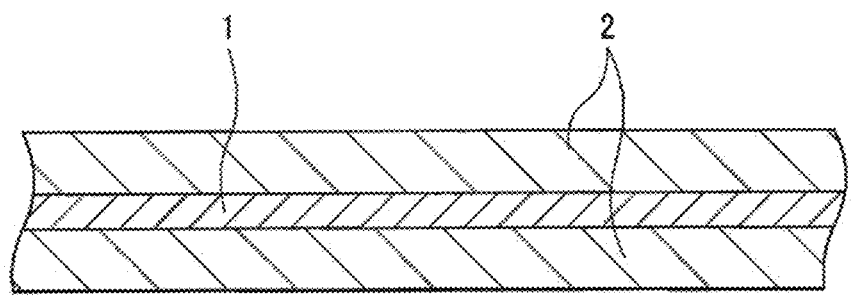
FIG. 1 is a cross sectional view illustrating a structure of an anode according to an embodiment of the invention.

FIG. 1 illustrates a cross sectional structure of an anode according to an embodiment of the invention. The anode is used, for example, for an electrochemical device such as a secondary battery. The anode has an anode current collector 1 having a pair of opposed faces and an anode active material layer 2 provided thereon.

The anode current collector 1 is preferably made of a metal material having favorable electrochemical stability, a favorable electric conductivity, and a favorable mechanical strength. As such a metal material, for example, copper, nickel, stainless and the like are included. Specially, copper is preferable, since thereby a high electric conductivity is obtainable.

In particular, the metal material preferably has, as an element, one or more metal elements not forming an intermetallic compound with an electrode reactant. In the case where the intermetallic compound is formed with the electrode reactant, there is a possibility that in operating an electrochemical device (for example, in charging and discharging a secondary battery), being influenced by a stress due to expansion and shrinkage of the anode active material layer 2, current collectivity may be lowered, or the anode active material layer 2 may be separated from the anode current collector 1. As such a metal element, for example, copper, nickel, titanium, iron, chromium and the like are included.

Further, the metal material preferably has one or more metal elements being alloyed with the anode active material layer 2. Thereby, adhesion between the anode current collector 1 and the anode active material layer 2 is improved, and thus the anode active material layer 2 is less likely to separate from the anode current collector 1. As a metal element that does not form the intermetallic compound with the electrode reactant and that is alloyed with the anode active material layer 2, for example, in the case where the anode active material layer 2 contains silicon as an anode active material, copper, nickel, iron and the like are included. These metal elements are preferable in terms of strength and electric conductivity as well.

The anode current collector 1 may have a single layer structure or a multilayer structure. In the case where the anode current collector 1 has the multilayer structure, for example, it is preferable that the layer adjacent to the anode active material layer 2 is made of a metal material being alloyed with the anode active material layer 2, and layers not adjacent to the anode active material layer 2 are made of other metal material.

The surface of the anode current collector 1 is preferably roughened. Thereby, due to the so-called anchor effect, the adhesion between the anode current collector 1 and the anode active material layer 2 is improved. In this case, it is enough that at least the surface of the anode current collector 1 opposed to the anode active material layer 2 is roughened. As a roughening method, for example, a method of forming fine particles by electrolytic treatment and the like are included. The electrolytic treatment is a method of providing concavity and convexity by forming the fine particles on the surface of the anode current collector 1 by electrolytic method in an electrolytic bath. A copper foil formed by using the electrolytic method is generally called "electrolytic copper foil." As other roughening method, for example, a method in which a rolled copper foil is sandblasted and the like are included.

Ten point height of roughness profile Rz of the surface of the anode current collector 1 is preferably 1.5 μm or more, and more preferably in the range from 1.5 μm to 40 μm, both inclusive, and much more preferably in the range from 3 μm to 30 μm, both inclusive. Thereby the adhesion between the anode current collector 1 and the anode active material layer 2 is further improved. More specifically, in the case where the ten point height of roughness profile Rz is smaller than 1.5 μm, there is a possibility that sufficient adhesion is not obtained. Meanwhile, in the case where the ten point height of roughness profile Rz is larger than 40 μm, the adhesion may decrease.

The anode active material layer 2 is formed, for example, by spraying method. Specifically, the anode active material layer 2 contains a crystalline anode active material, and is linked to the anode current collector 1. The foregoing expression, "is linked to the anode current collector 1" means an aspect that the crystalline anode active material is directly formed (deposited) on the anode current collector 1. Thus, the foregoing aspect excludes a case that the anode active material is indirectly linked to the anode current collector 1 with other material (for example, an anode binder or the like) in between as a result of using a method other than spraying method (for example, coating method, sintering method or the like), or a case that the anode active material is simply adjacent to the surface of the anode current collector 1. In the case where the anode active material layer 2 is linked to the anode current collector 1, the anode active material layer 2 is physically fixed on the anode current collector 1 and thus the anode active material layer 2 is less likely to expand and shrink in electrode reaction.

It is possible to check whether or not the anode active material is crystalline by, for example, X-ray diffraction. Specifically, in the case where a sharp peak is observed by X-ray diffraction, the anode active material has crystallinity.

It is enough that at least part of the anode active material layer 2 is linked to the anode current collector 1. Even if only part of the anode active material layer 2 is linked to the anode current collector 1, the contact strength of the anode active material layer 2 to the anode current collector 1 is improved compared to a case that the anode active material layer 2 is not linked to the anode current collector 1. If part of the anode active material layer 2 is linked to the anode current collector 1, the anode active material layer 2 has a portion being contacted with the anode current collector 1 and a portion not being contacted with the anode current collector 1.

In the case where the anode active material layer 2 does not have the noncontact portion, the entire area of the anode active material layer 2 is contacted with the anode current collector 1 and thus the electron conductivity therebetween is improved. Meanwhile, in this case, in the case where the anode active material layer 2 is expanded and shrunk in electrode reaction, no escape (relaxation space) exists, and thus the anode current collector 1 may be deformed by being influenced by a stress in such expansion and shrinkage.

Meanwhile, in the case where the anode active material layer 2 has the noncontact portion, in the case where the anode active material layer 2 is expanded and shrunk in electrode reaction, an escape (relaxation space) exists, and thus the anode current collector 1 is less likely to be deformed by influence of a stress in the case of such expansion and shrinkage. Meanwhile, in this case, since there is the noncontact portion between the anode active material layer 2 and the anode current collector 1, the electron conductivity therebetween may be lowered.

The anode active material layer 2 is provided, for example, on both faces of the anode current collector 1. However, the anode active material layer 2 may be provided on only a single face of the anode current collector 1.

The anode active material layer 2 is preferably alloyed with at least part of the interface with the anode current collector 1. Thereby, the anode active material layer 2 is less likely to expand and shrink in electrode reaction and thus breakage of the anode active material layer 2 is prevented. Further, the electron conductivity between the anode current collector 1 and the anode active material layer 2 is thereby improved. "To be alloyed" includes not only a case that the element of the anode current collector 1 and the element of the anode active material layer 2 form a perfect alloy, but also a case that the elements of the anode current collector 1 and the anode active material layer 2 are mixed. In this case, at the interface thereof, the element of the anode current collector 1 may be diffused in the anode active material layer 2, or the element of the anode active material layer 2 may be diffused in the anode current collector 1, or both elements may be diffused therein each other.

The anode active material layer 2 may have a single layer structure by being formed through a single deposition step of the anode active material. Otherwise, the anode active material layer 2 may have a multilayer structure formed through a plurality of deposition steps. In this case, the anode active material layer 2 may include a portion having the multilayer structure in part. However, in the case where high heat is accompanied in the deposition step, to prevent thermal damage of the anode current collector 1, the anode active material layer 2 preferably has the multilayer structure. When the deposition step of the anode active material is divided into several steps, time that the anode current collector 1 is exposed at high heat is reduced compared to a case that the anode active material is deposited by a single deposition step.

The anode active material layer 2 preferably has a void therein. The void functions as an escape (relaxation space) in the case where the anode active material layer 2 is expanded and shrunk in electrode reaction, and thus the anode active material layer 2 is thereby less likely to expand and shrink.

The anode active material contains a material having silicon as an element as an anode material capable of inserting and extracting an electrode reactant, since such a material has high ability to insert and extract the electrode reactant and thus a high energy density is thereby obtainable. Such a material may be a simple substance, an alloy, or a compound of silicon, or may have one or more phases thereof at least in part. One thereof may be used singly, or a plurality thereof may be used by mixture.

"Alloys" in the invention include an alloy containing one or more metal elements and one or more metalloid elements, in addition to an alloy composed of two or more metal elements. It is needless to say that "alloys" in the invention may contain a nonmetallic element. The texture thereof includes a solid solution, a eutectic crystal (eutectic mixture), an intermetallic compound, and a texture in which two or more thereof coexist.

As the alloy of silicon, for example, an alloy containing at least one selected from the group consisting of tin (Sn), nickel, copper, iron, cobalt, manganese (Mn), zinc, indium (In), silver (Ag), titanium, germanium (Ge), bismuth (Bi), antimony (Sb), and chromium as an element other than silicon is included.

As the compound of silicon, for example, a compound having oxygen and carbon (C) as an element other than silicon is included. Further, the compound of silicon may contain one or more of the elements described for the alloy of silicon as an element other than silicon.

The anode active material is in a state of a plurality of particles. In this case, the particulate anode active material may be in any shape. Specially, at least part of the anode active material is preferably in the flat shape. "The flat shape" means that the anode active material is in the shape that the anode active material has the long axis in the direction along the surface of the anode current collector 1 and the short axis in the direction crossing the surface. Such a flat shape is characteristics observed in the shape of the anode active material in the case where the anode active material layer 2 is formed by using spraying method. If in forming the anode active material layer 2 by using spraying method, the melting temperature of the formation material is high, the particulate anode active material tends to be in the flat shape. In the case where the anode active material in a state of a plurality of particles is in the flat shape, each anode active material is overlapped on each other in the lateral direction and is easily contacted with each other (the number of contact points is increased). Thus, the electron conductivity in the anode active material layer 2 is increased.

The half-width (2θ) of the diffraction peak in (111) crystal plane of the anode active material obtained by X-ray diffraction is preferably 20 deg or less, and more preferably in the range from 0.6 deg to 20 deg, both inclusive. Thereby, the crystallinity of the anode active material is secured.

The crystallite size originated in the (111) crystal plane of the anode active material obtained by X-ray diffraction is preferably 10 nm or more, and more preferably in the range from 10 nm to 150 nm, both inclusive, and much more preferably in the range from 20 nm to 100 nm, both inclusive. Thereby, the crystallinity of the anode active material is secured, and diffusion characteristics of the electrode reactant (for example, lithium ion in a secondary battery) in electrode reaction are improved. More specifically, in the case where the crystallite size is smaller than 10 nm, the diffusion characteristics of the electrode reactant may be lowered. Meanwhile, in the case where the crystallite size is larger than 150 nm, in electrode reaction, expansion and shrinkage of the anode active material layer 2 are difficult to be prevented, and the anode active material may be broken.

The anode active material preferably has oxygen as an element, since thereby expansion and shrinkage of the anode active material layer 2 are prevented. In the anode active material layer 2, at least part of oxygen is preferably bonded to part of silicon. In this case, the bonding state may be in the form of silicon monoxide, silicon dioxide, or in the form of other metastable state.

The oxygen content in the anode active material is preferably in the range from 1.5 atomic % to 40 atomic %, both inclusive, since thereby higher effects are obtainable. More specifically, in the case where the oxygen content is smaller than 1.5 atomic %, there is a possibility that expansion and shrinkage of the anode active material layer 2 are not sufficiently prevented. Meanwhile, in the case where the oxygen content is larger than 40 atomic %, the resistance may be excessively increased. When the anode is used together with an electrolytic solution in an electrochemical device, the anode active material does not include a coat formed by decomposition reaction of the electrolytic solution and the like. That is, in the case where the oxygen content in the anode active material is calculated, oxygen in the coat described above is not included in the calculation.

The anode active material having oxygen may be formed by continuously introducing oxygen gas into a chamber in depositing the anode material. In particular, in the case where a desired oxygen content is not obtained only by introducing the oxygen gas, a liquid (for example, moisture vapor or the like) may be introduced into the chamber as a supply source of oxygen.

Further, the anode active material preferably has an oxygen-containing region in which the anode active material has oxygen in the thickness direction, and the oxygen content in the oxygen-containing region is preferably higher than the oxygen content in the other regions. Thereby, expansion and shrinkage of the anode active material layer 2 are prevented. The regions other than the oxygen-containing region may or may not have oxygen. It is needless to say that in the case where the regions other than the oxygen-containing region have oxygen, the oxygen content thereof is lower than the oxygen content in the oxygen-containing region.

In this case, to further prevent expansion and shrinkage of the anode active material layer 2, the regions other than the oxygen-containing region preferably also have oxygen, and the anode active material preferably includes a first oxygen-containing region (region having the lower oxygen content) and a second oxygen-containing region having a higher oxygen content than that of the first oxygen-containing region (region having a higher oxygen content). In this case, it is preferable that the second oxygen-containing region is sandwiched between the first oxygen-containing regions. It is more preferable that the first oxygen-containing region and the second oxygen-containing region are alternately and repeatedly layered. Thereby, higher effects are obtained. The oxygen content in the first oxygen-containing region is preferably as small as possible. The oxygen content in the second oxygen-containing region is, for example, similar to the oxygen content in the case that the anode active material contains oxygen described above.

The anode active material having the first oxygen-containing region and the second oxygen-containing region may be formed, for example, by intermittently introducing oxygen gas into a chamber or changing the amount of oxygen gas introduced into the chamber in depositing the anode material. It is needless to say that in the case where a desired oxygen content is not obtained only by introducing the oxygen gas, liquid (for example, moisture vapor or the like) may be introduced into the chamber.

The oxygen content of the first oxygen-containing region may or may not clearly different from the oxygen content of the second oxygen-containing region. In particular, in the case where the introduction amount of the foregoing oxygen gas is continuously changed, the oxygen content may be continuously changed. In the case where the introduction amount of the oxygen gas is intermittently changed, the first oxygen-containing region and the second oxygen-containing region become so-called "layers." Meanwhile, in the case where the introduction amount of the oxygen gas is continuously changed, the first oxygen-containing region and the second oxygen-containing region become "lamellar state" rather than "layers." In the lamellar state, the oxygen content in the anode active material is distributed repeating ups and downs. In this case, it is preferable that the oxygen content is gradually or continuously changed between the first oxygen-containing region and the second oxygen-containing region. In the case where the oxygen content is changed rapidly, the ion diffusion characteristics may be lowered, or the resistance may be increased.

Further, the anode active material preferably has at least one metal element selected from the group consisting of iron, nickel molybdenum, titanium, chromium, cobalt, copper, manganese, zinc, germanium, aluminum, zirconium, silver, tin, antimony, and tungsten as an element. Thereby, the binding characteristics of the anode active material are improved, expansion and shrinkage of the anode active material layer 2 are prevented, and the resistance of the anode active material is lowered. The content of the metal element in the anode active material may be arbitrarily set. However, in the case where the anode is used for a secondary battery and the content of the metal element is excessively large, the anode active material layer 2 should be thickened to obtain a desired battery capacity, and thus the anode active material layer 2 may be separated from the anode current collector 1 or may be broken.

The anode active material having the foregoing metal element may be formed by using an alloy particle as a formation material when, for example, the anode material is deposited by using spraying method.

In the case where the anode active material has the metal element together with silicon, the entire anode active material layer 2 may have silicon and the metal element, or only part thereof may have silicon and the metal element.

As a case that only part of the anode active material has silicon and the metal element, for example, a case that part of the particulate anode active material has silicon and the metal element is included. In this case, the crystal state of the particulate anode active material may be in a state of an alloy in which a perfect alloy is formed, or may be in a state of a compound in which a perfect alloy is not formed yet but silicon and the metal element are mixed (phase separation state). The crystal state of the anode active material having silicon and the metal element is able to be checked by, for example, Energy Dispersive X-ray Fluorescence Spectroscopy (EDX).

The anode active material layer 2 may contain a portion formed by using a method other than spraying method together with a portion formed by using spraying method. As such other methods, for example, vapor-phase deposition method, liquid-phase deposition method, coating method, firing method are included. Two or more of these methods may be used by combination.

As vapor-phase deposition method, for example, physical deposition method or chemical deposition method is included. Specifically, vacuum evaporation method, sputtering method, ion plating method, laser ablation method, thermal Chemical Vapor Deposition (CVD) method, plasma CVD method and the like are included. As liquid-phase deposition method, a known technique such as electrolytic plating and electroless plating is able to be used. Coating method is a method in which, for example, after a particulate anode active material is mixed with a binder and the like, the resultant mixture is dispersed in a solvent and then coating is provided. Firing method is, for example, a method in which after coating is provided by using coating method, heat treatment is provided at a temperature higher than the melting point of the binder or the like. For firing method, a known technique such as atmosphere firing method, reactive firing method, and hot press firing method is included as well.

The anode active material may contain other material capable of inserting and extracting the electrode reactant in addition to the material having silicon as an element. As such a material, for example, a material that is able to insert and extract the electrode reactant and that contains at least one of metal elements and metalloid elements as an element (except for the material having silicon as an element) is included. Such a material is preferably used, since thereby a high energy density is obtainable. The material may be a simple substance, an alloy, or a compound of a metal element or a metalloid element, or may have one or more phases thereof at least in part.

As the foregoing metal element or the foregoing metalloid element, for example, a metal element or a metalloid element capable of forming an alloy with the electrode reactant is included. Specifically, magnesium (Mg), boron, aluminum, gallium (Ga), indium, germanium, tin, lead (Pb), bismuth, cadmium (Cd), silver, zinc, hafnium (Hf), zirconium (Zr), yttrium (Y), palladium (Pd), platinum (Pt) and the like are included. Specially, tin is preferable, because tin has a high ability to insert and extract the electrode reactant, and provides a high energy density. As a material containing tin, for example, a simple substance, an alloy, or a compound of tin, or a material having one or more phases thereof at least in part is included.

As the alloy of tin, for example, an alloy containing at least one selected from the group consisting of silicon, nickel, copper, iron, cobalt, manganese, zinc, indium, silver, titanium, germanium, bismuth, antimony, and chromium as an element other than tin is included. As a compound of tin, for example, a compound containing oxygen or carbon as an element other than tin is included. The compound of tin may contain one or more of the elements described for the alloy of tin as an element other than tin. Examples of the alloy or the compound of tin include $SnSiO_3$, $LiSnO$, $Mg_2Sn$ and the like.

In particular, as the material having tin as an element, for example, a material having a second element and a third element in addition to tin as a first element is preferable. The second element is at least one selected from the group consisting of cobalt, iron, magnesium, titanium, vanadium (V), chromium, manganese, nickel, copper, zinc, gallium, zirconium, niobium (Nb), molybdenum, silver, indium, cerium (Ce), hafnium, tantalum (Ta), tungsten (W), bismuth, and silicon. The third element is at least one selected from the group consisting of boron, carbon, aluminum, and phosphorus (P). In the case where the second element and the third element are contained, the cycle characteristics are improved.

Specially, a SnCoC-containing material that contains tin, cobalt, and carbon as an element in which the carbon content is in the range from 9.9 wt % to 29.7 wt %, both inclusive, and the cobalt ratio to the total of tin and cobalt (Co/(Sn+Co)) is in the range from 30 wt % to 70 wt %, both inclusive, is preferable. In such a composition range, a high energy density is obtainable.

The SnCoC-containing material may further contain other element according to needs. As other element, for example, silicon, iron, nickel, chromium, indium, niobium, germanium, titanium, molybdenum, aluminum, phosphorus, gallium, bismuth or the like is preferable. Two or more thereof may be contained, since thereby higher effect is obtained.

The SnCoC-containing material has a phase containing tin, cobalt, and carbon. Such a phase is preferably a low crystalline phase or an amorphous phase. The phase is a reaction phase capable of being reacted with the electrode reactant, and superior cycle characteristics are thereby obtained. The half-width of the diffraction peak obtained by X-ray diffraction of the phase is preferably 1.0 deg or more based on diffraction angle of 2θ in the case where CuKα ray is used as a specific X ray, and the sweep rate is 1 deg/min. Thereby, lithium is more smoothly inserted and extracted, and reactivity with the electrolyte is decreased.

It is easily determined whether or not the diffraction peak obtained by X-ray diffraction of the phase corresponds to the reaction phase capable of being reacted with lithium by comparing an X-ray diffraction chart before the electrochemical reaction with lithium to an X-ray diffraction chart after the electrochemical reaction with lithium. For example, if the diffraction peak position after the electrochemical reaction with lithium is changed from the diffraction peak position before the electrochemical reaction with lithium, the diffraction peak obtained by X-ray diffraction of the phase corresponds to the reaction phase capable of being reacted with lithium. In this case, for example, the diffraction peak of the low crystalline or amorphous reaction phase is observed in the range from 2θ=20 deg to 50 deg. The low crystalline or amorphous reaction phase contains, for example, the foregoing respective elements. It is considered that the low crystalline or amorphous reaction phase is mainly realized by carbon.

The SnCoC-containing material may have a phase containing a simple substance of each element or part thereof, in addition to the low crystalline or the amorphous phase.

In particular, in the SnCoC-containing material, at least part of carbon as an element is preferably bonded to a metal element or a metalloid element as other element. Cohesion or crystallization of tin or the like is thereby prevented.

As a measurement method for examining bonding state of elements, for example, X-ray Photoelectron Spectroscopy (XPS) is included. XPS is a method for examining element composition and element bonding state in the region up to several nm from the sample surface by irradiating the sample surface with soft X ray (in a commercial device, Al-Kα ray or Mg-Kα ray is used) and measuring motion energy of a photoelectron jumping out from the sample surface.

The bound energy of an inner orbital electron of an element is changed correlatively to the charge density on the element in the first approximation. For example, in the case where the charge density of carbon element is decreased by interaction with an element existing in the vicinity thereof, an outer-shell electron such as 2p electron is decreased, and thus 1s electron of carbon element is subject to strong binding force by the shell. That is, in the case where the charge density of the element is decreased, the bound energy becomes high. In XPS, in the case where the bound energy becomes high, the peak is shifted to a higher energy region.

In XPS, in the case of graphite, the peak of 1s orbit of carbon (C1s) is observed at 284.5 eV in the apparatus in which energy calibration is made so that the peak of 4f orbit of gold atom (Au4f) is obtained in 84.0 eV. In the case of surface contamination carbon, the peak is observed at 284.8 eV. Meanwhile, in the case of higher charge density of carbon element, for example, in the case where carbon is bonded to an element that is more positive than carbon, the peak of C1s is observed in the region lower than 284.5 eV. That is, in the case where at least part of carbon contained in the SnCoC-containing material is bonded to the metal element, the metalloid element or the like as other element, the peak of the composite wave of C1s obtained for the SnCoC-containing material is observed in the region lower than 284.5 eV.

In performing XPS measurement, in the case where the surface is covered with surface contamination carbon, the surface is preferably slightly sputtered by an argon ion gun attached to an XPS device. Further, if the SnCoC-containing material as a measuring target exists in the anode 22, it is preferable that after the secondary battery is disassembled and the anode 22 is taken out, the anode 22 is washed with a volatile solvent such as dimethyl carbonate in order to remove a low volatile solvent and an electrolyte salt existing on the surface of the anode 22. Such sampling is desirably performed under the inert atmosphere.

Further, in XPS measurement, for example, the peak of C1s is used for correcting the energy axis of spectrums. Since surface contamination carbon generally exists on a material surface, the peak of C1s of the surface contamination carbon is set to in 284.8 eV, which is used as an energy reference. In XPS measurement, the waveform of the peak of C1s is obtained as a form including the peak of the surface contamination carbon and the peak of carbon in the SnCoC-containing material. Therefore, for example, by performing analysis by using commercially available software, the peak of the surface contamination carbon and the peak of carbon in the SnCoC-containing material are separated. In the analysis of the waveform, the position of the main peak existing on the lowest bound energy side is set to the energy reference (284.8 eV).

The SnCoC-containing material may be formed by, for example, mixing raw materials of respective elements, dissolving the resultant mixture in an electric furnace, a high frequency induction furnace, an arc melting furnace or the like and then solidifying the resultant. Otherwise, the SnCoC-containing material may be formed by various atomization methods such as gas atomizing and water atomizing; various roll methods; or a method using mechanochemical reaction such as mechanical alloying method and mechanical milling method. Specially, the method using mechanochemical reaction is preferable, since thereby the SnCoC-containing material becomes the low crystalline structure or the amorphous structure. In the method using the mechanochemical reaction, for example, a manufacturing apparatus such as a planetary ball mill apparatus and an attliter is able to be used.

As the raw material, a mixture of simple substances of the respective elements may be used, but an alloy is preferably used for part of elements other than carbon. In the case where carbon is added to the alloy and thereby the material is synthesized by the method using mechanical alloying method, the low crystalline structure or the amorphous structure is obtained and reaction time is reduced as well. The state of the raw material may be powder or a mass.

In addition to the SnCoC-containing material, a SnCoFeC-containing material having tin, cobalt, iron, and carbon as an element is also preferable. The composition of the SnCoFeC-containing material may be arbitrarily set. For example, as a composition in which the iron content is set small, it is preferable that the carbon content is in the range from 9.9 wt % to 29.7 wt %, both inclusive, the iron content is in the range from 0.3 wt % to 5.9 wt %, both inclusive, and the cobalt ratio to the total of tin and cobalt (Co/(Sn+Co)) is in the range from 30 wt % to 70 wt %, both inclusive. Further, for example, as a composition in which the iron content is set large, it is preferable that the carbon content is in the range from 11.9 wt % to 29.7 wt %, both inclusive, the ratio of the total of cobalt and iron to the total of tin, cobalt, and iron ((Co+Fe)/(Sn+Co+Fe)) is in the range from 26.4 wt % to 48.5 wt %, both inclusive, and the cobalt ratio to the total of cobalt and iron (Co/(Co+Fe)) is in the range from 9.9 wt % to 79.5 wt %, both inclusive. In such a composition range, a high energy density is obtained. The crystallinity of the SnCoFeC-containing material, the measurement method for examining bonding state of elements, the forming method of the SnCoFeC-containing material and the like are similar to those of the foregoing SnCoC-containing material.

As other material capable of inserting and extracting the electrode reactant, for example, a carbon material is included. As the carbon material, for example, graphitizable carbon, non-graphitizable carbon in which the spacing of (002) plane is 0.37 nm or more, graphite in which the spacing of (002) plane is 0.34 nm or less and the like are included. More specifically, pyrolytic carbon, coke, glassy carbon fiber, an organic polymer compound fired body, activated carbon, carbon black and the like are included. Of the foregoing, the coke includes pitch coke, needle coke, petroleum coke and the like. The organic polymer compound fired body is obtained by firing and carbonizing a phenol resin, a furan resin or the like at an appropriate temperature. In the carbon material, a change in the crystal structure associated with insertion and extraction of the electrode reactant is very small, and thus a high energy density is thereby obtained. In addition, the carbon material also functions as an electrical conductor, and thus the carbon material is preferably used. The shape of the carbon material may be any of a fibrous shape, a spherical shape, a granular shape, and a scale-like shape.

Further, as other material capable of inserting and extracting the electrode reactant, for example, a metal oxide, a polymer compound and the like capable of inserting and extracting the electrode reactant are included. The metal oxide is, for example, iron oxide, ruthenium oxide, molybdenum oxide or the like. The polymer compound is, for example, polyacetylene, polyaniline, polypyrrole or the like.

It is needless to say that other material capable of inserting and extracting the electrode reactant may be a material other than the foregoing materials. Two or more of the foregoing anode materials may be used by arbitrary mixture.

Figure 2A:
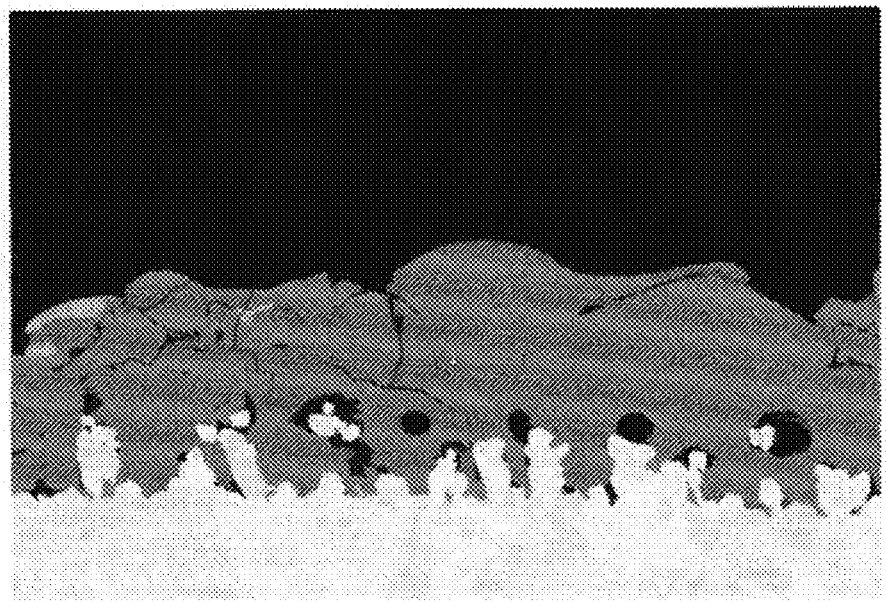
FIGS. 2A and 2B are an SEM photograph illustrating a cross sectional structure of the anode illustrated in FIG. 1 and a schematic drawing thereof.
Figure 2B:
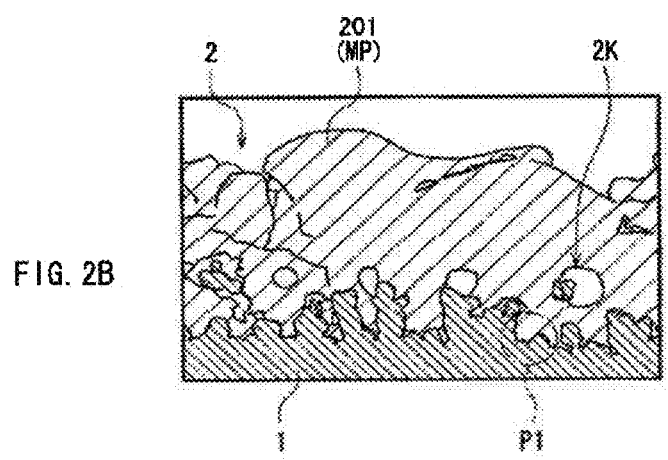
Figure 3A:
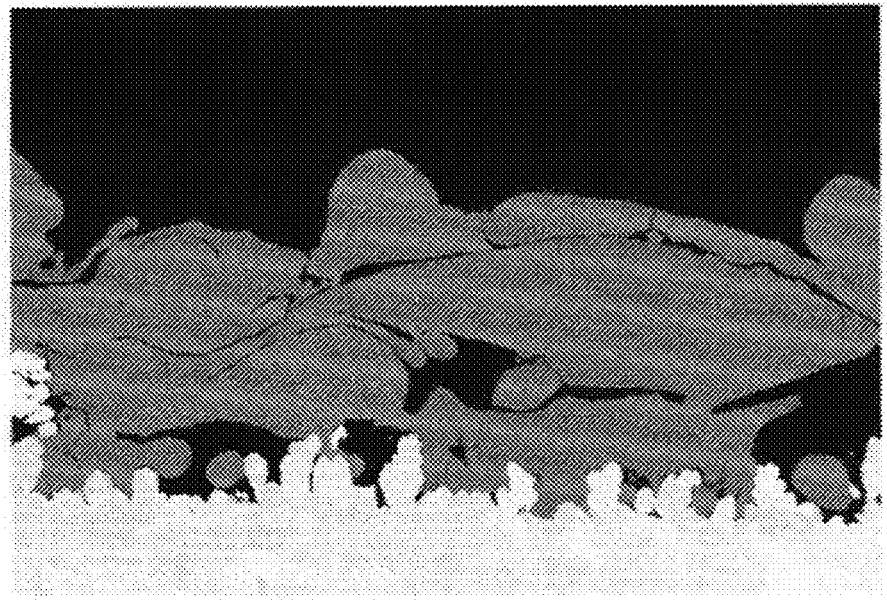
FIGS. 3A and 3B are an SEM photograph illustrating another cross sectional structure of the anode illustrated in FIG. 1 and a schematic drawing thereof.
Figure 3B:
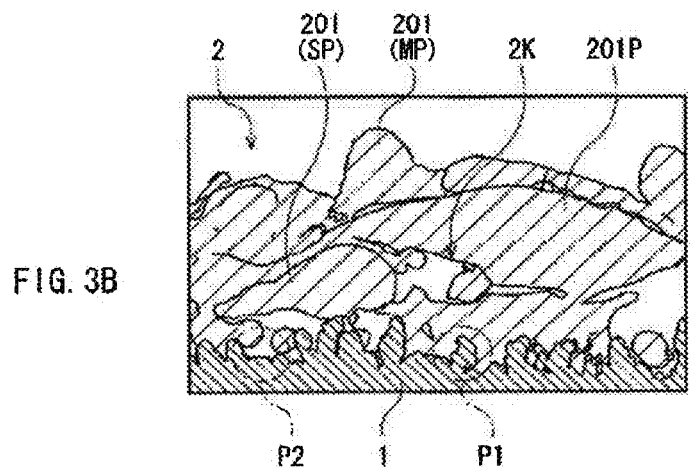

A description will be given in detail of anode structure examples with reference to FIG. 2A to FIG. 4B. FIG. 2A to FIG. 4B illustrate an enlarged part of the anode illustrated in FIG. 1. FIGS. 2A, 3A, and 4A are a Scanning Electron Microscope (SEM) photograph (secondary electron image), and FIGS. 2B, 3B, and 4B are a schematic drawing of the SEM image illustrated in FIGS. 2A, 3A, and 4A. FIGS. 2A and 2B illustrate a case using simple substance of silicon as an anode active material. FIGS. 3A to 4B illustrate a case using a material in which a metal element is contained in silicon as an anode active material.

As described above, the anode active material layer 2 is formed by depositing the material having silicon as an element on the anode current collector 1 with the use of spraying method. The anode active material contained in the anode active material layer 2 is composed of a plurality of particles, that is, the anode active material layer 2 has a plurality of anode active material particles 201. In this case, the anode active material layer 2 may have a multilayer structure in which the plurality of anode active material particles 201 are layered in the thickness direction of the anode active material layer 2 as illustrated in FIG. 2A to FIG. 3B, or the anode active material layer 2 may have a single layer structure in which the plurality of anode active material particles 201 are arranged along the surface of the anode current collector 1 as illustrated in FIGS. 4A and 4B.

The anode active material layer 2 is, for example, partially linked to the anode current collector 1. The anode active material layer 2 has a portion being contacted with the anode current collector 1 (contact portion P1) and a portion not being contacted with the anode current collector 1 (noncontact portion P2). Further, the anode active material layer 2 has therein a plurality of voids 2K.

Part of the anode active material particles 201 is, for example, in the flat shape. That is, the anode active material layer 2 has some flat particles 201P as part of the plurality of anode active material particles 201. The flat particles 201P are contacted with adjacent anode active material particles 201 so that the flat particles 201P and the adjacent anode active material particles 201 overlap each other.

In the case where the anode active material particles 201 have a metal element with silicon, for example, part of the anode active material particles 201 has silicon and the metal element. The crystal state of the anode active material particle 201 in this case may be in an alloy state (AP) or a compound (phase separation) state (SP). The crystal state of the anode active material particles 201 that have only silicon but do not have the metal element is in a simple substance state (MP).

The three crystal states (MP, AP, and SP) for the anode active material particles 201 are clearly illustrated in FIGS. 4A and 4B. That is, the anode active material particle 201 in the simple substance state (MP) is observed as a uniform gray region. The anode active material particle 201 in the alloy state (AP) is observed as a uniform white region. The anode active material particle 201 in the phase separation state (SP) is observed as a region in which a gray portion and a white portion are mixed.

The anode is manufactured, for example, by the following procedure.

First, the anode current collector 1 made of a roughened electrolytic copper foil or the like is prepared. Subsequently, the anode active material layer 2 is formed by preparing a material having silicon as an anode active material, and then depositing the foregoing material on the surface of the anode current collector 1 with the use of spraying method. In the spraying method, the surface of the anode current collector 1 is sprayed with the material having silicon in a melt state. In forming the anode active material layer 2, as the material having silicon, particles having a median size in the range from 5 μm to 200 μm, both inclusive, are preferably used. Thereby, the particle size distribution of the anode active material becomes appropriate. Accordingly, the anode is completed.

In forming the anode active material layer 2 by using spraying method, for example, the half-width (2θ) of the diffraction peak obtained by X-ray diffraction and the crystallite size are able to be changed by adjusting the melting temperature and cooling temperature of the material for forming the anode active material layer 2.

According to the anode and the method of manufacturing the anode, the anode active material layer 2 containing the anode active material having silicon as an element is formed on the anode current collector 1 by using spraying method. Therefore, the anode active material has crystallinity, and the anode active material layer 2 (crystalline anode active material) is linked to the anode current collector 1. In this case, compared to a case that the anode active material is noncrystalline (amorphous) or a case that the anode active material layer 2 is not linked to the anode current collector 1, the physical property of the anode active material is less likely to change with time, and the anode active material layer 2 is less likely to expand and shrink in electrode reaction. Thus, the anode is able to contribute to improve the performance of an electrochemical device. More specifically, in the case where the anode is used for a secondary battery, the anode is able to contribute to improve the cycle characteristics and the initial charge and discharge characteristics.

In particular, in the case where the anode active material layer 2 is alloyed with the anode current collector 1 in at least part of the interface with the anode current collector 1, when the anode active material layer 2 has therein a void, or when the anode active material layer 2 has a portion not being contacted with the anode current collector 1, higher effect is obtainable.

Further, in the case where the anode active material is in a state of a plurality of particles, if at least part of the anode active material is in the flat shape, higher effect is obtainable.

Further, in the case where the half-width (2θ) of the diffraction peak in the (111) crystal plane of the anode active material obtained by X-ray diffraction is 20 deg or less, or the crystallite size originated in the (111) crystal plane of the anode active material is 10 nm or more, and more preferably in the range from 20 nm to 100 nm, both inclusive, higher effect is obtainable.

Further, in the case where the anode active material has oxygen as an element and the oxygen content in the anode active material is in the range from 1.5 atomic % to 40 atomic %, both inclusive, in the case where the anode active material has an oxygen-containing region in which the anode active material has oxygen in the thickness direction and the oxygen content in the oxygen-containing region is higher than the oxygen content in the other regions, or in the case where the anode active material has at least one metal element selected from the group consisting of iron, nickel molybdenum, titanium, chromium, cobalt, copper, manganese, zinc, germanium, aluminum, zirconium, silver, tin, antimony, and tungsten as an element, higher effect is obtainable.

Further, in the case where the surface of the anode current collector 1 opposed to the anode active material layer 2 is roughened, the adhesion between the anode current collector 1 and the anode active material layer 2 is able to be improved. In this case, in the case where the ten point height of roughness profile Rz of the surface of the anode current collector 1 is 1.5 µm or more, or preferably in the range from 3 µm to 30 µm, both inclusive, higher effect is obtainable.

Further, in the case where in forming the anode active material layer 2 by using spraying method, particles having a median size in the range from 5 µm to 200 µm, both inclusive, are used as a material for forming the anode active material layer 2, higher effect is obtainable.

Next, a description will be hereinafter given of a usage example of the foregoing anode. As an example of the electrochemical devices, secondary batteries are herein taken. The foregoing anode is used for the secondary batteries as follows.

First Secondary Battery

Figure 5:
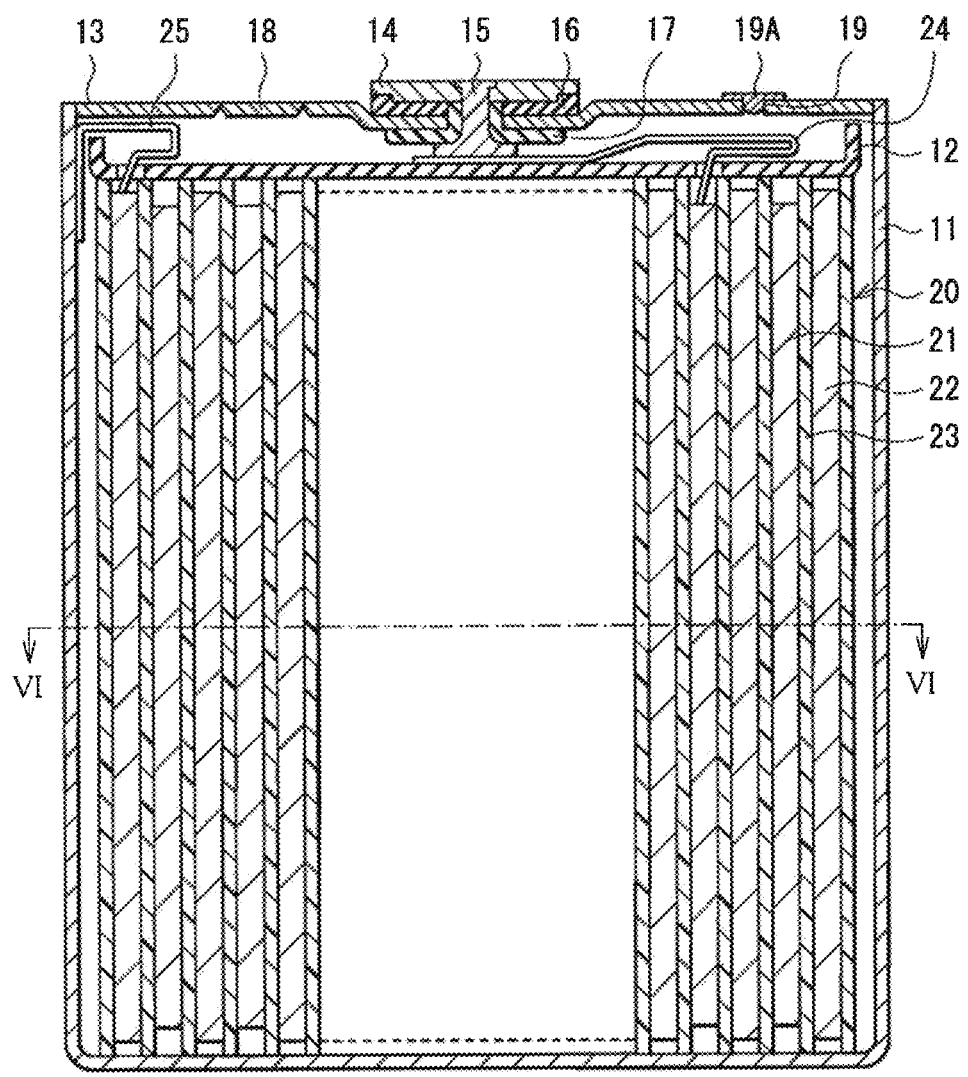
FIG. 5 is a cross sectional view illustrating a structure of a first secondary battery including the anode according to the embodiment of the invention.
Figure 6:
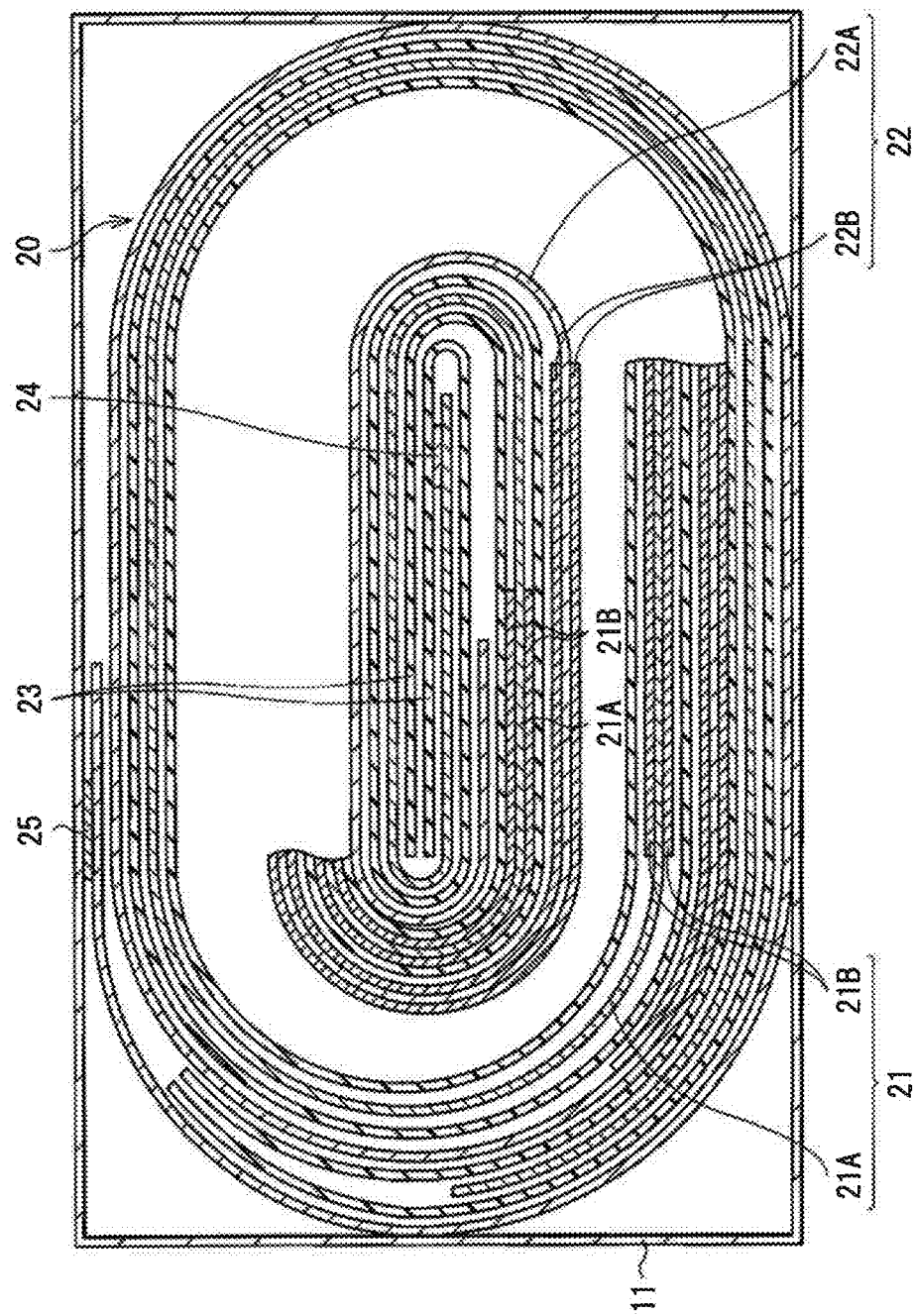
FIG. 6 is a cross sectional view taken along line VI-VI of the first secondary battery illustrated in FIG. 5.

FIG. 5 and FIG. 6 illustrate a cross sectional structure of a first secondary battery. FIG. 6 illustrates a cross section taken along line VI-VI illustrated in FIG. 5. The secondary battery herein described is, for example, a lithium ion secondary battery in which the capacity of an anode 22 is expressed based on insertion and extraction of lithium as an electrode reactant.

The secondary battery mainly contains a battery element 20 having a flat spirally wound structure in a battery can 11.

The battery can 11 is, for example, a square package member. As illustrated in FIG. 6, the square package member has a shape with the cross section in the longitudinal direction of a rectangle or an approximate rectangle (including curved lines in part). The battery can 11 structures not only a square battery in the shape of a rectangle, but also a square battery in the shape of an oval. That is, the square package member means a rectangle vessel-like member with the bottom or an oval vessel-like member with the bottom, which respectively has an opening in the shape of a rectangle or in the shape of an approximate rectangle (oval shape) formed by connecting circular arcs by straight lines. FIG. 6 illustrates a case that the battery can 11 has a rectangular cross sectional shape. The battery structure including the battery can 11 is a so-called square type.

The battery can 11 is made of, for example, a metal material containing iron, aluminum, or an alloy thereof. The battery can 11 may have a function as an electrode terminal as well. In this case, to prevent the secondary battery from being swollen by using the rigidity (less deformable characteristics) of the battery can 11 in charge and discharge, the battery can 11 is preferably made of rigid iron than aluminum. In the case where the battery can 11 is made of iron, for example, the iron may be plated by nickel or the like.

The battery can 11 also has a hollow structure in which one end of the battery can 11 is closed and the other end thereof is opened. At the open end of the battery can 11, an insulating plate 12 and a battery cover 13 are attached, and thereby inside of the battery can 11 is hermetically closed. The insulating plate 12 is located between the battery element 20 and the battery cover 13, is arranged perpendicularly to the spirally wound circumferential face of the battery element 20, and is made of, for example, polypropylene or the like. The battery cover 13 is, for example, made of a material similar to that of the battery can 11, and may also have a function as an electrode terminal as the battery can 11 does.

Outside of the battery cover 13, a terminal plate 14 as a cathode terminal is provided. The terminal plate 14 is electrically insulated from the battery cover 13 with an insulating case 16 in between. The insulating case 16 is made of, for example, polybutylene terephthalate or the like. In the approximate center of the battery cover 13, a through-hole is provided. A cathode pin 15 is inserted in the through-hole so that the cathode pin 15 is electrically connected to the terminal plate 14 and is electrically insulated from the battery cover 13 with a gasket 17 in between. The gasket 17 is made of, for example, an insulating material, and the surface thereof is coated with asphalt.

In the vicinity of the rim of the battery cover 13, a cleavage valve 18 and an injection hole 19 are provided. The cleavage valve 18 is electrically connected to the battery cover 13. In the case where the internal pressure of the battery becomes a certain level or more by internal short circuit, external heating or the like, the cleavage valve 18 is separated from the battery cover 13 to release the internal pressure. The injection hole 19 is sealed by a sealing member 19A made of, for example, a stainless steel ball.

The battery element 20 is formed by layering a cathode 21 and an anode 22 with a separator 23 in between and then spirally winding the resultant laminated body. The battery element 20 is flat in accordance with the shape of the battery can 11. A cathode lead 24 made of a metal material such as aluminum is attached to an end of the cathode 21 (for example, the internal end thereof). An anode lead 25 made of a metal material such as nickel is attached to an end of the anode 22 (for example, the outer end thereof). The cathode lead 24 is electrically connected to the terminal plate 14 by being welded to an end of the cathode pin 15. The anode lead 25 is welded and electrically connected to the battery can 11.

In the cathode 21, for example, a cathode active material layer 21B is provided on both faces of a cathode current collector 21A having a pair of faces. However, the cathode active material layer 21B may be provided only on a single face of the cathode current collector 21A.

The cathode current collector 21A is made of, for example, a metal material such as aluminum, nickel, and stainless.

The cathode active material layer 21B contains, as a cathode active material, one or more cathode materials capable of inserting and extracting lithium. According to needs, the cathode active material layer 21B may contain other material such as a cathode binder and a cathode electrical conductor.

As the cathode material capable of inserting and extracting lithium, for example, a lithium-containing compound is preferable, since thereby a high energy density is obtainable. As the lithium-containing compound, for example, a complex oxide containing lithium and a transition metal element, a phosphate compound containing lithium and a transition metal element and the like are included. Specially, a compound containing at least one selected from the group consisting of cobalt, nickel, manganese, and iron as a transition metal element is preferable, since thereby a higher voltage is obtainable. The chemical formula thereof is expressed by, for example, $Li_xM1O_2$ or $Li_yM2PO_4$. In the formula, M1 and M2 represent one or more transition metal elements. Values of x and y vary according to the charge and discharge state, and are generally in the range of $0.05 \leq x \leq 1.10$ and $0.05 \leq y \leq 1.10$.

As the complex oxide containing lithium and a transition metal element, for example, a lithium cobalt complex oxide ($Li_xCoO_2$), a lithium nickel complex oxide ($Li_xNiO_2$), a lithium nickel cobalt complex oxide ($Li_xNi_{1-z}CoO_2(z<1)$), a lithium nickel cobalt manganese complex oxide ($Li_xNi_{(1-v-w)}Co_vMn_wO_2$) ($v+w<1$)), lithium manganese complex oxide having a spinel structure ($LiMn_2O_4$) and the like are included. Specially, a complex oxide containing cobalt is preferable, since thereby a high capacity is obtained and superior cycle characteristics are obtained. Further, as the phosphate compound containing lithium and a transition metal element, for example, lithium iron phosphate compound ($LiFePO_4$), a lithium iron manganese phosphate compound ($LiFe_{1-u}Mn_uPO_4(u<1)$) and the like are included.

In addition, as the cathode material capable of inserting and extracting lithium, for example, an oxide such as titanium oxide, vanadium oxide, and manganese dioxide; a disulfide such as titanium disulfide and molybdenum sulfide; a chalcogenide such as niobium selenide; sulfur; a conductive polymer such as polyaniline and polythiophene are included.

It is needless to say that the cathode material capable of inserting and extracting lithium may be a material other than the foregoing compounds. Further, two or more of the foregoing cathode materials may be used by arbitrary mixture.

As the cathode binder, for example, a synthetic rubber such as styrene-butadiene rubber, fluorinated rubber, and ethylene propylene diene; or a polymer material such as polyvinylidene fluoride are included. One thereof may be used singly, or a plurality thereof may be used by mixture.

As the cathode electrical conductor, for example, a carbon material such as graphite, carbon black, acetylene black, and Ketjen black is included. Such a carbon material may be used singly, or a plurality thereof may be used by mixture. The cathode electrical conductor may be a metal material, a conductive polymer molecule or the like as long as the material has the electric conductivity.

The anode 22 has a structure similar to that of the anode described above. For example, in the anode 22, an anode active material layer 22B is provided on both faces of an anode current collector 22A having a pair of faces. The structures of the anode current collector 22A and the anode active material layer 22B are respectively similar to the structures of the anode current collector 1 and the anode active material layer 2 in the foregoing anode. The chargeable capacity in the anode material capable of inserting and extracting lithium is preferably larger than the discharge capacity of the cathode 21.

The separator 23 separates the cathode 21 from the anode 22, and passes ions as an electrode reactant while preventing current short circuit due to contact of both electrodes. The separator 23 is made of, for example, a porous film composed of a synthetic resin such as polytetrafluoroethylene, polypropylene, and polyethylene, or a ceramic porous film. The separator 23 may have a structure in which the foregoing two or more porous films are layered.

An electrolytic solution as a liquid electrolyte is impregnated in the separator 23. The electrolytic solution contains a solvent and an electrolyte salt dissolved therein.

The solvent contains, for example, one or more nonaqueous solvents such as an organic solvent. The solvents described below may be combined arbitrarily.

As the nonaqueous solvent, for example, ethylene carbonate, propylene carbonate, butylene carbonate, dimethyl carbonate, diethyl carbonate, ethyl methyl carbonate, methylpropyl carbonate, γ-butyrolactone, γ-valerolactone, 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, methyl acetate, ethyl acetate, methyl propionate, ethyl propionate, methyl butyrate, methyl isobutyrate, trimethylacetic acid methyl, trimethylacetic acid ethyl, acetonitrile, glutaronitrile, adiponitrile, methoxyacetonitrile, 3-methoxypropionitrile, N,N-dimethylformamide, N-methylpyrrolidinone, N-methyloxazolidinone, N,N'-dimethylimidazolidinone, nitromethane, nitroethane, sulfolane, trimethyl phosphate, dimethyl sulfoxide and the like are included. Specially, at least one selected from the group consisting of ethylene carbonate, propylene carbonate, dimethyl carbonate, diethyl carbonate, and ethyl methyl carbonate is preferable. In this case, a mixture of a high viscosity (high dielectric constant) solvent (for example, specific inductive $\varepsilon \geq 30$) such as ethylene carbonate and propylene carbonate and a low viscosity solvent (for example, viscosity $\leq 1$ mPa·s) such as dimethyl carbonate, ethylmethyl carbonate, and diethyl carbonate is more preferable. Thereby, dissociation property of the electrolyte salt and ion mobility are improved.

In particular, the solvent preferably contains at least one of a chain ester carbonate having halogen as an element represented by Chemical formula 1 and a cyclic ester carbonate having halogen as an element represented by Chemical formula 2. Thereby, a stable protective film is formed on the surface of the anode 22 in charge and discharge, and decomposition reaction of the electrolytic solution is prevented.

Chemical formula 1

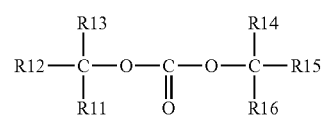

In the formula, R11 to R16 are a hydrogen group, a halogen group, an alkyl group, or an alkyl halide group. At least one of R11 to R16 is the halogen group or the alkyl halide group.

Chemical formula 2

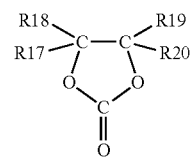

In the formula, R17 to R20 are a hydrogen group, a halogen group, an alkyl group, or an alkyl halide group. At least one of R17 to R20 is the halogen group or the alkyl halide group.

R11 to R16 in Chemical formula 1 may be identical or different. That is, types of R11 to R16 may be individually set in the range of the foregoing groups. The same is applied to R17 to R20 in Chemical formula 2.

The halogen type is not particularly limited, but fluorine, chlorine, or bromine is preferable, and fluorine is more preferable. Higher effect is thereby obtained compared to other halogen.

The number of halogen is preferably two than one, and further may be three or more, since thereby an ability to form a protective film is improved, and a more rigid and stable protective film is formed. Accordingly, decomposition reaction of the electrolytic solution is further prevented.

As the chain ester carbonate having halogen represented by Chemical formula 1, for example, fluoromethyl methyl carbonate, bis(fluoromethyl) carbonate, difluoromethyl methyl carbonate and the like are included. One thereof may be used singly, or a plurality thereof may be used by mixture. Specially, bis(fluoromethyl) carbonate is preferable, since thereby high effect is obtained.

As the cyclic ester carbonate having halogen represented by Chemical formula 2, for example, the compounds represented by Chemical formulas 3(1) to 4(9) are included. That is, 4-fluoro-1,3-dioxolane-2-one of Chemical formula 3(1), 4-chloro-1,3-dioxolane-2-one of Chemical formula 3(2), 4,5-difluoro-1,3-dioxolane-2-one of Chemical formula 3(3), tetrafluoro-1,3-dioxolane-2-one of Chemical formula 3(4), 4-chloro-5-fluoro-1,3-dioxolane-2-one of Chemical formula 3(5), 4,5-dichloro-1,3-dioxolane-2-one of Chemical formula 3(6), tetrachloro-1,3-dioxolane 2-one of Chemical formula 3(7), 4,5-bistrifluoromethyl-1,3-dioxolane-2-one of Chemical formula 3(8), 4-trifuloromethyl-1,3-dioxolane-2-one of Chemical formula 3(9), 4,5-difluoro-4,5-dimethyl-1,3-dioxolane-2-one of Chemical formula 3(10), 4,4-difluoro-5-methyl-1,3-dioxolane-2-one of Chemical formula 3(11), 4-ethyl-5,5-difluoro-1,3-dioxolane-2-one of Chemical formula 3(12) and the like are included. Further, 4-fluoro-5-trifluoromethyl-1,3-dioxolane-2-one of Chemical formula 4(1), 4-methyl-5-trifluoromethyl-1,3-dioxolane-2-one of Chemical formula 4(2), 4-fluoro-4,5-dimethyl-1,3-dioxolane-2-one of Chemical formula 4(3), 5-(1,1-difluoroethyl)-4,4-difluoro-1,3-dioxolane-2-one of Chemical formula 4(4), 4,5-dichloro-4,5-dimethyl-1,3-dioxolane-2-one of Chemical formula 4(5), 4-ethyl-5-fluoro-1,3-dioxolane-2-one of Chemical formula 4(6), 4-ethyl-4,5-difluoro-1,3-dioxolane-2-one of Chemical formula 4(7), 4-ethyl-4,5,5-trifluoro-1,3-dioxolane-2-one of Chemical formula 4(8), 4-fluoro-4-methyl-1,3-dioxolane-2-one of Chemical formula 4(9) and the like are included. One thereof may be used singly, or a plurality thereof may be used by mixture.

Chemical formula 3

(1)

(2)

(3)

(4)

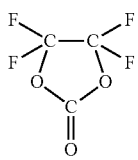

(5)

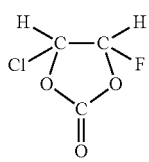

(6)

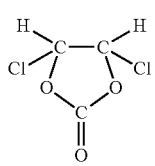

(7)

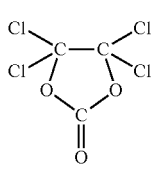

(8)

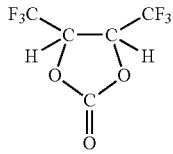

(9)

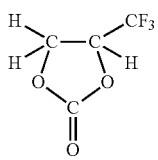

(10)

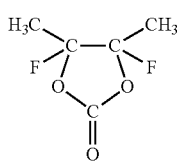

(11)

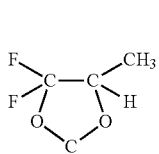

(12)

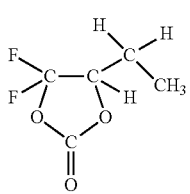

Chemical formula 4

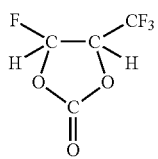
(1)

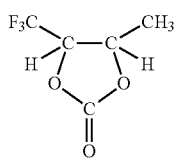
(2)

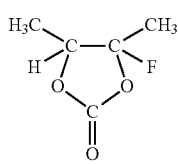
(3)

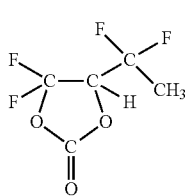
(4)

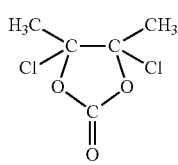
(5)

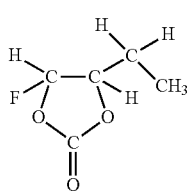
(6)

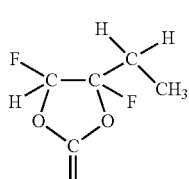
(7)

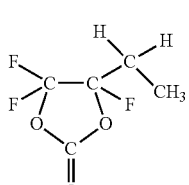
(8)

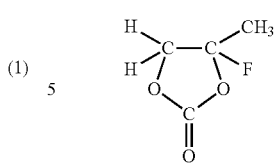
(9)

Specially, 4-fluoro-1,3-dioxolane-2-one or 4,5-difluoro-1,3-dioxolane-2-one is preferable, and 4,5-difluoro-1,3-dioxolane-2-one is more preferable. In particular, as 4,5-difluoro-1,3-dioxolane-2-one, a trans isomer is preferable to a cis isomer, since the trans isomer is easily available and provides high effect.

The solvent preferably contains a cyclic ester carbonate having an unsaturated bond represented by Chemical formula 5 to Chemical formula 7. Thereby, the chemical stability of the electrolytic solution is further improved. One thereof may be used singly, or a plurality thereof may be used by mixture.

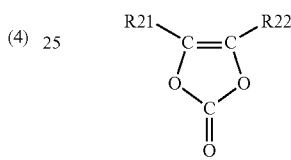

Chemical formula 5

In the formula, R21 and R22 are a hydrogen group or an alkyl group.

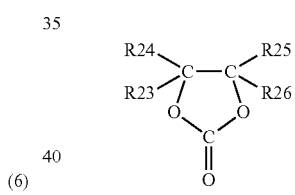

Chemical formula 6

In the formula, R23 to R26 are a hydrogen group, an alkyl group, a vinyl group, or an aryl group. At least one of R23 to R26 is the vinyl group or the aryl group.

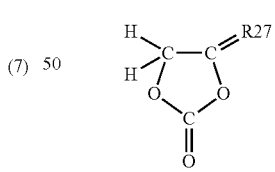

Chemical formula 7

In the formula, R27 is an alkylene group.

The cyclic ester carbonate having an unsaturated bond represented by Chemical formula 5 is a vinylene carbonate compound. As the vinylene carbonate compound, for example, vinylene carbonate (1,3-dioxole-2-one), methylvinylene carbonate (4-methyl-1,3-dioxole-2-one), ethylvinylene carbonate (4-ethyl-1,3-dioxole-2-one), 4,5-dimethyl-1,3-dioxole-2-one, 4,5-diethyl-1,3-dioxole-2-one, 4-fluoro-1,3-dioxole-2-one, 4-trifluoromethyl-1,3-dioxole-2-one and the like are included. Specially, vinylene carbonate is preferable, since vinylene carbonate is easily available and provides high effect.

The cyclic ester carbonate having an unsaturated bond represented by Chemical formula 6 is a vinylethylene carbonate compound. As the vinylethylene carbonate compound, for example, vinylethylene carbonate (4-vinyl-1,3-dioxolane-2-one), 4-methyl-4-vinyl-1,3-dioxolane-2-one, 4-ethyl-4-vinyl-1,3-dioxolane-2-one, 4-n-propyl-4-vinyl-1,3-dioxolane-2-one, 5-methyl-4-vinyl-1,3-dioxolane-2-one, 4,4-divinyl-1,3-dioxolane-2-one, 4,5-divinyl-1,3-dioxolane-2-one and the like are included. Specially, vinylethylene carbonate is preferable, since vinylethylene carbonate is easily available, and provides high effect. It is needless to say that all of R23 to R26 may be the vinyl group or the aryl group. Otherwise, it is possible that some of R23 to R26 are the vinyl group, and the others thereof are the aryl group.

The cyclic ester carbonate having an unsaturated bond represented by Chemical formula 7 is a methylene ethylene carbonate compound. As the methylene ethylene carbonate compound, 4-methylene-1,3-dioxolane-2-one, 4,4-dimethyl-5-methylene-1,3-dioxolane-2-one, 4,4-diethyl-5-methylene-1,3-dioxolane-2-one and the like are included. The methylene ethylene carbonate compound may have one methylene group (compound represented by Chemical formula 7), or have two methylene groups.

The cyclic ester carbonate having an unsaturated bond may be catechol carbonate having a benzene ring or the like, in addition to the compounds represented by Chemical formula 5 to Chemical formula 7.

Further, the solvent preferably contains sultone (cyclic sulfonic ester) and an acid anhydride, since thereby chemical stability of the electrolytic solution is further improved.

As the sultone, for example, propane sultone, propene sultone or the like is included. Specially, propene sultone is preferable. Such sultone may be used singly, or a plurality thereof may be used by mixture. The sultone content in the solvent is, for example, in the range from 0.5 wt % to 5 wt %, both inclusive.

As the acid anhydride, for example, carboxylic anhydride such as succinic anhydride, glutaric anhydride, and maleic anhydride; disulfonic anhydride such as ethane disulfonic anhydride and propane disulfonic anhydride; an anhydride of carboxylic acid and sulfonic acid such as sulfobenzoic anhydride, sulfopropionic anhydride, and sulfobutyric anhydride and the like are included. Specially, succinic anhydride or sulfobenzoic anhydride is preferable. The anhydrides may be used singly, or a plurality thereof may be used by mixture. The content of the acid anhydride in the solvent is, for example, in the range from 0.5 wt % to 5 wt %, both inclusive.

The electrolyte salt contains, for example, one or more light metal salts such as a lithium salt. The electrolyte salts described below may be combined arbitrarily.

As the lithium salt, for example, lithium hexafluorophosphate, lithium tetrafluoroborate, lithium perchlorate, lithium hexafluoroarsenate, lithium tetraphenylborate (LiB($C_6H_5$)$_4$), lithium methanesulfonate (LiCH$_3$SO$_3$), lithium trifluoromethane sulfonate (LiCF$_3$SO$_3$), lithium tetrachloroaluminate (LiAlCl$_4$), dilithium hexafluorosilicate (Li$_2$SiF$_6$), lithium chloride (LiCl), lithium bromide (LiBr) and the like are included, since thereby a superior electric performance is obtained in an electrochemical device.

Specially, at least one selected from the group consisting of lithium hexafluorophosphate, lithium tetrafluoroborate, lithium perchlorate, and lithium hexafluoroarsenate is preferable, and lithium hexafluorophosphate is more preferable, since the internal resistance is lowered, and thus higher effect is obtained.

In particular, the electrolyte salt preferably contains at least one selected from the group consisting of the compounds represented by Chemical formula 8 to Chemical formula 10. Thereby, in the case where such a compound is used together with the foregoing lithium hexafluorophosphate or the like, higher effect is obtained. R31 and R33 in Chemical formula 8 may be identical or different. The same is applied to R41 to R43 in Chemical formula 9 and R51 and R52 in Chemical formula 10.

Chemical formula 8

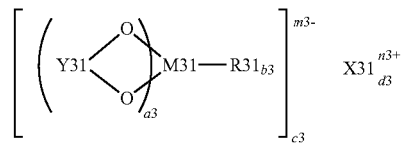

In the formula, X31 is a Group 1 element or a Group 2 element in the long period periodic table or aluminum. M31 is a transition metal element, a Group 13 element, a Group 14 element, or a Group 15 element in the long period periodic table. R31 is a halogen group. Y31 is —(O═)C—R32—C(═O)—, —(O═)C—C(R33)$_2$—, or —(O═)C—C (═O)—. R32 is an alkylene group, an alkylene halide group, an arylene group, or an arylene halide group. R33 is an alkyl group, an alkyl halide group, an aryl group, or an aryl halide group. a3 is one of integer numbers 1 to 4. b3 is 0, 2, or 4. c3, d3, m3, and n3 are one of integer numbers 1 to 3.

Chemical formula 9

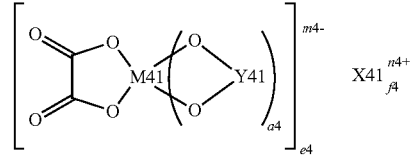

In the formula, X41 is a Group 1 element or a Group 2 element in the long period periodic table. M41 is a transition metal element, a Group 13 element, a Group 14 element, or a Group 15 element in the long period periodic table. Y41 is —(O═)C—(C(R41)$_2$)$_{b4}$—C(═O)—, —(R43)$_2$C—(C (R42)$_2$)$_{c4}$—C(═O)—, —(R43)$_2$C—(C(R42)$_2$)$_{c4}$—C(R43)$_2$—, —(R43)$_2$C—(C(R42)$_2$)$_{c4}$—S(═O)$_2$—, —(O═)$_2$S—(C(R42)$_2$)$_{d4}$—S(═O)$_2$—, or —(O═)C—(C (R42)$_2$)$_{d4}$—S(═O)$_2$—. R41 and R43 are a hydrogen group, an alkyl group, a halogen group, or an alkyl halide group. At least one of R41 and R43 is respectively the halogen group or the alkyl halide group. R42 is a hydrogen group, an alkyl group, a halogen group, or an alkyl halide group. a4, e4, and n4 are an integer number of 1 or 2. b4 and d4 are one of integer numbers 1 to 4. c4 is one of integer numbers 0 to 4. f4 and m4 are one of integer numbers 1 to 3.

Chemical formula 10

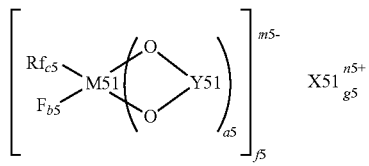

In the formula, X51 is a Group 1 element or a Group 2 element in the long period periodic table. M51 is a transition metal element, a Group 13 element, a Group 14 element, or a Group 15 element in the long period periodic table. Rf is a fluorinated alkyl group with the carbon number in the range from 1 to 10, both inclusive, or a fluorinated aryl group with the carbon number in the range from 1 to 10, both inclusive. Y51 is $-(O=)C-(C(R51)_2)_{d5}-C(=O)-$, $-(R52)_2C-(C(R51)_2)_{d5}-C(=O)-$, $-(R52)_2C-(C(R51)_2)_{d5}-C(R52)_2-$, $-(R52)_2C-(C(R51)_2)_{d5}-S(=O)_2-$, $-(O=)_2S-(C(R51)_2)_{e5}-S(=O)_2-$, or $-(O=)C-(C(R51)_2)_{e5}-S(=O)_2-$. R51 is a hydrogen group, an alkyl group, a halogen group, or an alkyl halide group. R52 is a hydrogen group, an alkyl group, a halogen group, or an alkyl halide group, and at least one thereof is the halogen group or the alkyl halide group. a5, f5, and n5 are 1 or 2. b5, c5, and e5 are one of integer numbers 1 to 4. d5 is one of integer numbers 0 to 4. g5 and m5 are one of integer numbers 1 to 3.

The long period periodic table is shown in "Inorganic chemistry nomenclature (revised edition)" proposed by IUPAC (International Union of Pure and Applied Chemistry). Specifically, Group 1 element represents hydrogen, lithium, sodium, potassium, rubidium, cesium, and francium. Group 2 element represents beryllium, magnesium, calcium, strontium, barium, and radium. Group 13 element represents boron, aluminum, gallium, indium, and thallium. Group 14 element represents carbon, silicon, germanium, tin, and lead. Group 15 element represents nitrogen, phosphorus, arsenic, antimony, and bismuth.

As a compound represented by Chemical formula 8, for example, the compounds represented by Chemical formulas 11(1) to 11(6) and the like are included. As a compound represented by Chemical formula 9, for example, the compounds represented by Chemical formulas 12(1) to 12(8) and the like are included. As a compound represented by Chemical formula 10, for example, the compound represented by Chemical formula 13 and the like are included. It is needless to say that the compound is not limited to the compounds represented by Chemical formula 11(1) to Chemical formula 13, and the compound may be other compound as long as such a compound has the structure represented by Chemical formula 8 to Chemical formula 10.

Chemical formula 11

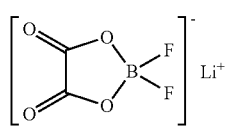
(1)

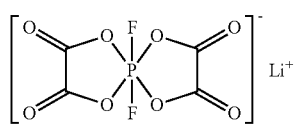
(2)

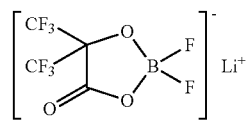
(3)

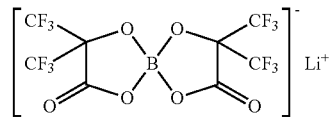
(4)

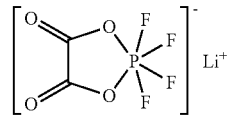
(5)

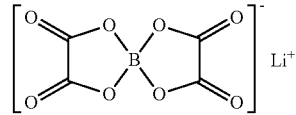
(6)

Chemical formula 12

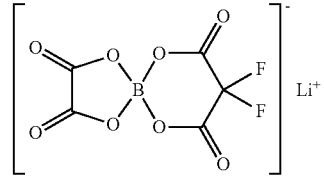
(1)

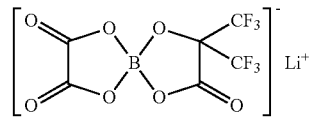
(2)

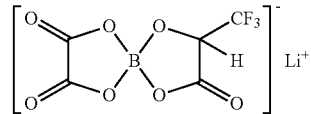
(3)

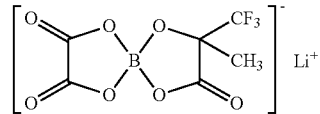
(4)

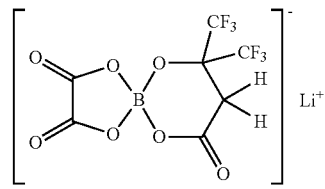
(5)

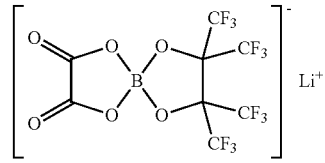
(6)

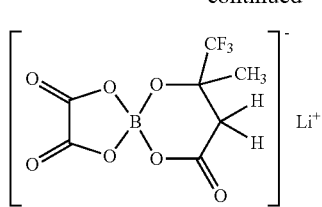

(7)

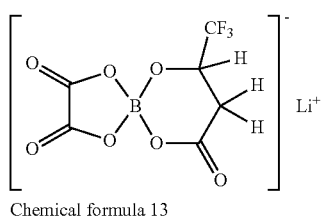

(8)

Chemical formula 13

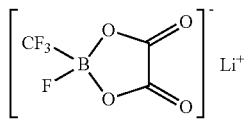

Further, the electrolyte salt may contain at least one selected from the group consisting of the compounds represented by Chemical formula 14 to Chemical formula 16. Thereby, in the case where such a compound is used together with the foregoing lithium hexafluorophosphate or the like, higher effect is obtained. m and n in Chemical formula 14 may be identical or different. The same is applied to p, q, and r in Chemical formula 16.

$LiN(C_mF_{2m+1}SO_2)(C_nF_{2n+1}SO_2)$     Chemical formula 14

In the formula, m and n are an integer number of 1 or more.

Chemical formula 15

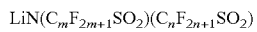
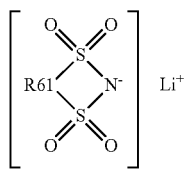

In the formula, R61 is a straight chain or branched perfluoro alkylene group with the carbon number in the range from 2 to 4, both inclusive.

$LiC(C_pF_{2p+1}SO_2)(C_qF_{2q+1}SO_2)(C_rF_{2r+1}SO_2)$     Chemical formula 16

In the formula, p, q, and r are an integer number of 1 or more.

As the chain compound represented by Chemical formula 14, for example, lithium bis(trifluoromethanesulfonyl)imide ($LiN(CF_3SO_2)_2$), lithium bis(pentafluoroethanesulfonyl)imide ($LiN(C_2F_5SO_2)_2$), lithium (trifluoromethanesulfonyl)(pentafluoroethanesulfonyl)imide ($LiN(CF_3SO_2)(C_2F_5SO_2)$), lithium (trifluoromethanesulfonyl)(heptafluoropropanesulfonyl)imide ($LiN(CF_3SO_2)(C_3F_7SO_2)$), lithium (trifluoromethanesulfonyl)(nonafluorobutanesulfonyl)imide ($LiN(CF_3SO_2)(C_4F_9SO_2)$) and the like are included. One thereof may be used singly, or a plurality thereof may be used by mixture.

As the cyclic compound represented by Chemical formula 15, for example, the compounds represented by Chemical formulas 17(1) to 17(4) are included. That is, lithium 1,2-perfluoroethanedisulfonylimide represented by Chemical formula 17(1), lithium 1,3-perfluoropropanedisulfonylimide represented by Chemical formula 17(2), lithium 1,3-perfluorobutanedisulfonylimide represented by Chemical formula 17(3), lithium 1,4-perfluorobutanedisulfonylimide represented by Chemical formula 17(4) and the like are included. One thereof may be used singly, or a plurality thereof may be used by mixture. Specially, lithium 1,2-perfluoroethanedisulfonylimide is preferable, since thereby high effect is obtained.

Chemical formula 17

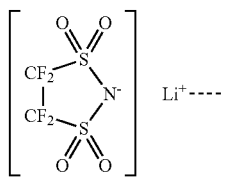

(1)

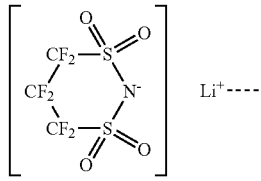

(2)

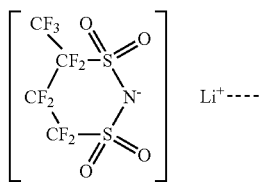

(3)

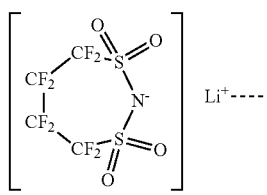

(4)

As the chain compound represented by Chemical formula 16, for example, lithium tris(trifluoromethanesulfonyl)methyde ($LiC(CF_3SO_2)_3$) and the like are included.

The content of the electrolyte salt to the solvent is preferably in the range from 0.3 mol/kg to 3.0 mol/kg, both inclusive. If the content is out of the foregoing range, there is a possibility that the ion conductivity is significantly lowered.

The secondary battery is manufactured, for example, by the following procedure.

First, the cathode 21 is formed. First, a cathode active material, a cathode binder, and a cathode electrical conductor are mixed to prepare a cathode mixture, which is dispersed in an organic solvent to form paste cathode mixture slurry. Subsequently, both faces of the cathode current collector 21A are uniformly coated with the cathode mixture slurry by using a doctor blade, a bar coater or the like, which is dried. Finally, the coating is compression-molded by using a rolling press machine or the like while being heated if necessary to form the cathode active material layer 21B. In this case, the resultant may be compression-molded over several times.

Next, the anode 22 is formed by forming the anode active material layer 22B on both faces of the anode current collector 22A by the same procedure as that of forming the anode described above.

Next, the battery element 20 is formed by using the cathode 21 and the anode 22. First, the cathode lead 24 is attached to the cathode current collector 21A by welding or the like, and the anode lead 25 is attached to the anode current collector 22A by welding or the like. Subsequently, the cathode 21 and the anode 22 are layered with the separator 23 in between, and then are spirally wound in the longitudinal direction. Finally, the spirally wound body is formed into a flat shape.

The secondary battery is assembled as follows. First, after the battery element 20 is contained in the battery can 11, the insulating plate 12 is arranged on the battery element 20. Subsequently, the cathode lead 24 is connected to the cathode pin 15 by welding or the like, and the anode lead 25 is connected to the battery can 11 by welding or the like. After that, the battery cover 13 is fixed on the open end of the battery can 11 by laser welding or the like. Finally, the electrolytic solution is injected into the battery can 11 from the injection hole 19, and impregnated in the separator 23. After that, the injection hole 19 is sealed by the sealing member 19A. The secondary battery illustrated in FIG. 5 and FIG. 6 is thereby completed.

In the secondary battery, when charged, for example, lithium ions are extracted from the cathode 21, and are inserted in the anode 22 through the electrolytic solution impregnated in the separator 23. Meanwhile, when discharged, for example, lithium ions are extracted from the anode 22, and are inserted in the cathode 21 through the electrolytic solution impregnated in the separator 23.

According to the square secondary battery, since the anode 22 has the structure similar to that of the foregoing anode, the cycle characteristics and the initial charge and discharge characteristics are able to be improved.

In particular, in the case where the solvent of the electrolytic solution contains at least one of the chain ester carbonate having halogen represented by Chemical formula 1 and the cyclic ester carbonate having halogen represented by Chemical formula 2; at least one of the cyclic ester carbonate having an unsaturated bond represented by Chemical formula 5 to Chemical formula 7; sultone; or an acid anhydride, higher effect is obtainable.

Further, in the case where the electrolyte salt of the electrolytic solution contains at least one selected from the group consisting of lithium hexafluorophosphate, lithium tetrafluoroborate, lithium perchlorate, and lithium hexafluoroarsenate; at least one selected from the group consisting of the compounds represented by Chemical formula 8 to Chemical formula 10; or at least one selected from the group consisting of the compounds represented by Chemical formula 14 to Chemical formula 16, higher effect is obtainable.

Further, in the case where the battery can 11 is made of a rigid metal, compared to a case that the battery can 11 is made of a soft film, the anode 22 is less likely to break in the case where the anode active material layer 22B is expanded or shrunk. Accordingly, the cycle characteristics are able to be further improved. In this case, in the case where the battery can 11 is made of iron that is more rigid than aluminum, higher effect is obtainable.

Effects of the secondary battery other than the foregoing effects are similar to those of the foregoing anode.

Second Secondary Battery

Figure 7:
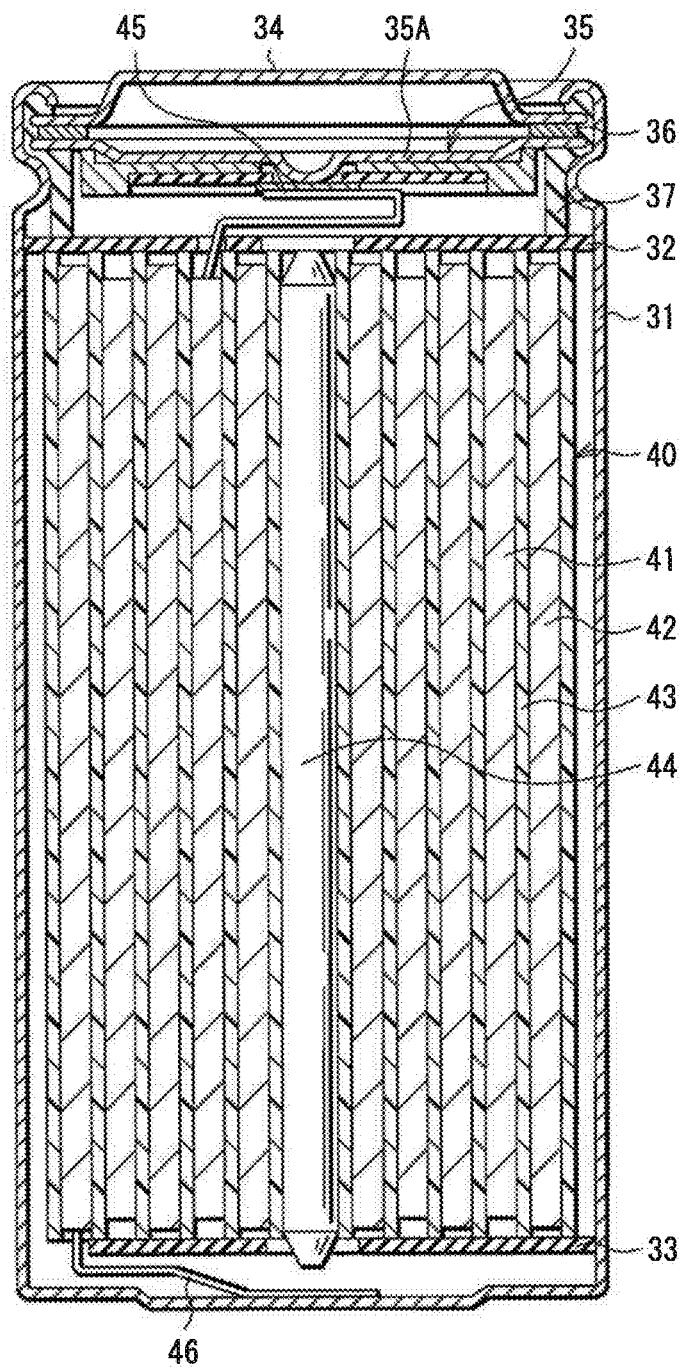
FIG. 7 is a cross sectional view illustrating a structure of a second secondary battery including the anode according to the embodiment of the invention.
Figure 8:
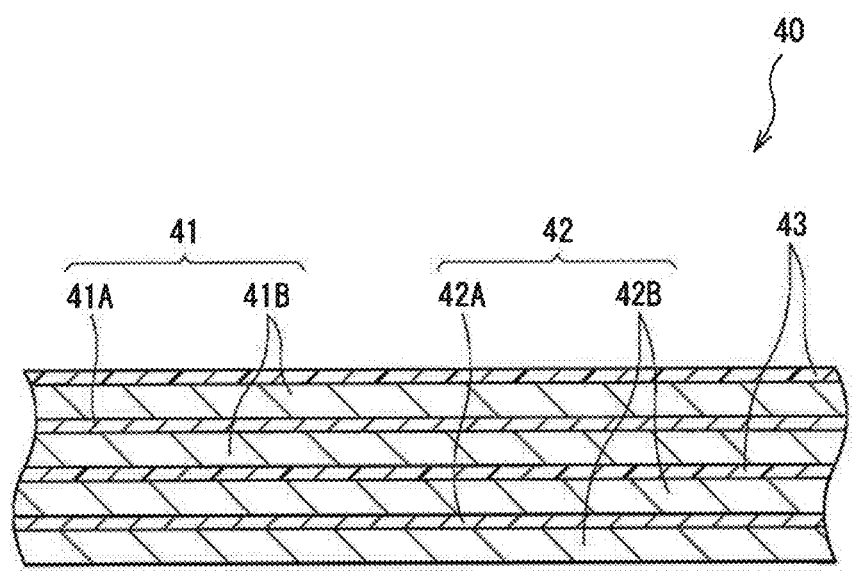
FIG. 8 is a cross sectional view illustrating an enlarged part of the spirally wound electrode body illustrated in FIG. 7.

FIG. 7 and FIG. 8 illustrate a cross sectional structure of a second secondary battery. FIG. 8 illustrates an enlarged part of a spirally wound electrode body 40 illustrated in FIG. 7. The second secondary battery is, for example, a lithium ion secondary battery as the foregoing first secondary battery. The second secondary battery contains the spirally wound electrode body 40 in which a cathode 41 and an anode 42 are layered with a separator 43 in between and spirally wound, and a pair of insulating plates 32 and 33 inside a battery can 31 in the shape of an approximately hollow cylinder. The battery structure including the battery can 31 is a so-called cylindrical type.

The battery can 31 is made of, for example, a metal material similar to that of the battery can 11 in the foregoing first secondary battery. One end of the battery can 31 is closed, and the other end thereof is opened. The pair of insulating plates 32 and 33 is arranged to sandwich the spirally wound electrode body 40 in between and to extend perpendicularly to the spirally wound periphery face.

At the open end of the battery can 31, a battery cover 34, and a safety valve mechanism 35 and a PTC (Positive Temperature Coefficient) device 36 provided inside the battery cover 34 are attached by being caulked with a gasket 37. Inside of the battery can 31 is thereby hermetically sealed. The battery cover 34 is made of, for example, a metal material similar to that of the battery can 31. The safety valve mechanism 35 is electrically connected to the battery cover 34 through the PTC device 36. In the safety valve mechanism 35, in the case where the internal pressure becomes a certain level or more by internal short circuit, external heating or the like, a disk plate 35A flips to cut the electric connection between the battery cover 34 and the spirally wound electrode body 40. As a temperature rises, the PTC device 36 increases the resistance and thereby limits a current to prevent abnormal heat generation resulting from a large current. The gasket 37 is made of, for example, an insulating material and its surface is coated with asphalt.

A center pin 44 may be inserted in the center of the spirally wound electrode body 40. In the spirally wound electrode body 40, a cathode lead 45 made of a metal material such as aluminum is connected to the cathode 41, and an anode lead 46 made of a metal material such as nickel is connected to the anode 42. The cathode lead 45 is electrically connected to the battery cover 34 by being welded to the safety valve mechanism 35. The anode lead 46 is welded and thereby electrically connected to the battery can 31.

The cathode 41 has a structure in which, for example, a cathode active material layer 41B is provided on both faces of a cathode current collector 41A having a pair of faces. The anode 42 has a structure similar to that of the foregoing anode, for example, a structure in which an anode active material layer 42B is provided on both faces of an anode current collector 42A having a pair of faces. The structures of the cathode current collector 41A, the cathode active material layer 41B, the anode current collector 42A, the anode active material layer 42B, and the separator 43 and the composition of the electrolytic solution are respectively similar to the structures of the cathode current collector 21A, the cathode active material layer 21B, the anode current collector 22A, the anode active material layer 22B, and the separator 23, and the composition of the electrolytic solution in the foregoing first secondary battery.

The secondary battery is manufactured, for example, by the following procedure.

First, for example, the cathode 41 is formed by forming the cathode active material layer 41B on both faces of the cathode current collector 41A and the anode 42 is formed by forming the anode active material layer 42B on both faces of the anode current collector 42A with the use of procedures similar to the procedures of forming the cathode 21 and the anode 22 in the foregoing first secondary battery. Subsequently, the cathode lead 45 is attached to the cathode 41 by welding or the like, and the anode lead 46 is attached to the anode 42 by welding or the like. Subsequently, the cathode 41 and the anode 42 are layered with the separator 43 in between and spirally wound, and thereby the spirally wound electrode body 40 is formed. After that, the center pin 44 is inserted in the center of spirally wound electrode body. Subsequently, the spirally wound electrode body 40 is sandwiched between the pair of insulating plates 32 and 33, and contained in the battery can 31. The end of the cathode lead 45 is welded to the safety valve mechanism 35, and the end of the anode lead 46 is welded to the battery can 31. Subsequently, the electrolytic solution is injected into the battery can 31 and impregnated in the separator 43. Finally, at the open end of the battery can 31, the battery cover 34, the safety valve mechanism 35, and the PTC device 36 are fixed by being caulked with the gasket 37. The secondary battery illustrated in FIG. 7 and FIG. 8 is thereby completed.

In the secondary battery, when charged, for example, lithium ions are extracted from the cathode 41 and inserted in the anode 42 through the electrolytic solution. Meanwhile, when discharged, for example, lithium ions are extracted from the anode 42, and inserted in the cathode 41 through the electrolytic solution.

According to the cylindrical secondary battery, the anode 42 has the structure similar to that of the foregoing anode. Thus, the cycle characteristics and the swollenness characteristics are able to be improved. Effects of the secondary battery other than the foregoing effects are similar to those of the first secondary battery.

Third Secondary Battery

Figure 9:
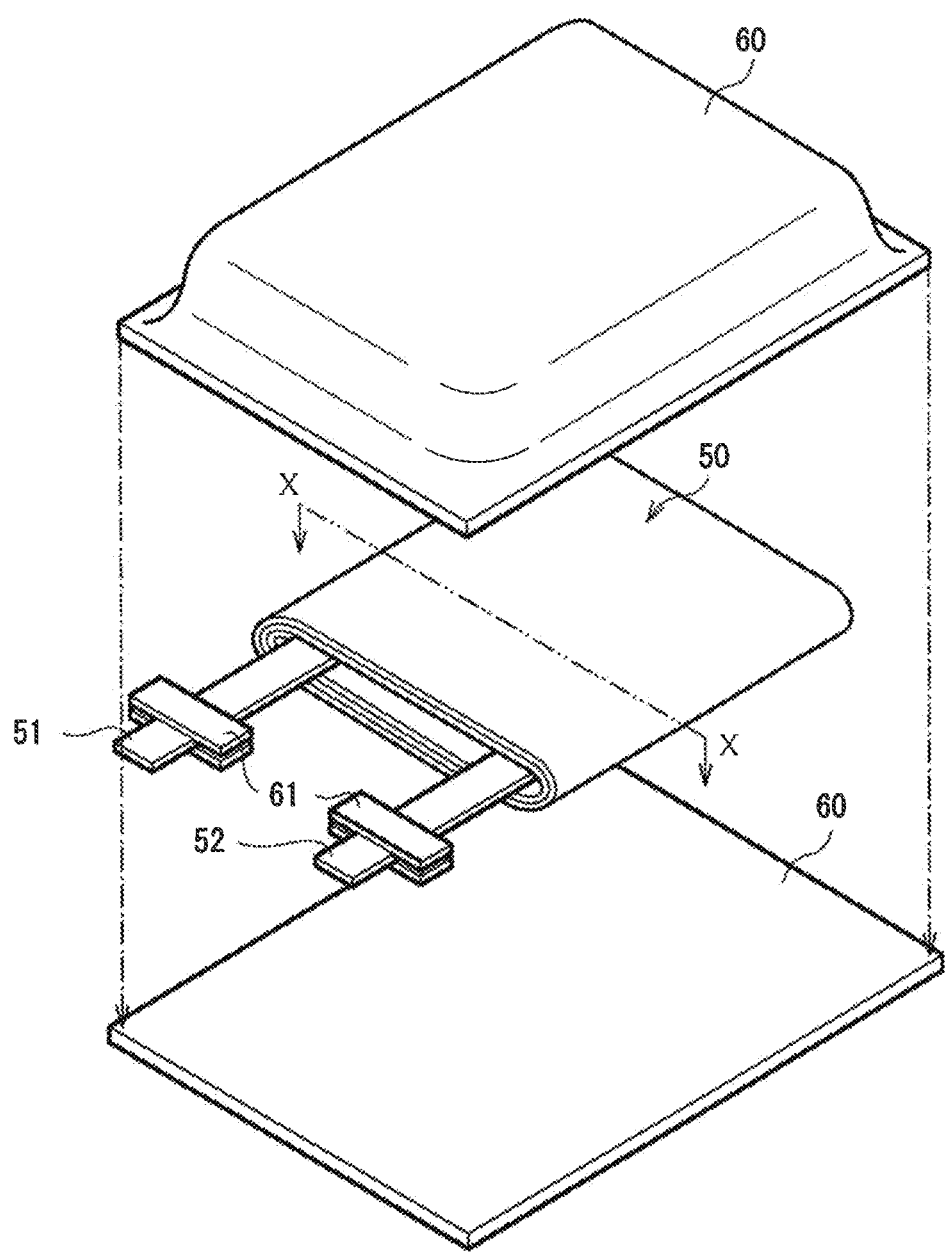
FIG. 9 is a cross sectional view illustrating a structure of a third secondary battery including the anode according to the embodiment of the invention.
Figure 10:
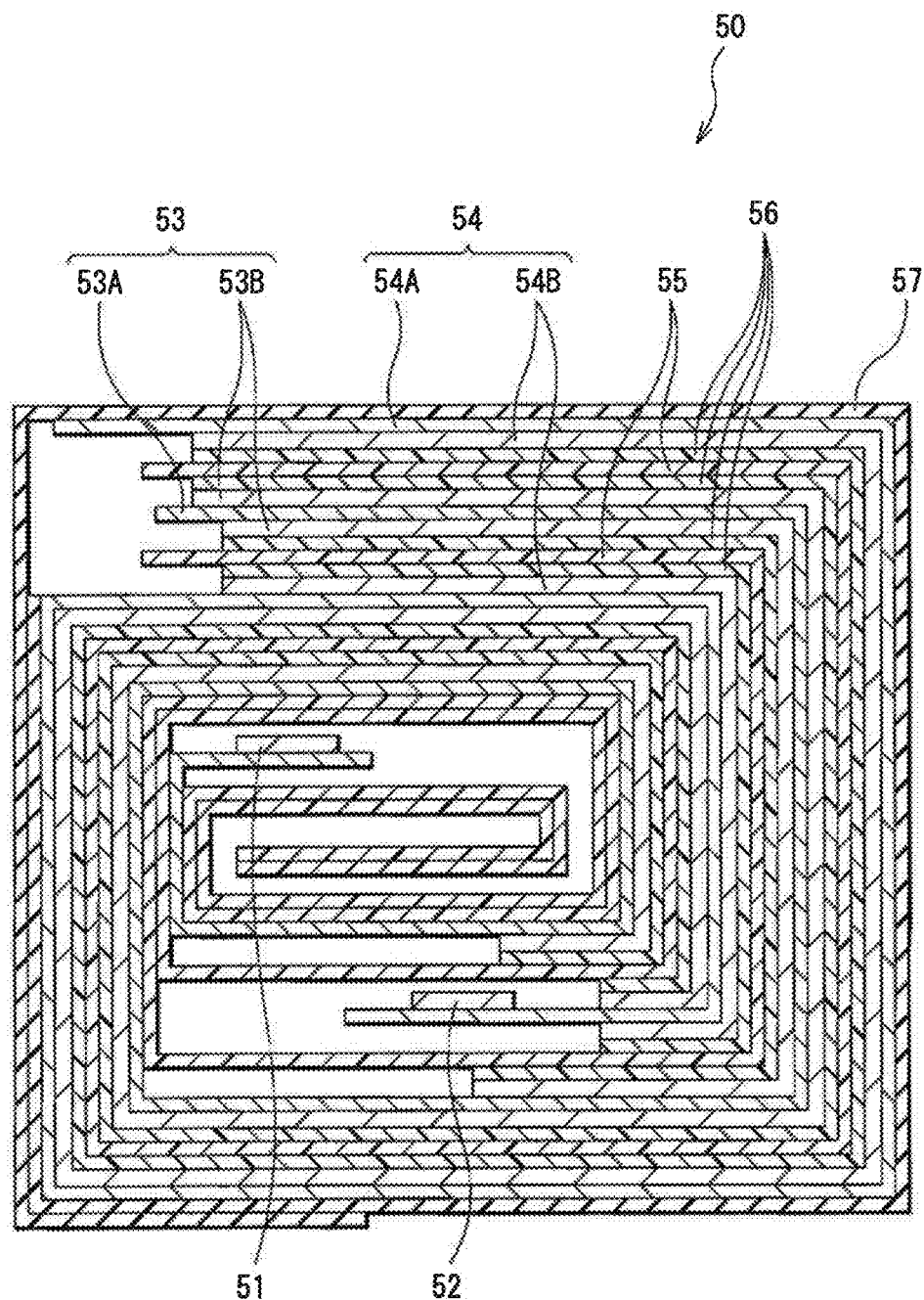
FIG. 10 is a cross sectional view taken along line X-X of the spirally wound electrode body illustrated in FIG. 9.

FIG. 9 illustrates an exploded perspective structure of a third secondary battery. FIG. 10 illustrates an enlarged cross section taken along line X-X illustrated in FIG. 9. The third secondary battery is, for example, a lithium ion secondary battery as the foregoing first secondary battery. In the third secondary battery, a spirally wound electrode body 50 on which a cathode lead 51 and an anode lead 52 are attached is contained in a film package member 60. The battery structure including the package member 60 is a so-called laminated film type.

The cathode lead 51 and the anode lead 52 are respectively directed from inside to outside of the package member 60 in the same direction, for example. The cathode lead 51 is made of, for example, a metal material such as aluminum, and the anode lead 52 is made of, for example, a metal material such as copper, nickel, and stainless. These metal materials are in the shape of a thin plate or mesh.

The package member 60 is made of an aluminum laminated film in which, for example, a nylon film, an aluminum foil, and a polyethylene film are bonded together in this order. The package member 60 has, for example, a structure in which the respective outer edges of 2 pieces of rectangle aluminum laminated films are bonded to each other by fusion bonding or an adhesive so that the polyethylene film and the spirally wound electrode body 50 are opposed to each other.

An adhesive film 61 to protect from entering of outside air is inserted between the package member 60 and the cathode lead 51, the anode lead 52. The adhesive film 61 is made of a material having adhesion to the cathode lead 51 and the anode lead 52. Examples of such a material include, for example, a polyolefin resin such as polyethylene, polypropylene, modified polyethylene, and modified polypropylene.

The package member 60 may be made of a laminated film having other lamination structure, a polymer film such as polypropylene, or a metal film, instead of the foregoing aluminum laminated film.

In the spirally wound electrode body 50, a cathode 53 and an anode 54 are layered with a separator 55 and an electrolyte 56 in between and spirally wound. The outermost periphery thereof is protected by a protective tape 57.

The cathode 53 has a structure in which, for example, a cathode active material layer 53B is provided on both faces of a cathode current collector 53A having a pair of faces. The anode 54 has a structure similar to that of the foregoing anode, for example, has a structure in which an anode active material layer 54B is provided on both faces of an anode current collector 54A having a pair of faces. The structures of the cathode current collector 53A, the cathode active material layer 53B, the anode current collector 54A, the anode active material layer 54B, and the separator 55 are respectively similar to those of the cathode current collector 21A, the cathode active material layer 21B, the anode current collector 22A, the anode active material layer 22B, and the separator 23 of the foregoing first secondary battery.

The electrolyte 56 is a so-called gel electrolyte, containing an electrolytic solution and a polymer compound that holds the electrolytic solution. The gel electrolyte is preferable, since high ion conductivity (for example, 1 mS/cm or more at room temperature) is obtained and liquid leakage is prevented.

As the polymer compound, for example, polyacrylonitrile, polyvinylidene fluoride, a copolymer of polyvinylidene fluoride and polyhexafluoropropylene, polytetrafluoroethylene, polyhexafluoropropylene, polyethylene oxide, polypropylene oxide, polyphosphazene, polysiloxane, polyvinyl acetate, polyvinyl alcohol, polymethylmethacrylate, polyacrylic acid, polymethacrylic acid, styrene-butadiene rubber, nitrile-butadiene rubber, polystyrene, polycarbonate or the like is included. One of these polymer compounds may be used singly, or two or more thereof may be used by mixture. Specially, polyacrylonitrile, polyvinylidene fluoride, polyhexafluoropropylene, polyethylene oxide or the like is preferably used, since such a compound is electrochemically stable.

The composition of the electrolytic solution is similar to the composition of the electrolytic solution in the first secondary battery. However, in the electrolyte 56 as the gel electrolyte, the solvent in the electrolytic solution means a wide concept including not only the liquid solvent but also a solvent having ion conductivity capable of dissociating the electrolyte salt. Therefore, in the case where the polymer compound having ion conductivity is used, the polymer compound is also included in the solvent.

Instead of the gel electrolyte 56 in which the electrolytic solution is held by the polymer compound, the electrolytic solution may be directly used. In this case, the electrolytic solution is impregnated in the separator 55.

The secondary battery including the gel electrolyte 56 is manufactured, for example, by the following three procedures.

In the first manufacturing method, first, for example, the cathode 53 is formed by forming the cathode active material layer 53B on both faces of the cathode current collector 53A, and the anode 54 is formed by forming the anode active material layer 54B on both faces of the anode current collector 54A by a procedure similar to the procedure of forming the cathode 21 and the anode 22 in the foregoing first secondary battery. Subsequently, a precursor solution containing an electrolytic solution, a polymer compound, and a solvent is prepared. After the cathode 53 and the anode 54 are coated with the precursor solution, the solvent is volatilized to form the gel electrolyte 56. Subsequently, the cathode lead 51 is attached to the cathode current collector 53A, and the anode lead 52 is attached to the anode current collector 54A. Subsequently, the cathode 53 and the anode 54 provided with the electrolyte 56 are layered with the separator 55 in between and spirally wound to obtain a laminated body. After that, the protective tape 57 is adhered to the outermost periphery thereof to form the spirally wound electrode body 50. Finally, for example, after the spirally wound electrode body 50 is sandwiched between 2 pieces of the film package members 60, outer edges of the package members 60 are contacted by thermal fusion bonding or the like to enclose the spirally wound electrode body 50. At this time, the adhesive films 61 are inserted between the cathode lead 51, the anode lead 52 and the package member 60. Thereby, the secondary battery illustrated in FIG. 9 and FIG. 10 is completed.

In the second manufacturing method, first, the cathode lead 51 is attached to the cathode 53, and the anode lead 52 is attached to the anode 54. Subsequently, the cathode 53 and the anode 54 are layered with the separator 55 in between and spirally wound. After that, the protective tape 57 is adhered to the outermost periphery thereof, and thereby a spirally wound body as a precursor of the spirally wound electrode body 50 is formed. Subsequently, after the spirally wound body is sandwiched between 2 pieces of the film package members 60, the outermost peripheries except for one side are bonded by thermal fusion bonding or the like to obtain a pouched state, and the spirally wound body is contained in the pouch-like package member 60. Subsequently, a composition of matter for electrolyte containing an electrolytic solution, a monomer as a raw material for the polymer compound, a polymerization initiator, and if necessary other material such as a polymerization inhibitor is prepared, which is injected into the pouch-like package member 60. After that, the opening of the package member 60 is hermetically sealed by thermal fusion bonding or the like. Finally, the monomer is thermally polymerized to obtain a polymer compound. Thereby, the gel electrolyte 56 is formed. Accordingly, the secondary battery is completed.

In the third manufacturing method, the spirally wound body is formed and contained in the pouch-like package member 60 in the same manner as that of the foregoing second manufacturing method, except that the separator 55 with both faces coated with a polymer compound is used firstly. As the polymer compound with which the separator 55 is coated, for example, a polymer containing vinylidene fluoride as a component, that is, a homopolymer, a copolymer, a multicomponent copolymer and the like are included. Specifically, polyvinylidene fluoride, a binary copolymer containing vinylidene fluoride and hexafluoropropylene as a component, a ternary copolymer containing vinylidene fluoride, hexafluoropropylene, and chlorotrifluoroethylene as a component and the like are included. As a polymer compound, in addition to the foregoing polymer containing vinylidene fluoride as a component, another one or more polymer compounds may be contained. Subsequently, an electrolytic solution is prepared and injected into the package member 60. After that, the opening of the package member 60 is sealed by thermal fusion bonding or the like. Finally, the resultant is heated while a weight is applied to the package member 60, and the separator 55 is contacted with the cathode 53 and the anode 54 with the polymer compound in between. Thereby, the electrolytic solution is impregnated into the polymer compound, and the polymer compound is gelated to form the electrolyte 56. Accordingly, the secondary battery is completed.

In the third manufacturing method, the swollenness of the secondary battery is prevented compared to the first manufacturing method. Further, in the third manufacturing method, the monomer, the solvent and the like as a raw material of the polymer compound are hardly remain in the electrolyte 56 compared to the second manufacturing method. In addition, the formation step of the polymer compound is favorably controlled. Thus, sufficient adhesion is obtained between the cathode 53/the anode 54/the separator 55 and the electrolyte 56.

According to the laminated film secondary battery, the anode 54 has the structure similar to that of the foregoing anode. Thus, the cycle characteristics and the initial charge and discharge characteristics are able to be improved. Effect of the secondary battery other than the foregoing effect is similar to that of the first secondary battery.

EXAMPLES

Examples of the invention will be described in detail.

Example 1-1

The laminated film secondary battery illustrated in FIG. 9 and FIG. 10 was manufactured by the following procedure. The secondary battery was manufactured as a lithium ion secondary battery in which the capacity of the anode 54 was expressed based on insertion and extraction of lithium.

First, the cathode 53 was formed. First, lithium carbonate ($Li_2CO_3$) and cobalt carbonate ($CoCO_3$) were mixed at a molar ratio of 0.5:1. After that, the mixture was fired in the air at 900 deg C. for 5 hours. Thereby, lithium cobalt complex oxide ($LiCoO_2$) was obtained. Subsequently, 91 parts by mass of the lithium cobalt complex oxide as a cathode active material, 6 parts by mass of graphite as a cathode electrical conductor, and 3 parts by mass of polyvinylidene fluoride as a cathode binder were mixed to obtain a cathode mixture. After that, the cathode mixture was dispersed in N-methyl-2-pyrrolidone to obtain paste cathode mixture slurry. Finally, both faces of the cathode current collector 53A made of a strip-shaped aluminum foil (thickness was 12 µm) were uniformly coated with the cathode mixture slurry, and which was dried. After that, the resultant was compression-molded by a roll pressing machine to form the cathode active material layer 53B.

Next, the anode 54 was formed. First, a roughened electrolytic copper foil (thickness was 18 µm, and ten point height of roughness profile Rz was 10 µm) as the anode current collector 54A and silicon powder (median size was 30 µm) as an anode active material were prepared. After that, both faces of the anode current collector 54A were sprayed with silicon powder in a melt state by using spraying method to form a plurality of anode active material particles and thereby the anode active material layer 54B was formed. In the spraying method, gas flame spraying was used, and the spraying rate was in the range from about 45 m/sec to about 55 m/sec, both inclusive. To prevent the anode current collector 54A from being thermally damaged, spraying was performed while the substrate was cooled with carbon dioxide gas. In forming the anode active material layer 54B, by introducing oxygen gas into a chamber, the oxygen content in the anode active material was set to 5 atomic %. Further, the plurality of anode active material particles contained a flat particle (flat particle was present), the anode active material layer 54B did not contain a portion not being contacted with the anode current collector 54A (noncontact portion did not present), and the anode active material layer 54B had therein a void (void was present). By adjusting the melting temperature of the silicon powder and the cooling temperature of the substrate, the half-width (2θ) of the diffraction peak in the (111) crystal plane of the anode active material obtained by X-ray diffraction was 20 deg, and the crystallite size originated in the same crystal plane was 10 nm. In performing the foregoing X-ray diffraction analysis, an X-ray diffraction device of Rigaku Corporation was used. At that time, CuKa was used as a tube, the tube voltage was 40 kV, the tube current was 40 mA, the scanning method was θ-2θ method, and the measurement range was 20 deg ≤2θ≤90 deg.

Next, ethylene carbonate (EC) and diethyl carbonate (DEC) were mixed as a solvent. After that, lithium hexafluorophosphate ($LiPF_6$) as an electrolyte salt was dissolved in the solvent to prepare an electrolytic solution. The solvent composition (EC:DEC) was 50:50 at a weight ratio. The content of the electrolyte salt to the solvent was 1 mol/kg.

Finally, the secondary battery was assembled by using the cathode 53, the anode 54, and the electrolytic solution. First, the cathode lead 51 made of aluminum was welded to one end of the cathode current collector 53A, and the anode lead 52 made of nickel was welded to one end of the anode current collector 54A. Subsequently, the cathode 53, the separator 55 (thickness was 23 μm) having a three-layer structure in which a film made of a microporous polyethylene as a main component was sandwiched between films primarily made of a microporous polypropylene, the anode 54, and the foregoing separator 55 were layered in this order and spirally wound in the longitudinal direction. After that, the end portion of the spirally wound body was fixed by the protective tape 57 made of an adhesive tape, and thereby a spirally wound body as a precursor of the spirally wound electrode body 50 was formed. Subsequently, the spirally wound body was sandwiched between the package members 60 made of a three-layer laminated film (total thickness was 100 μm) in which a nylon film (thickness was 30 μm), an aluminum foil (thickness was 40 μm), and a cast polypropylene film (thickness was 30 μm) were layered from the outside. After that, outer edges other than an edge of one side of the package members were thermally fusion-bonded to each other. Thereby, the spirally wound body was contained in the package members 60 in a pouched state. Subsequently, the electrolytic solution was injected through the opening of the package member 60, the electrolytic solution was impregnated in the separator 55, and thereby the spirally wound electrode body 50 was formed. Finally, the opening of the package member 60 was sealed by thermal fusion bonding in the vacuum atmosphere, and thereby the laminated film secondary battery was completed. In manufacturing the secondary battery, lithium metal was not precipitated on the anode 54 in the full charge state by adjusting the thickness of the cathode active material layer 53B.

For the secondary battery, the cycle characteristics and the initial charge and discharge characteristics described later were examined within a week after manufacturing the secondary battery.

Examples 1-2 to 1-10

A procedure was performed in the same manner as that of Example 1-1, except that the half-width and the crystallite size were respectively changed to 12 deg and 15 nm (Example 1-2), 5 deg and 20 nm (Example 1-3), 3 deg and 30 nm (Example 1-4), 2 deg and 50 nm (Example 1-5), 1 deg and 70 nm (Example 1-6), 0.9 deg and 100 nm (Example 1-7), 0.8 deg and 120 nm (Example 1-8), 0.7 deg and 135 nm (Example 1-9), or 0.6 deg and 150 nm (Example 1-10).

Examples 1-11 and 1-12

A procedure was performed in the same manner as that of Example 1-6, except that the cycle characteristics and the initial charge and discharge characteristics were examined two weeks after manufacturing the secondary battery (Example 1-11) or a month after manufacturing the secondary battery (Example 1-12).

Comparative examples 1-1 to 1-5

A procedure was performed in the same manner as that of Example 1-1, except that the half-width and the crystallite size were respectively changed to 30 deg and 1 nm (Comparative example 1-1), 27 deg and 2 nm (Comparative example 1-2), 25 deg and 5 nm (Comparative example 1-3), 23 deg and 7 nm (Comparative example 1-4), or 21 deg and 9 nm (Comparative example 1-5).

Comparative examples 1-6 and 1-7

A procedure was performed in the same manner as that of Comparative example 1-1, except that the cycle characteristics and the initial charge and discharge characteristics were examined two weeks after manufacturing the secondary battery (Comparative example 1-6) or a month after manufacturing the secondary battery (Comparative example 1-7).

The cycle characteristics, the initial charge and discharge characteristics, and the temporal change for the secondary batteries of Examples 1-1 to 1-12 and Comparative examples 1-1 to 1-7 were examined. The results illustrated in Table 1, Table 2, FIG. 11, and FIG. 12 were obtained.

In examining the cycle characteristics, a cycle test was performed, and thereby the discharge capacity retention ratio was obtained. Specifically, first, to stabilize the battery state, after charge and discharge were performed in the atmosphere at 23 deg C., charge and discharge were performed again. Thereby, the discharge capacity at the second cycle was measured. Subsequently, the secondary battery was charged and discharged 99 cycles in the same atmosphere, and thereby the discharge capacity at the 101st cycle was measured. Finally, the discharge capacity retention ratio (%)=(discharge capacity at the 101st cycle/discharge capacity at the second cycle)×100 was calculated. The charge condition was as follows. That is, after charge was performed at the constant current density of 3 $mA/cm^2$ until the battery voltage reached 4.2 V, charge was continuously performed at the constant voltage of 4.2 V until the battery density reached 0.3 $mA/cm^2$. The discharge conditions were as follows. That is, discharge was performed at the constant current density of 3 $mA/cm^2$ until the battery voltage reached 2.5 V.

In examining the initial charge and discharge characteristics, first, to stabilize the battery state, after charge and discharge were performed in the atmosphere at 23 deg C., charge was performed again, and the charge capacity was measured. Subsequently, discharge was performed in the same atmosphere and the discharge capacity was measured. Finally, the initial charge and discharge efficiency (%)= (discharge capacity/charge capacity)×100 was calculated.

The charge and discharge conditions were similar to those of the case examining the cycle characteristics.

The procedures and the conditions in examining the cycle characteristics and the initial charge and discharge characteristics are similarly applied to evaluating the same characteristics for the following examples and comparative examples.

Examples 1-1 to 1-10 in which the half-width was 20 deg or less and the crystallite size was 10 nm or more, the crystal state of the anode active material was crystalline. In Comparative examples 1-1 to 1-5 in which the half-width was over 20 deg and the crystallite size was under 10 nm, the crystal state of the anode active material was noncrystalline (amorphous).

TABLE 1

Anode active material: silicon (spraying method)
Ten point height of roughness profile Rz: 10 μm
Oxygen content in the anode active material: 5 atomic %

| | Anode active material layer | | | | | | | |
|---|---|---|---|---|---|---|---|---|
| | Crystal state | Half-width (deg) | Crystallite size (nm) | Flat particle | Noncontact portion | Void | Median size of formation material (μm) | Discharge capacity retention ratio (%) | Initial charge and discharge efficiency (%) |
| Example 1-1 | Crystalline | 20 | 10 | Present | Not present | Present | 30 | 83.5 | 84 |
| Example 1-2 | | 12 | 15 | | | | | 85.5 | 88 |
| Example 1-3 | | 5 | 20 | | | | | 90 | 90 |
| Example 1-4 | | 3 | 30 | | | | | 90.5 | 92 |
| Example 1-5 | | 2 | 50 | | | | | 91 | 93 |
| Example 1-6 | | 1 | 70 | | | | | 91.3 | 94 |
| Example 1-7 | | 0.9 | 100 | | | | | 90.9 | 93 |
| Example 1-8 | | 0.8 | 120 | | | | | 90.4 | 92 |
| Example 1-9 | | 0.7 | 135 | | | | | 90.2 | 91 |
| Example 1-10 | | 0.6 | 150 | | | | | 90 | 90 |
| Comparative example 1-1 | Amorphous | 30 | 1 | Present | Not present | Present | 30 | 73 | 78 |
| Comparative example 1-2 | | 27 | 2 | | | | | 74 | 78.5 |
| Comparative example 1-3 | | 25 | 5 | | | | | 75 | 78.8 |
| Comparative example 1-4 | | 23 | 7 | | | | | 78 | 79 |
| Comparative example 1-5 | | 21 | 9 | | | | | 79 | 79.5 |

TABLE 2

Anode active material: silicon (spraying method)
Ten point height of roughness profile Rz: 10 μm
Oxygen content in the anode active material: 5 atomic %

| | Anode active material layer | | | | | | | | |
|---|---|---|---|---|---|---|---|---|---|
| | Crystal state | Half-width (deg) | Crystallite size (nm) | Flat particle | Noncontact portion | Void | Median size of formation material (μm) | Temporal condition | Discharge capacity retention ratio (%) | Initial charge and discharge efficiency (%) |
| Example 1-6 | Crystalline | 1 | 70 | Present | Not present | Present | 30 | Within 1 week | 91.3 | 94 |
| Example 1-11 | | | | | | | | After 2 weeks | 91.3 | 94 |
| Example 1-12 | | | | | | | | After 1 month | 91.3 | 94 |
| Comparative example 1-1 | Amorphous | 30 | 1 | Present | Not present | Present | 30 | Within 1 week | 73 | 78 |
| Comparative example 1-6 | | | | | | | | After 2 weeks | 72 | 75 |
| Comparative example 1-7 | | | | | | | | After 1 month | 65 | 71 |

Figure 11:
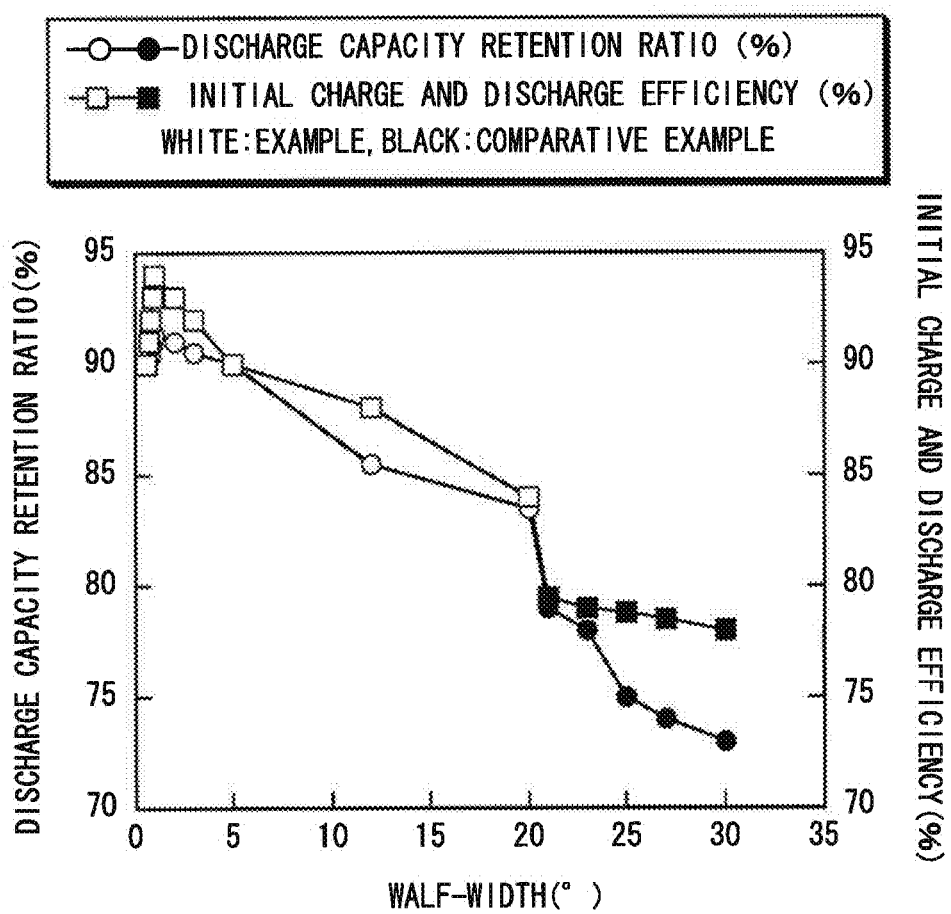
FIG. 11 is a diagram illustrating a relation between a half-width and a discharge capacity retention ratio/initial charge and discharge efficiency.
Figure 12:
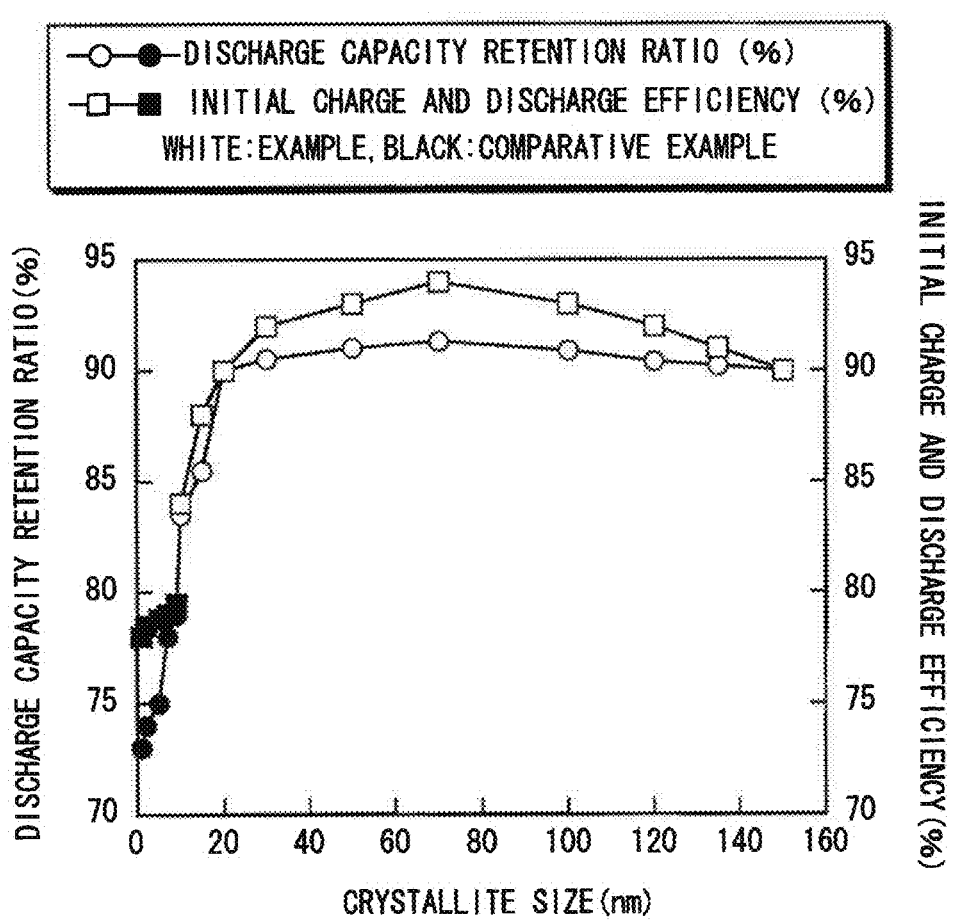
FIG. 12 is a diagram illustrating a relation between a crystallite size and a discharge capacity retention ratio/initial charge and discharge efficiency.

As illustrated in Table 1, Table 2, FIG. 11, and FIG. 12, there was a tendency that as the half-width became smaller and the crystallite size became larger, both the discharge capacity retention ratio and the initial charge and discharge efficiency were increased and then decreased. In this case, in Focusing attention on effect of the crystal state of the anode active material (half-width and crystallite size) on the discharge capacity retention ratio and the initial charge and discharge efficiency, in Examples 1-1 to 1-10 in which the crystal state was crystalline, a high discharge capacity retention ratio of 80% or more and high initial charge and discharge efficiency of 80% or more were obtained compared to Comparative examples 1-1 to 1-5 in which the crystal state was amorphous. In particular, in Examples 1-1 to 1-10, in the case where the half-width was 5 deg or less and the crystallite size was 20 nm or more, a significantly high discharge capacity retention ratio of 90% or more and significantly high initial charge and discharge efficiency of 90% or more were obtained. In this case, in the case where the half-width was in the range from 0.9 deg to 5 deg, both inclusive, and the crystallite size was in the range from 20 nm to 100 nm, both inclusive, the crystallite size was not excessively large and thus the probability of breakage such as break of the anode active material was low in charge and discharge.

Further, focusing attention on temporal change of the discharge capacity retention ratio and the initial charge and discharge efficiency, in Comparative examples 1-1, 1-6, and 1-7 in which the crystal state was amorphous, as time passed, both the discharge capacity retention ratio and the initial charge and discharge efficiency were lowered. Meanwhile, in Examples 1-6, 1-11, and 1-12 in which the crystal state was crystalline, as time passed, the discharge capacity retention ratio and the initial charge and discharge efficiency were constant.

The foregoing results showed that in the case where the anode active material had crystallinity, the anode active material layer 54B was less likely to expand and shrink in charge and discharge, and thus the discharge capacity retention ratio and the initial charge and discharge efficiency were increased. Further, the foregoing results showed that since the physical property of the anode active material having crystallinity was less likely to change with time, both the discharge capacity retention ratio and the initial charge and discharge efficiency were less likely to deteriorate with time.

Accordingly, it was confirmed that in the secondary battery of the embodiment of the invention, by forming the anode active material layer 54B containing the crystalline anode active material having silicon as an element so that the anode active material layer 54B was linked to the anode current collector 54A by spraying method, the cycle characteristics and the initial charge and discharge characteristics were improved, and the deterioration with time thereof was prevented. In this case, in the case where the half-width (2θ) of the diffraction peak in (111) crystal plane of the anode active material obtained by X-ray diffraction was 20 deg or less and the crystallite size was 10 nm or more, or preferably in the range from 0.9 deg to 5 deg, both inclusive, and in the range from 20 nm to 100 nm, both inclusive, the crystallinity of the anode active material was secured, and both characteristics were further improved while breakage of the anode active material layer 54B was prevented.

Comparative examples 2-1 to 2-4

A procedure was performed in the same manner as that of Example 1-1, except that the anode active material layer was formed by using evaporation method (deflection electron beam evaporation method), and the half-width and the crystallite size were respectively changed to 30 deg and 1 nm (Comparative example 2-1), 27 deg and 2 nm (Comparative example 2-2), 25 deg and 4 nm (Comparative example 2-3), or 21 deg and 8 nm (Comparative example 2-4). Silicon with purity of 99% was used as an evaporation source, the deposition rate was 100 nm/sec, and the thickness of the anode active material layer was 12 μm.

Comparative examples 2-5 and 2-6

A procedure was performed in the same manner as that of Example 1-1, except that the anode active material layer was formed by using sputtering method (RF magnetron sputtering method), and the half-width and the crystallite size were respectively changed to 26 deg and 3 nm (Comparative example 2-5) or 22 deg and 9 nm (Comparative example 2-6). Silicon with purity of 99.99% was used as a target, the deposition rate was 0.5 nm/sec, and the thickness of the anode active material layer was 12 μm.

Comparative examples 2-7 and 2-8

A procedure was performed in the same manner as that of Example 1-1, except that the anode active material layer was formed by using CVD method, and the half-width and the crystallite size were respectively changed to 25 deg and 5 nm (Comparative example 2-7) or 21 deg and 9 nm (Comparative example 2-8). Silane ($SiH_4$) and argon (Ar) were respectively used as a raw material and excitation gas, the deposition rate was 1.5 nm/sec, the substrate temperature was 200 deg C., and the thickness of the anode active material layer was 11 μm.

The cycle characteristics and the initial charge and discharge characteristics for the secondary batteries of Comparative examples 2-1 to 2-8 were examined. The results shown in Table 3 were obtained.

TABLE 3

Anode active material: silicon
Ten point height of roughness profile Rz: 10 μm
Oxygen content in the anode active material: 5 atomic %

| | Anode active material layer | | | | | | | | |
|---|---|---|---|---|---|---|---|---|---|
| | Crystal state | Half-width (deg) | Crystallite size (nm) | Flat particle | Noncontact portion | Void | Median size of formation material (μm) | Formation method | Discharge capacity retention ratio (%) | Initial charge and discharge efficiency (%) |
| Example 1-1 | Crystalline | 20 | 10 | Present | Not present | Present | 30 | Spraying method | 83.5 | 84 |
| Example 1-2 | | 12 | 15 | | | | | | 85.5 | 88 |
| Example 1-3 | | 5 | 20 | | | | | | 90 | 90 |
| Example 1-4 | | 3 | 30 | | | | | | 90.5 | 92 |
| Comparative example 2-1 | Amorphous | 30 | 1 | — | — | — | — | Evaporation method | 70 | 77 |
| Comparative example 2-2 | | 27 | 2 | | | | | | 71 | 77.3 |

TABLE 3-continued

Anode active material: silicon
Ten point height of roughness profile Rz: 10 μm
Oxygen content in the anode active material: 5 atomic %

| | Anode active material layer | | | | | | | | |
|---|---|---|---|---|---|---|---|---|---|
| | Crystal state | Half-width (deg) | Crystallite size (nm) | Flat particle | Noncontact portion | Void | Median size of formation material (μm) | Formation method | Discharge capacity retention ratio (%) | Initial charge and discharge efficiency (%) |
| Comparative example 2-3 | | 25 | 4 | | | | | | 73 | 77.5 |
| Comparative example 2-4 | | 21 | 8 | | | | | | 76 | 78 |
| Comparative example 2-5 | | 26 | 3 | | | | | Sputtering method | 71 | 76.2 |
| Comparative example 2-6 | | 22 | 9 | | | | | | 74 | 77 |
| Comparative example 2-7 | | 25 | 5 | | | | | CVD method | 74 | 77.5 |
| Comparative example 2-8 | | 21 | 9 | | | | | | 77 | 78 |

As shown in Table 3, in Comparative examples 2-1 to 2-8 in which evaporation method or the like was used, the crystal state of the anode active material became amorphous differently from Examples 1-1 to 1-4 in which spraying method was used. Thus, as in the results of Table 1, in Examples 1-1 to 1-4 in which the crystal state of the anode active material was crystalline, a higher discharge capacity retention ratio and higher initial charge and discharge efficiency were obtained compared to Comparative examples 2-1 to 2-8 in which the crystal state of the anode active material was amorphous. Such results showed that in the case where evaporation method or the like was used as a method of forming the anode active material layer 54B, the crystal state of the anode active material was not crystalline, and thus a sufficient discharge capacity retention ratio and sufficient initial charge and discharge efficiency were not obtained.

Accordingly, it was confirmed that in the secondary battery of the embodiment of the invention, it was confirmed that in the case where spraying method was used as a method of forming the anode active material layer 54B, the cycle characteristics and the initial charge and discharge characteristics were more improved than in the case where evaporation method or the like was used.

Examples 2-1 to 2-3

A procedure was performed in the same manner as that of Examples 1-5 to 1-7, except that the plurality of anode active material particles did not contain the flat particle.

The cycle characteristics and the initial charge and discharge characteristics for the secondary batteries of Examples 2-1 to 2-3 were examined. The results shown in Table 4 were obtained.

TABLE 4

Anode active material: silicon (spraying method)
Ten point height of roughness profile Rz: 10 μm
Oxygen content in the anode active material: 5 atomic %

| | Anode active material layer | | | | | | | | |
|---|---|---|---|---|---|---|---|---|---|
| | Crystal state | Half-width (deg) | Crystallite size (nm) | Flat particle | Noncontact portion | Void | Median size of formation material (μm) | Discharge capacity retention ratio (%) | Initial charge and discharge efficiency (%) |
| Example 1-5 | Crystalline | 2 | 50 | Present | Not present | Present | 30 | 91 | 93 |
| Example 1-6 | | 1 | 70 | | | | | 91.3 | 94 |
| Example 1-7 | | 0.9 | 100 | | | | | 90.9 | 93 |
| Example 2-1 | | 2 | 50 | Not present | | | | 86.2 | 88 |
| Example 2-2 | | 1 | 70 | | | | | 85.9 | 89 |
| Example 2-3 | | 0.9 | 100 | | | | | 85.7 | 88 |
| Comparative example 1-1 | Amorphous | 30 | 1 | Present | Not present | Present | 30 | 73 | 78 |
| Comparative example 1-2 | | 27 | 2 | | | | | 74 | 78.5 |
| Comparative example 1-3 | | 25 | 5 | | | | | 75 | 78.8 |
| Comparative example 1-4 | | 23 | 7 | | | | | 78 | 79 |
| Comparative example 1-5 | | 21 | 9 | | | | | 79 | 79.5 |

As shown in Table 4, in the case where the plurality of anode active material particles did not contain the flat particle, results similar to those of Table 1 were obtained as well. That is, as in Examples 1-5 to 1-7, in Examples 2-1 to 2-3 in which the crystal state of the anode active material was crystalline, a higher discharge capacity retention ratio of 80% or more and higher initial charge and discharge efficiency of 80% or more were obtained compared to Comparative examples 1-1 to 1-5.

In particular, in the case where the crystal state of the anode active material was crystalline, in Examples 1-5 to 1-7 in which the flat particle was contained, the discharge capacity retention ratio and the initial charge and discharge characteristics were higher than those of Examples 2-1 to 2-3 in which the flat particle was not contained.

Accordingly, it was confirmed that in the secondary battery of the embodiment of the invention, the cycle characteristics and the initial charge and discharge characteristics were improved irrespective of presence of the flat particle. It was also confirmed that in this case, in the case where the flat particle was contained, both characteristics were further improved.

Example 3

A procedure was performed in the same manner as that of Example 1-6, except that the anode active material layer 54B contained a noncontact portion.

The cycle characteristics and the initial charge and discharge characteristics for the secondary battery of Example 3 were examined. The results shown in Table 5 were obtained.

For the secondary batteries of Examples 1-6 and 3, change of the anode current collector state after the cycle test was examined. In this case, the secondary battery after the cycle test was disassembled, and whether or not deformation such as a wrinkle was generated in the anode current collector 54A was visually observed.

charge and discharge efficiency of 80% or more were obtained compared to Comparative examples 1-1 to 1-5.

In particular, in the case where the crystal state of the anode active material was crystalline, in Example 1-6 in which the noncontact portion was not included, the discharge capacity retention ratio and the initial charge and discharge efficiency were higher than those of Example 3 in which the noncontact portion was included. In this case, in Example 3 in which the noncontact portion was included, deformation of the anode current collector 54A was not observed. Meanwhile, in Example 1-6 in which the noncontact portion was not included, slight allowable deformation of the anode current collector 54A was observed.

Accordingly, it was confirmed that in the secondary battery of the embodiment of the invention, it was confirmed that the cycle characteristics and the initial charge and discharge characteristics were improved irrespective of presence of the noncontact portion. It was also confirmed that in this case, in the case where the noncontact portion was not included, both characteristics were further improved. It was also confirmed that in the case where the noncontact portion was included, deformation of the anode current collector 54A was prevented.

Example 4

A procedure was performed in the same manner as that of Example 1-6, except that the anode active material layer 54B did not have a void.

The cycle characteristics and the initial charge and discharge characteristics for the secondary battery of Example 4 were examined. The results shown in Table 6 were obtained.

For the secondary batteries of Examples 1-6 and 4, the swollenness characteristics were also examined. Specifically, first, to stabilize the battery state, after charge and discharge were performed in the atmosphere at 23 deg C.,

TABLE 5

Anode active material: silicon (spraying method)
Ten point height of roughness profile Rz: 10 μm
Oxygen content in the anode active material: 5 atomic %

| | | | Anode active material layer | | | | | | |
|---|---|---|---|---|---|---|---|---|---|
| | Crystal state | Half-width (deg) | Crystallite size (nm) | Flat particle | Noncontact portion | Void | Median size of formation material (μm) | Discharge capacity retention ratio (%) | Initial charge and discharge efficiency (%) | Deformation of anode current collector |
| Example 1-6 | Crystalline | 1 | 70 | Present | Not present | Present | 30 | 91.3 | 94 | Present |
| Example 3 | | | | | Present | | | 91 | 88 | Not present |
| Comparative example 1-1 | Amorphous | 30 | 1 | Present | Not present | Present | 30 | 73 | 78 | — |
| Comparative example 1-2 | | 27 | 2 | | | | | 74 | 78.5 | — |
| Comparative example 1-3 | | 25 | 5 | | | | | 75 | 78.8 | — |
| Comparative example 1-4 | | 23 | 7 | | | | | 78 | 79 | — |
| Comparative example 1-5 | | 21 | 9 | | | | | 79 | 79.5 | — |

As shown in Table 5, in the case where the anode active material layer 54B contained the noncontact portion, results similar to those of Table 1 were obtained as well. That is, as in Example 1-6, in Example 3 in which the crystal state of the anode active material was crystalline, a higher discharge capacity retention ratio of 80% or more and higher initial the thickness before the cycle test was measured. Subsequently, after the foregoing cycle test was performed, the thickness after the cycle test was measured. Finally, the swollenness ratio (%)=[(thickness after the cycle test−thickness before the cycle test)/thickness before the cycle test]× 100 was calculated.

TABLE 6

Anode active material: silicon (spraying method)
Ten point height of roughness profile Rz: 10 μm
Oxygen content in the anode active material: 5 atomic %

| | Anode active material layer | | | | | | | | | |
|---|---|---|---|---|---|---|---|---|---|---|
| | Crystal state | Half-width (deg) | Crystallite size (nm) | Flat particle | Noncontact portion | Void | Median size of formation material (μm) | Discharge capacity retention ratio (%) | Initial charge and discharge efficiency (%) | Swollenness ratio (%) |
| Example 1-6 | Crystalline | 1 | 70 | Present | Not present | Present | 30 | 91.3 | 94 | 0.1 |
| Example 4 | | | | | | Not present | | 91.2 | 94 | 0.8 |
| Comparative example 1-1 | Amorphous | 30 | 1 | Present | Not present | Present | 30 | 73 | 78 | — |
| Comparative example 1-2 | | 27 | 2 | | | | | 74 | 78.5 | — |
| Comparative example 1-3 | | 25 | 5 | | | | | 75 | 78.8 | — |
| Comparative example 1-4 | | 23 | 7 | | | | | 78 | 79 | — |
| Comparative example 1-5 | | 21 | 9 | | | | | 79 | 79.5 | — |

As shown in Table 6, in the case where the anode active material layer 54B did not have a void, results similar to those of Table 1 were obtained as well. That is, as in Example 1-6, in Example 4 in which the crystal state of the anode active material was crystalline, a higher discharge capacity retention ratio of 80% or more and higher initial charge and discharge efficiency of 80% or more were obtained compared to Comparative examples 1-1 to 1-5.

In particular, in the case where the crystal state of the anode active material was crystalline, in Example 1-6 in which the void existed, the discharge capacity retention ratio was higher and the swollenness ratio was smaller than those of Example 4 in which the void did not exist.

Accordingly, it was confirmed that in the secondary battery of the embodiment of the invention, it was confirmed that the cycle characteristics and the initial charge and discharge characteristics were improved irrespective of presence of the void. It was also confirmed that in this case, in the case where the void existed, the characteristics were further improved, and the swollenness characteristics were improved as well.

Examples 5-1 to 5-9

A procedure was performed in the same manner as that of Example 1-6, except that the oxygen content in the anode active material was changed to 0.5 atomic % (Example 5-1), 1 atomic % (Example 5-2), 1.5 atomic % (Example 5-3), 2 atomic % (Example 5-4), 10 atomic % (Example 5-5), 20 atomic % (Example 5-6), 30 atomic % (Example 5-7), 40 atomic % (Example 5-8), or 45 atomic % (Example 5-9). The oxygen content was changed by adjusting the amount of oxygen gas introduced into a chamber.

The cycle characteristics and the initial charge and discharge characteristics for the secondary batteries of Examples 5-1 to 5-9 were examined. The results illustrated in Table 7 and FIG. 13 were obtained.

TABLE 7

Anode active material: silicon (spraying method)
Ten point height of roughness profile Rz: 10 μm

| | Anode active material layer | | | | | | | | | |
|---|---|---|---|---|---|---|---|---|---|---|
| | Crystal state | Half-width (deg) | Crystallite size (nm) | Oxygen content (atomic %) | Flat particle | Noncontact portion | Void | Median size of formation material (μm) | Discharge capacity retention ratio (%) | Initial charge and discharge efficiency (%) |
| Example 5-1 | Crystalline | 1 | 70 | 0.5 | Present | Not present | Present | 30 | 85 | 94 |
| Example 5-2 | | | | 1 | | | | | 87 | 94 |
| Example 5-3 | | | | 1.5 | | | | | 90 | 94 |
| Example 5-4 | | | | 2 | | | | | 90.5 | 94 |
| Example 1-6 | | | | 5 | | | | | 90.8 | 94 |
| Example 5-5 | | | | 10 | | | | | 91.3 | 94 |
| Example 5-6 | | | | 20 | | | | | 91.3 | 92 |
| Example 5-7 | | | | 30 | | | | | 91.4 | 91 |
| Example 5-8 | | | | 40 | | | | | 91.5 | 90 |
| Example 5-9 | | | | 45 | | | | | 91.6 | 85 |
| Comparative example 1-1 | Amorphous | 30 | 1 | 5 | Present | Not present | Present | 30 | 73 | 78 |
| Comparative example 1-2 | | 27 | 2 | | | | | | 74 | 78.5 |

TABLE 7-continued

Anode active material: silicon (spraying method)
Ten point height of roughness profile Rz: 10 μm

| | Anode active material layer | | | | | | | | |
|---|---|---|---|---|---|---|---|---|---|
| | Crystal state | Half-width (deg) | Crystallite size (nm) | Oxygen content (atomic %) | Flat particle | Noncontact portion | Void | Median size of formation material (μm) | Discharge capacity retention ratio (%) | Initial charge and discharge efficiency (%) |
| Comparative example 1-3 | | 25 | 5 | | | | | | 75 | 78.8 |
| Comparative example 1-4 | | 23 | 7 | | | | | | 78 | 79 |
| Comparative example 1-5 | | 21 | 9 | | | | | | 79 | 79.5 |

Figure 13:
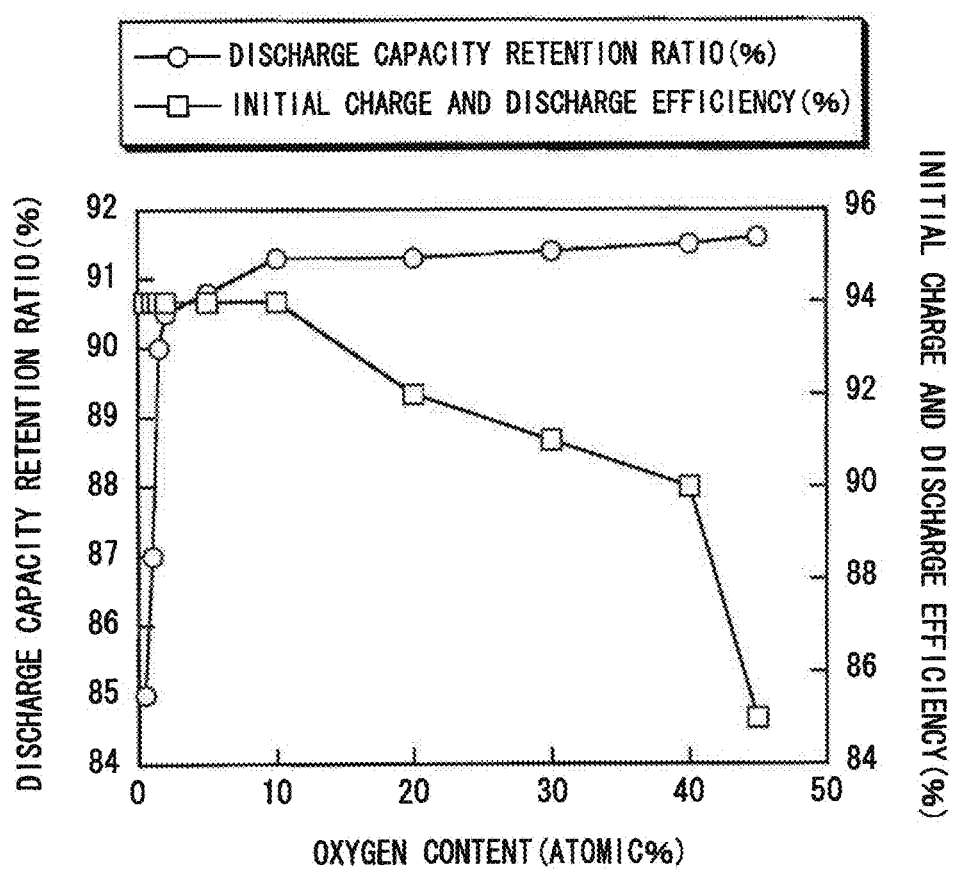
FIG. 13 is a diagram illustrating a relation between an oxygen content and a discharge capacity retention ratio/initial charge and discharge efficiency.

As illustrated in Table 7 and FIG. 13, in the case where the oxygen content in the anode active material was changed, results similar to those of Table 1 were obtained as well. That is, as in Example 1-6, in Examples 5-1 to 5-9 in which the crystal state of the anode active material was crystalline, a higher discharge capacity retention ratio of 80% or more and higher initial charge and discharge efficiency of 80% or more were obtained compared to Comparative examples 1-1 to 1-5.

In particular, in Examples 1-6 and 5-1 to 5-9 in which the crystal state of the anode active material was crystalline, there was a tendency that as the oxygen content was increased, the discharge capacity retention ratio was increased and the initial charge and discharge efficiency was decreased. In this case, in the case where the oxygen content was in the range from 1.5 atomic % to 40 atomic %, both inclusive, a higher discharge capacity retention ratio of 90% or more and higher initial charge and discharge efficiency of 90% or more were obtained.

Accordingly, it was confirmed that in the secondary battery of the embodiment of the invention, the cycle characteristics and the initial charge and discharge characteristics were improved irrespective of the oxygen content in the anode active material. It was also confirmed that in this case, in the case where the oxygen content was in the range from 1.5 atomic % to 40 atomic %, both inclusive, both characteristics were further improved.

Examples 6-1 to 6-3

A procedure was performed in the same manner as that of Example 1-6, except that the anode active material was formed so that the first oxygen-containing region and the second-oxygen containing region having an oxygen content higher than the oxygen content of the first oxygen-containing region were alternately layered by depositing silicon while intermittently introducing oxygen gas or the like into a chamber. The oxygen content in the second oxygen-containing region was 5 atomic %, and the number thereof was 1 (Example 6-1), 2 (Example 6-2), or 3 (Example 6-3).

The cycle characteristics and the initial charge and discharge characteristics for the secondary batteries of Examples 6-1 to 6-3 were examined. The results illustrated in Table 8 and FIG. 14 were obtained.

TABLE 8

Anode active material: silicon (spraying method)
Ten point height of roughness profile Rz: 10 μm
Oxygen content in the anode active material: 5 atomic %

| | Anode active material layer | | | | | | | | | |
|---|---|---|---|---|---|---|---|---|---|---|
| | Crystal state | Half-width (deg) | Crystallite size (nm) | Number of second oxygen-containing region | Flat particle | Noncontact portion | Void | Median size of formation material (μm) | Discharge capacity retention ratio (%) | Initial charge and discharge efficiency (%) |
| Example 1-6 | Crystalline | 1 | 70 | — | Present | Not present | Present | 30 | 91.3 | 94 |
| Example 6-1 | | | | 1 | | present | | | 91.8 | 94 |
| Example 6-2 | | | | 2 | | | | | 92.1 | 94 |
| Example 6-3 | | | | 3 | | | | | 92.5 | 94 |
| Comparative example 1-1 | Amorphous | 30 | 1 | 5 | Present | Not present | Present | 30 | 73 | 78 |
| Comparative example 1-2 | | 27 | 2 | | | | | | 74 | 78.5 |
| Comparative example 1-3 | | 25 | 5 | | | | | | 75 | 78.8 |
| Comparative example 1-4 | | 23 | 7 | | | | | | 78 | 79 |
| Comparative example 1-5 | | 21 | 9 | | | | | | 79 | 79.5 |

Figure 14:
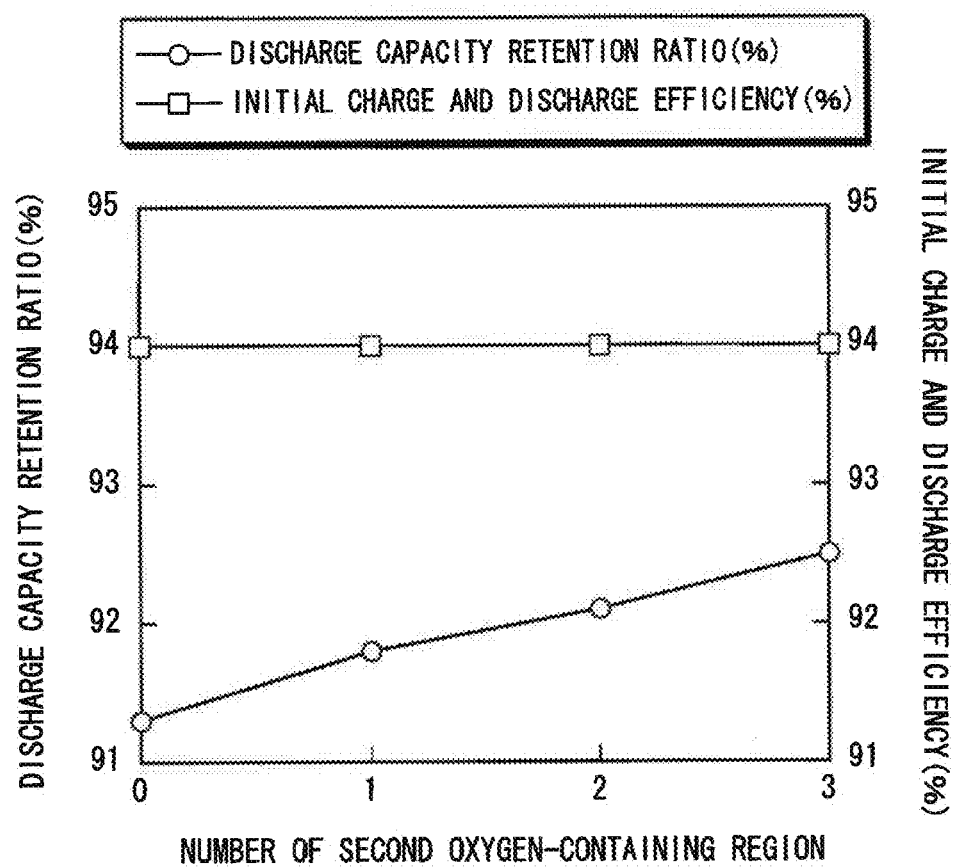
FIG. 14 is a diagram illustrating a relation between a number of a second oxygen-containing region and a discharge capacity retention ratio/initial charge and discharge efficiency.

As illustrated in Table 8 and FIG. 14, in the case where the anode active material had the first and the second oxygen-containing regions, results similar to those of Table 1 were obtained as well. That is, as in Example 1-6, in Examples 6-1 to 6-3 in which the crystal state of the anode active material was crystalline, a higher discharge capacity retention ratio of 80% or more and higher initial charge and discharge efficiency of 80% or more were obtained compared to Comparative examples 1-1 to 1-5.

In particular, in Examples 6-1 to 6-3 in which the crystal state of the anode active material was crystalline, there was a tendency that as the number of the second oxygen-containing regions was increased, the discharge capacity retention ratio was increased while the initial charge and discharge efficiency was constantly maintained.

Accordingly, it was confirmed that in the secondary battery of the embodiment of the invention, in the case where the anode active material had the first and the second oxygen-containing regions, the cycle characteristics and the initial charge and discharge characteristics were improved as well. It was also confirmed that in this case, in the case where the number of the second oxygen-containing regions was increased, the cycle characteristics were further improved.

Examples 7-1 to 7-16

A procedure was performed in the same manner as that of Example 1-6, except that a metal element was contained in the anode active material, and such containing state was an alloy state. The metal element type was iron (Example 7-1), nickel (Example 7-2), molybdenum (Example 7-3), titanium (Example 7-4), chromium (Example 7-5), cobalt (Example 7-6), copper (Example 7-7), manganese (Example 7-8), zinc (Example 7-9), germanium (Example 7-10), aluminum (Example 7-11), zirconium (Example 7-12), silver (Example 7-13), tin (Example 7-14), antimony (Example 7-15), or tungsten (Example 7-16). Further, the metal element content in the anode active material was 5 atomic %.

The cycle characteristics and the initial charge and discharge characteristics for the secondary batteries of Examples 7-1 to 7-16 were examined. The results shown in Table 9 and Table 10 were obtained.

TABLE 9

Anode active material: silicon (spraying method)
Ten point height of roughness profile Rz: 10 μm
Oxygen content in the anode active material: 5 atomic %

| | Anode active material layer | | | | | | | | | |
|---|---|---|---|---|---|---|---|---|---|---|
| | Crystal state | Half-width (deg) | Crystallite size (nm) | Metal element | State | Flat particle | Noncontact portion | Void | Median size of formation material (μm) | Discharge capacity retention ratio (%) | Initial charge and discharge efficiency (%) |
| Example 1-6 | Crystalline | 1 | 70 | — | Alloy | Present | Not present | Present | 30 | 91.3 | 94 |
| Example 7-1 | | | | Fe | | | | | | 92.3 | 94.3 |
| Example 7-2 | | | | Ni | | | | | | 92.4 | 94.2 |
| Example 7-3 | | | | Mo | | | | | | 92.3 | 94.3 |
| Example 7-4 | | | | Ti | | | | | | 92.1 | 94.2 |
| Example 7-5 | | | | Cr | | | | | | 92.2 | 94.3 |
| Example 7-6 | | | | Co | | | | | | 92.3 | 94.2 |
| Example 7-7 | | | | Cu | | | | | | 92.2 | 94.1 |
| Example 7-8 | | | | Mn | | | | | | 92.1 | 94.1 |

TABLE 10

Anode active material: silicon (spraying method)
Ten point height of roughness profile Rz: 10 μm
Oxygen content in the anode active material: 5 atomic %

| | Anode active material layer | | | | | | | | | |
|---|---|---|---|---|---|---|---|---|---|---|
| | Crystal state | Half-width (deg) | Crystallite size (nm) | Metal element | State | Flat particle | Noncontact portion | Void | Median size of formation material (μm) | Discharge capacity retention ratio (%) | Initial charge and discharge efficiency (%) |
| Example 7-9 | Crystalline | 1 | 70 | Zn | Alloy | Present | Not present | Present | 30 | 92.3 | 94.3 |
| Example 7-10 | | | | Ge | | | | | | 92.1 | 94.2 |
| Example 7-11 | | | | Al | | | | | | 92.2 | 94.3 |
| Example 7-12 | | | | Zr | | | | | | 92.3 | 94.2 |
| Example 7-13 | | | | Ag | | | | | | 92.1 | 94.1 |
| Example 7-14 | | | | Sn | | | | | | 92.2 | 94.1 |
| Example 7-15 | | | | Sb | | | | | | 92.3 | 94.3 |
| Example 7-16 | | | | W | | | | | | 92.2 | 94.1 |

As shown in Table 9 and Table 10, in the case where the metal element was contained in the anode active material to obtain the alloy state, results similar to those of Table 1 were obtained as well. That is, as in Example 1-6, in Examples 7-1 to 7-16 in which the crystal state of the anode active material was crystalline, a higher discharge capacity retention ratio of 90% or more and higher initial charge and discharge efficiency of 90% or more were obtained.

In particular, in Examples 7-1 to 7-16 in which the anode active material contained the metal element, the discharge capacity retention ratio and the initial charge and discharge efficiency were higher than those of Example 1-6 in which the anode active material did not contain the metal element.

Accordingly, it was confirmed that in the secondary battery of the embodiment of the invention, in the case where the metal element was contained in the anode active material to obtain the alloy state, the cycle characteristics and the initial charge and discharge characteristics were improved as well.

Examples 8-1 to 8-16

A procedure was performed in the same manner as that of Example 7-1 to 7-16, except that a metal element was contained in the anode active material, and such containing state was a compound (phase separation) state.

The cycle characteristics and the initial charge and discharge characteristics for the secondary batteries of Examples 8-1 to 8-16 were examined. The results shown in Table 11 and Table 12 were obtained.

TABLE 11

Anode active material: silicon (spraying method)
Ten point height of roughness profile Rz: 10 μm
Oxygen content in the anode active material: 5 atomic %

| | Anode active material layer | | | | | | | | | | |
|---|---|---|---|---|---|---|---|---|---|---|---|
| | Crystal state | Half-width (deg) | Crystallite size (nm) | Metal element | State | Flat particle | Noncontact portion | Void | Median size of formation material (μm) | Discharge capacity retention ratio (%) | Initial charge and discharge efficiency (%) |
| Example 1-6 | Crystalline | 1 | 70 | — | Compound | Present | Not present | Present | 30 | 91.3 | 94 |
| Example 8-1 | | | | Fe | | | | | | 92.2 | 94.3 |
| Example 8-2 | | | | Ni | | | | | | 92.3 | 94.1 |
| Example 8-3 | | | | Mo | | | | | | 92.1 | 94.2 |
| Example 8-4 | | | | Ti | | | | | | 92.4 | 94.2 |
| Example 8-5 | | | | Cr | | | | | | 92.3 | 94.1 |
| Example 8-6 | | | | Co | | | | | | 92.4 | 94.3 |
| Example 8-7 | | | | Cu | | | | | | 92.1 | 94.2 |
| Example 8-8 | | | | Mn | | | | | | 92.3 | 94.1 |

TABLE 12

Anode active material: silicon (spraying method)
Ten point height of roughness profile Rz: 10 μm
Oxygen content in the anode active material: 5 atomic %

| | Anode active material layer | | | | | | | | | | |
|---|---|---|---|---|---|---|---|---|---|---|---|
| | Crystal state | Half-width (deg) | Crystallite size (nm) | Metal element | State | Flat particle | Noncontact portion | Void | Median size of formation material (μm) | Discharge capacity retention ratio (%) | Initial charge and discharge efficiency (%) |
| Example 8-9 | Crystalline | 1 | 70 | Zn | Compound | Present | Not present | Present | 30 | 92.4 | 94.1 |
| Example 8-10 | | | | Ge | | | | | | 92.3 | 94.3 |
| Example 8-11 | | | | Al | | | | | | 92.1 | 94.1 |
| Example 8-12 | | | | Zr | | | | | | 92.2 | 94.1 |
| Example 8-13 | | | | Ag | | | | | | 92.3 | 94.1 |
| Example 8-14 | | | | Sn | | | | | | 92.2 | 94.3 |
| Example 8-15 | | | | Sb | | | | | | 92.1 | 94.2 |
| Example 8-16 | | | | W | | | | | | 92.3 | 94.1 |

As shown in Table 11 and Table 12, in the case where the metal element was contained in the anode active material to obtain the compound state, results similar to those of Table 1 were obtained as well. That is, as in Example 1-6, in Examples 8-1 to 8-16 in which the crystal state of the anode active material was crystalline, a higher discharge capacity retention ratio of 90% or more and higher initial charge and discharge efficiency of 90% or more were obtained.

In particular, in Examples 8-1 to 8-16 in which the anode active material contained the metal element, the discharge capacity retention ratio and the initial charge and discharge efficiency were higher than those of Example 1-6 in which the anode active material did not contain the metal element.

Accordingly, it was confirmed that in the secondary battery of the embodiment of the invention, in the case where the metal element was contained in the anode active material to obtain the compound (phase separation) state, the cycle characteristics and the initial charge and discharge characteristics were improved as well.

Further, as evidenced by the results of Table 9 to Table 12, as long as the metal element was contained in the anode active material, the cycle characteristics and the initial charge and discharge characteristics were improved whether the containing state was the alloy state or the compound state.

Examples 9-1 to 9-13

A procedure was performed in the same manner as that of Example 1-6, except that the median size of the material for forming the anode active material layer 54B was changed to 1 μm (Example 9-1), 3 μm (Example 9-2), 5 μm (Example 9-3), 10 μm (Example 9-4), 15 μm (Example 9-5), 20 μm (Example 9-6), 40 μm (Example 9-7), 50 μm (Example 9-8), 80 μm (Example 9-9), 100 μm (Example 9-10), 150 μm (Example 9-11), 200 μm (Example 9-12), or 300 μm (Example 9-13).

The cycle characteristics and the initial charge and discharge characteristics for the secondary batteries of Examples 9-1 to 9-13 were examined. The results illustrated in Table 13 and FIG. 15 were obtained.

Figure 15:
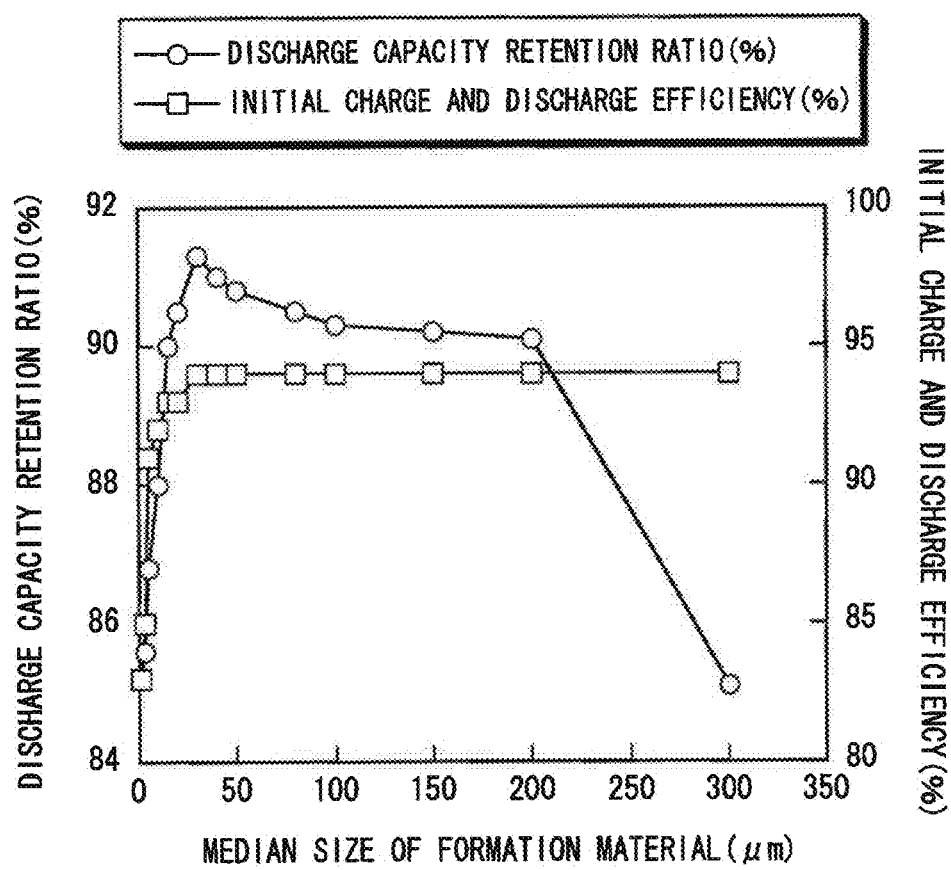
FIG. 15 is a diagram illustrating a relation between a median size of a material for forming an anode active material layer and a discharge capacity retention ratio/initial charge and discharge efficiency.

As illustrated in Table 13 and FIG. 15, in the case where the median size of the material for forming the anode active material layer 54B was changed, results similar to those of Table 1 were obtained as well. That is, as in Example 1-6, in Examples 9-1 to 9-13 in which the crystal state of the anode active material was crystalline, a higher discharge capacity retention ratio of 80% or more and higher initial charge and discharge efficiency of 80% or more were obtained.

In particular, in Examples 1-6 and 9-1 to 9-13 in which the crystal state of the anode active material was crystalline, there was a tendency that as the median size was increased, the discharge capacity retention ratio was increased and then decreased, and the initial charge and discharge efficiency was increased. In this case, in the case where the median size was in the range from 5 μm to 200 μm, both inclusive, a higher discharge capacity retention ratio of 90% or more and higher initial charge and discharge efficiency of 90% or more were obtained.

Accordingly, it was confirmed that in the secondary battery of the embodiment of the invention, it was confirmed that in the case where the median size of the material for forming the anode active material layer 54B was changed, the cycle characteristics and the initial charge and discharge characteristics were improved as well. It was also confirmed that in this case, in the case where the median size was in the range from 5 μm to 200 μm, both inclusive, the cycle characteristics were further improved.

Examples 10-1 to 10-12

A procedure was performed in the same manner as that of Example 1-6, except that the ten point height of roughness profile Rz of the anode current collector 54A was changed to 0.5 μm (Example 10-1), 1 μm (Example 10-2), 1.5 μm (Example 10-3), 2 μm (Example 10-4), 3 μm (Example 10-5), 5 μm (Example 10-6), 15 μm (Example 10-7), 20 μm (Example 10-8), 25 μm (Example 10-9), 30 μm (Example 10-10), 35 μm (Example 10-11), or 40 μm (Example 10-12).

The cycle characteristics and the initial charge and discharge characteristics for the secondary batteries of Examples 10-1 to 10-12 were examined. The results illustrated in Table 14 and FIG. 16 were obtained.

TABLE 13

Anode active material: silicon (spraying method)
Ten point height of roughness profile Rz: 10 μm
Oxygen content in the anode active material: 5 atomic %

| | | | Anode active material layer | | | | | | |
|---|---|---|---|---|---|---|---|---|---|
| | Crystal state | Half-width (deg) | Crystallite size (nm) | Flat particle | Noncontact portion | Void | Median size of formation material (μm) | Discharge capacity retention ratio (%) | Initial charge and discharge efficiency (%) |
| Example 9-1 | Crystalline | 1 | 70 | Present | Not present | Present | 1 | 85.2 | 83 |
| Example 9-2 | | | | | | | 3 | 85.6 | 85 |
| Example 9-3 | | | | | | | 5 | 86.8 | 91 |
| Example 9-4 | | | | | | | 10 | 88 | 92 |
| Example 9-5 | | | | | | | 15 | 90 | 93 |
| Example 9-6 | | | | | | | 20 | 90.5 | 93 |
| Example 1-6 | | | | | | | 30 | 91.3 | 94 |
| Example 9-7 | | | | | | | 40 | 91 | 94 |
| Example 9-8 | | | | | | | 50 | 90.8 | 94 |
| Example 9-9 | | | | | | | 80 | 90.5 | 94 |
| Example 9-10 | | | | | | | 100 | 90.3 | 94 |
| Example 9-11 | | | | | | | 150 | 90.2 | 94 |
| Example 9-12 | | | | | | | 200 | 90.1 | 94 |
| Example 9-13 | | | | | | | 300 | 85.1 | 94 |

TABLE 14

Anode active material: silicon (spraying method)
Oxygen content in the anode active material: 5 atomic %

| | Anode current collector | Anode active material layer | | | | | | | |
|---|---|---|---|---|---|---|---|---|---|
| | Ten point height of roughness profile Rz (μm) | Crystal state | Half-width (deg) | Crystallite size (nm) | Flat particle | Noncontact portion | Void | Median size of formation material (μm) | Discharge capacity retention ratio (%) | Initial charge and discharge efficiency (%) |
| Example 10-1 | 0.5 | Crystalline | 1 | 70 | Present | Not present | Present | 30 | 80 | 80 |
| Example 10-2 | 1 | | | | | | | | 83 | 83 |
| Example 10-3 | 1.5 | | | | | | | | 85 | 85 |
| Example 10-4 | 2 | | | | | | | | 88 | 88 |
| Example 10-5 | 3 | | | | | | | | 90 | 90 |
| Example 10-6 | 5 | | | | | | | | 91 | 92 |
| Example 1-6 | 10 | | | | | | | | 91.3 | 94 |
| Example 10-7 | 15 | | | | | | | | 91 | 94 |
| Example 10-8 | 20 | | | | | | | | 91 | 94 |
| Example 10-9 | 25 | | | | | | | | 90.5 | 94 |
| Example 10-10 | 30 | | | | | | | | 90.1 | 94 |
| Example 10-11 | 35 | | | | | | | | 87 | 94 |
| Example 10-12 | 40 | | | | | | | | 86 | 94 |

Figure 16:
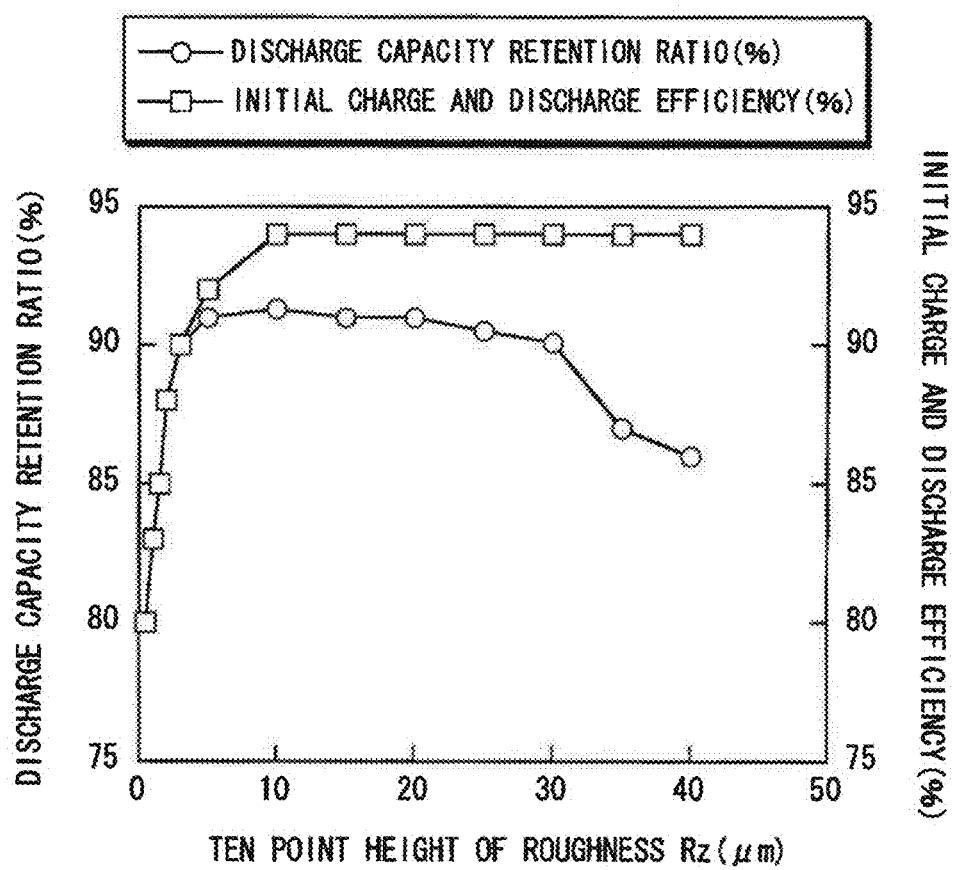
FIG. 16 is a diagram illustrating a relation between ten point height of roughness profile Rz and a discharge capacity retention ratio/initial charge and discharge efficiency.

As illustrated in Table 14 and FIG. 16, in the case where the ten point height of roughness profile Rz of the anode current collector 54A was changed, results similar to those of Table 1 were obtained as well. That is, as in Example 1-6, in Examples 10-1 to 10-12 in which the crystal state of the anode active material was crystalline, a higher discharge capacity retention ratio of 80% or more and higher initial charge and discharge efficiency of 80% or more were obtained.

In particular, in Examples 1-6 and 10-1 to 10-12 in which the crystal state of the anode active material was crystalline, there was a tendency that as the ten point height of roughness profile Rz was increased, the discharge capacity retention ratio was increased and then decreased, and the initial charge and discharge efficiency was increased. In this case, in the case where the ten point height of roughness profile Rz was 1.5 μm or more, the discharge capacity retention ratio and the initial charge and discharge efficiency were higher. In the case where the ten point height of roughness profile Rz was in the range from 3 μm to 30 μm, both inclusive, a higher discharge capacity retention ratio of 90% or more and higher initial charge and discharge efficiency of 90% or more were obtained.

Accordingly, it was confirmed that in the secondary battery of the embodiment of the invention, in the case where the ten point height of roughness profile Rz of the anode current collector 54A was changed, the cycle characteristics and the initial charge and discharge characteristics were improved as well. It was also confirmed that in this case, in the case where the ten point height of roughness profile Rz was 1.5 μm or more, or preferably in the range from 3 μm to 30 μm, both inclusive, both characteristics were further improved.

Example 11-1

A procedure was performed in the same manner as that of Example 1-6, except that as a solvent, 4-fluoro-1,3-dioxolane-2-one (FEC) as a cyclic ester carbonate having halogen represented by Chemical formula 2 was used instead of EC.

Example 11-2

A procedure was performed in the same manner as that of Example 1-6, except that as a solvent, 4,5-difluoro-1,3-dioxolane-2-one (DFEC) as a cyclic ester carbonate having halogen represented by Chemical formula 2 was added. The composition of the solvent (EC:DFEC:DEC) was 25:5:70 at a weight ratio.

Examples 11-3 and 11-4

A procedure was performed in the same manner as that of Example 11-1, except that as a solvent, vinylene carbonate (VC: Example 11-3) as a cyclic ester carbonate having an unsaturated bond represented by Chemical formula 5 or vinylethylene carbonate (VEC: Example 11-4) as a cyclic ester carbonate having an unsaturated bond represented by Chemical formula 6 was added. The content of VC or the like in the solvent was 1 wt %.

Example 11-5

A procedure was performed in the same manner as that of Example 11-1, except that lithium tetrafluoroborate (LiBF$_4$) was added as an electrolyte salt. The content of lithium hexafluorophosphate to the solvent was 0.9 mol/kg, and the content of lithium tetrafluoroborate to the solvent was 0.1 mol/kg.

Example 11-6

A procedure was performed in the same manner as that of Example 11-1, except that 1,3-propene sultone (PRS) as sultone was added as a solvent. The content of PRS in the solvent was 1 wt %.

Examples 11-7 and 11-8

A procedure was performed in the same manner as that of Example 11-1, except that sulfobenzoic anhydride (SBAH:

Example 11-7) as an acid anhydride or sulfopropionic anhydride (SPAH: Example 11-8) was added as a solvent. The content of SBAH or the like in the solvent was 1 wt %.

The cycle characteristics, the initial charge and discharge characteristics, and the swollenness characteristics for the secondary batteries of Examples 11-1 to 11-8 were examined. The results shown in Table 15 and Table 16 were obtained.

discharge capacity retention ratio was higher while the initial charge and discharge efficiency was constant compared to in Example 1-6 in which the foregoing solvent or the foregoing electrolyte salt was not added. In the case where the cyclic ester carbonate having halogen was used, the discharge capacity in the case of using DFEC was higher than that in the case of using FEC.

TABLE 15

Anode active material: silicon (spraying method)
Ten point height of roughness profile Rz: 10 μm
Oxygen content in the anode active material: 5 atomic %

| | Anode active material layer | | | | | |
|---|---|---|---|---|---|---|
| | Crystal state | Half-width (deg) | Crystallite size (nm) | Flat particle | Noncontact portion | Void | Median size of formation material (μm) |
| Example 1-6<br>Example 11-1<br>Example 11-2<br>Example 11-3<br>Example 11-4<br>Example 11-5<br>Example 11-6<br>Example 11-7<br>Example 11-8 | Crystalline | 1 | 70 | Present | Not present | Present | 30 |

TABLE 16

Anode active material: silicon (spraying method)
Ten point height of roughness profile Rz: 10 μm
Oxygen content in the anode active material: 5 atomic %

| | Electrolytic solution | | | | | | Discharge capacity retention (%) | Initial charge and discharge efficiency (%) | Swollenness ratio (%) |
|---|---|---|---|---|---|---|---|---|---|
| | Solvent (wt %) | | | | Electrolyte salt (mol/kg) | Others | | | |
| | EC | FEC | DFEC | DEC | | | | | |
| Example 1-6 | 50 | — | — | 50 | LiPF$_6$: 1 | — | 91.3 | 94 | 3.02 |
| Example 11-1 | — | 50 | — | 50 | | — | 92.5 | 94 | — |
| Example 11-2 | 25 | — | 5 | 70 | | — | 92.6 | 94 | — |
| Example 11-3 | — | 50 | — | 50 | | VC | 92.7 | 94 | — |
| Example 11-4 | | | | | | VEC | 93 | 94 | — |
| Example 11-5 | | | | | LiPF$_6$: 0.9 | LiBF$_4$: 0.1 | — | 92.8 | 94 | — |
| Example 11-6 | | | | | LiPF$_6$: 1 | PRS | 93 | 94 | 0.36 |
| Example 11-7 | | | | | | SBAH | 92.6 | 94 | — |
| Example 11-8 | | | | | | SBAH | 92.2 | 94 | — |

As shown in Table 15 and Table 16, in the case where the solvent composition or the electrolyte salt type were changed, results similar to those of Table 1 were obtained as well. That is, as in Example 1-6, in Examples 11-1 to 11-8 in which the crystal state of the anode active material was crystalline, a higher discharge capacity retention ratio of 90% or more and higher initial charge and discharge efficiency of 90% or more were obtained.

In particular, in Examples 11-1 to 11-8 in which as a solvent, the cyclic ester carbonate having halogen (FEC or DFEC), the cyclic ester carbonate having an unsaturated bond, sultone, or an acid anhydride was added, or as an electrolyte salt, lithium tetrafluoroborate was added, the Further, in Example 11-6 in which PRS was added, the swollenness ratio was significantly smaller than that of Example 1-6 in which PRS was not added.

Only the results in the case where the cyclic ester carbonate having halogen represented by Chemical formula 2 or the cyclic ester carbonate having an unsaturated bond represented by Chemical formula 5 and Chemical formula 6 are herein shown, but no results in the case where the chain ester carbonate having halogen represented by Chemical formula 1 or the cyclic ester carbonate having an unsaturated bond represented by Chemical formula 7 was used are herein shown. However, the chain ester carbonate having halogen or the like fulfils a function to increase the discharge capacity retention ratio as the cyclic ester carbonate having halogen or the like does. Thus, it is evident that in the case where the former is used, effect similar to that in the case where the latter is used is obtained as well.

Further, only the results in the case where lithium hexafluorophosphate or lithium tetrafluoroborate was used as an electrolyte salt are herein shown, but no results in the case where lithium perchlorate, lithium hexafluoroarsenate, or the compound represented by Chemical formula 8 to Chemical formula 10 or Chemical formula 14 to Chemical formula 16 is used are herein shown. However, lithium perchlorate or the like fulfils a function to increase the discharge capacity retention ratio as lithium hexafluorophosphate or the like does. Thus, it is evident that in the case where the former is used, effect similar to that in the case where the latter is used is obtained as well.

Accordingly, it was confirmed that in the secondary battery of the embodiment of the invention, in the case where the solvent composition or the electrolyte salt type was changed, the cycle characteristics and the initial charge and discharge characteristics were improved as well. It was also confirmed that in this case, in the case where at least one of the chain ester carbonate having halogen represented by Chemical formula 1 and the cyclic ester carbonate having halogen represented by Chemical formula 2; the cyclic ester carbonate having an unsaturated bond represented by Chemical formula 5 to Chemical formula 7; sultone; or an acid anhydride was used as a solvent, the cycle characteristics were further improved. Further, it was also confirmed that in the case where at least one of lithium hexafluorophosphate, lithium tetrafluoroborate, lithium perchlorate, and lithium hexafluoroarsenate; the compound represented by Chemical formula 8 to Chemical formula 10; or the compound represented by Chemical formula 14 to Chemical formula 16 was used as an electrolyte salt, the cycle characteristics were further improved. It was confirmed that in particular, in the case where sultone was used, the swollenness characteristics were also improved.

Example 12-1

A procedure was performed in the same manner as that of Example 1-6, except that the square secondary battery illustrated in FIG. 5 and FIG. 6 was manufactured by the following procedure instead of the laminated film secondary battery.

First, after the cathode 21 and the anode 22 were formed, the cathode lead 24 made of aluminum and the anode lead 25 made of nickel were respectively welded to the cathode current collector 21A and the anode current collector 22A. Subsequently, the cathode 21, the separator 23, and the anode 22 were layered in this order, spirally wound in the longitudinal direction, and then formed into a flat shape and thereby the battery element 20 was formed. Subsequently, after the battery element 20 was contained in the battery can 11 made of aluminum, the insulating plate 12 was arranged on the battery element 20. Subsequently, after the cathode lead 24 and the anode lead 25 were respectively welded to the cathode pin 15 and the battery can 11, the battery cover 13 was fixed on the open end of the battery can 11 by laser welding. Finally, the electrolytic solution was injected into the battery can 11 from the injection hole 19, the injection hole 19 was sealed by the sealing member 19A. The square battery was thereby completed.

Example 12-2

A procedure was performed in the same manner as that of Example 12-1, except that the battery can 11 made of iron was used instead of the battery can 11 made of aluminum.

The cycle characteristics and the initial charge and discharge characteristics for the secondary batteries of Examples 12-1 and 12-2 were examined. The results shown in Table 17 were obtained.

TABLE 17

Anode active material: silicon (spraying method)
Ten point height of roughness profile Rz: 10 μm
Oxygen content in the anode active material: 5 atomic %

| | Anode active material layer | | | | | | | | |
|---|---|---|---|---|---|---|---|---|---|
| | Battery structure | Crystal state | Half-width (deg) | Crystallite size (nm) | Flat particle | Noncontact portion | Void | Median size of formation material (μm) | Discharge capacity retention ratio (%) | Initial charge and discharge efficiency (%) |
| Example 1-6 | Laminated film | Crystalline | 1 | 70 | Present | Not present | Present | 30 | 91.3 | 94 |
| Example 12-1 | Square (aluminum) | | | | | | | | 92.5 | 94 |
| Example 12-2 | Square (iron) | | | | | | | | 92.9 | 94 |

As shown in Table 17, in the case where the battery structure was changed, results similar to those of Table 1 were obtained as well. That is, in Examples 12-1 and 12-2 in which the crystal state of the anode active material was crystalline, as in Example 1-6, a higher discharge capacity retention ratio of 90% or more and higher initial charge and discharge efficiency of 90% or more were obtained.

In particular, in Examples 12-1 and 12-2 in which the battery structure was square type, compared to in Example 1-6 in which the battery structure was laminated film type, the discharge capacity retention ratio was higher while the initial charge and discharge efficiency was constant. Further, in the square type, in the case where the battery can 11 was made of iron, the discharge capacity retention ratio was higher and the swollenness ratio was smaller than those of the case where the battery can 11 was made of aluminum.

Though a description has not been given with a specific example, in the case where the package member was the square type made of the metal material, the cycle characteristics and the swollenness characteristics were improved more than in the case where the package member was the laminated film type made of the film. Therefore, it is evident that a similar result is obtained for a cylindrical secondary battery in which the package member is made of a metal material.

Accordingly, it was confirmed that in the secondary battery of the embodiment of the invention, in the case where the battery structure was changed, the cycle characteristics and the initial charge and discharge characteristics were improved as well. It was also confirmed that in this case, in the case where the battery structure was the square type or the cylindrical type, the cycle characteristics were further improved.

From the results of Table 1 to Table 17 and FIG. 11 to FIG. 16, it was confirmed that in the embodiment of the secondary battery of the invention, in the case where the anode active material layer contained the crystalline anode active material having silicon as an element and the anode active material layer is linked to the anode current collector, the cycle characteristics and the initial charge and discharge efficiency were improved independently of the solvent composition, the electrolyte salt type, the battery structure or the like.

The invention has been described with reference to the embodiment and the examples. However, the invention is not limited to the aspects described in the foregoing embodiment and the foregoing examples, and various modifications may be made. For example, use application of the anode of the invention is not limited to the secondary battery, but may be an electrochemical device other than the secondary battery. As other use application, for example, a capacitor and the like are included.

Further, in the foregoing embodiment and the foregoing examples, the description has been given of the lithium ion secondary battery in which the anode capacity is expressed based on insertion and extraction of lithium as a secondary battery type. However, the secondary battery of the invention is not limited thereto. The invention is similarly applicable to a secondary battery in which the anode capacity includes the capacity associated with insertion and extraction of lithium and the capacity associated with precipitation and dissolution of lithium, and the anode capacity is expressed by the sum of these capacities. In this secondary battery, a material capable of inserting and extracting lithium is used as an anode active material, and the chargeable capacity in the anode material capable of inserting and extracting lithium is set to a smaller value than the discharge capacity of the cathode.

Further, in the foregoing embodiment and the foregoing examples, the description has been given with the specific examples of the case in which the battery structure is the square type, the cylindrical type, or the laminated film type, and with the specific example in which the battery element has the spirally wound structure. However, the secondary battery of the invention is similarly applicable to a battery having other battery structure such as a coin type battery and a button type battery or a battery in which the battery element has other structure such as a lamination structure.

Further, in the foregoing embodiment and the foregoing examples, the description has been given of the case using lithium as an electrode reactant. However, as an electrode reactant, other Group 1 element such as sodium (Na) and potassium (K), a Group 2 element such as magnesium (Mg) and calcium (Ca), or other light metal such as aluminum may be used. In this case, the anode material described in the foregoing embodiment is able to be used as an anode active material as well.

Further, in the foregoing embodiment and the foregoing examples, for the anode and the secondary battery of the invention, the description has been given of the appropriate range derived from the results of the examples for the half-width (2θ) of the diffraction peak in the (111) crystal plane of the anode active material obtained by X-ray diffraction. However, the description does not totally deny a possibility that the half-width is out of the foregoing range. That is, the foregoing appropriate range is the range particularly preferable for obtaining the effects of the invention. Therefore, as long as effect of the invention is obtained, the half-width may be out of the foregoing range in some degrees. The same is applied to the crystallite size originated in the (111) crystal plane of the anode active material obtained by X-ray diffraction, the oxygen content in the anode active material, the ten point height of roughness profile Rz of the surface of the anode current collector, the median size of the material for forming the anode active material and the like.

In addition to the foregoing, examples of two specific methods for forming the anodes are now described. These two methods are referred to herein as the Aerosol Deposition method (AD method) and the Powder Jet Deposition method (PJD method). Examples 201-208 described in Table 18, below were prepared using these methods as noted in Table 18.

AD Method

In the AD method, used for examples 201-203 and 207, aerosol comprising active materials particles was germinated. Thereafter, the aerosol was ejected from a nozzle toward a current collector at relatively high speed, on the order of several hundred meters per second. The active material particles carried by the aerosol impacted the current collector with a kinetic energy obtained by the acceleration of the particles in the aerosol. The current collector became densely coated by the active material due the high kinetic energy of the particles. Additionally, the active material broke into fine particles during the collision or impact of the particles. The thus broken down active material deposited on the current collector due to a binding that takes place among the broken down particles.

For example 207 only, following this, a metal layer was plated onto the exposed active material coating surface by electroless plating. The metal layer was plated to a thickness on the order of one-tenth of the diameter of the active material particles.

PJD Method

In the PJD method, used in connection with examples 204-206 and 208, the active material was ejected from a nozzle with a gas such as air, He, $N_2$, Ar or $O_2$ toward a current collector at relatively high speed, on the order of several dozen meters per second. The active material particles obtained kinetic energy due to the their acceleration in the ejected gas, and the particles hit the current collector with a relatively high kinetic energy.

As a result of the high kinetic energy impacting of the active material particles on the current collector, the current collector became coated relatively densely.

For example 208 only, thereafter, the exposed active material coating surface was plated with a metal layer by means of electroless plating. The metal layer was plated to a thickness on the order of one-tenth of the diameter of the active material particles.

As can be seen in Table 18, Examples 201-208 were formed using either the AD or PJD method as described above, with examples 207 and 208 also being plated with a metal layer as described above. In all other respects, the experimental conditions described in connection with example 1-1, described above.

As can be seen for examples 201-206, the anodes have relevant characteristics that are somewhat poorer or lower than those made by the flame gunning method, but in any event are still very favorable. It is surmised that this may be due to the direct connection of the active material to the current collector and the high crystallinity of the active material.

Examples 207-208 show that the plated metal layer increases the discharge capacity retention ratio and the initial charge and discharge efficiencey.

TABLE 18

|  | Discharge capacity retention ratio (%) | Initial charge and discharge efficiency (%) | Anode Active Material Deposition method | Median Particle Size (μm) | Rz (μm) | Flat particle | Oxygen content in the anode active material (%) | Crystal state | Half-width (deg.) | Crystallite size (nm) |
|---|---|---|---|---|---|---|---|---|---|---|
| Example 201 | 82.2 | 83 | AD method | 3 | 0.5 | Not present | 2 | Crystalline | 20 | 10 |
| Example 202 | 85.5 | 88 | AD method | 3 | 0.5 | Not present | 2 | Crystalline | 5 | 20 |
| Example 203 | 89.6 | 90 | AD method | 3 | 0.5 | Not present | 2 | Crystalline | 1 | 70 |
| Example 204 | 82 | 82.5 | PJD method | 3 | 0.5 | Not present | 2 | Crystalline | 20 | 10 |
| Example 205 | 85.5 | 87.5 | PJD method | 3 | 0.5 | Not present | 2 | Crystalline | 5 | 20 |
| Example 206 | 89 | 90 | PJD method | 3 | 0.5 | Not present | 2 | Crystalline | 1 | 70 |
| Example 207 | 90.5 | 91.3 | AD method | 3 | 0.5 | Not present | 2 | Crystalline | 1 | 70 |
| Example 208 | 90 | 91 | PJD method | 3 | 0.5 | Not present | 2 | Crystalline | 1 | 70 |

It should be understood by those skilled in the art that various modifications, combinations, sub-combinations and alternations may occur depending on design requirements and other factors insofar as they are within the scope of the appended claims or the equivalents thereof.

What is claimed is:

1. A method of forming an anode, comprising:
   providing anode active material containing silicon in a melted state, the anode active material having particles with a median size of 5 μm to 200 μm, both inclusive; and
   depositing the anode active material on a surface of an anode current collector using a spraying method to form an anode active material layer on the surface of the anode current collector with particulate crystalline anode active material, with at least a region of the anode active material layer being directly linked to the anode current collector and with no region of the anode active material layer being indirectly linked to the anode current collector with another material,
   wherein,
   a half-width (2θ) of a diffraction peak in a (111) crystal plane of the anode active material obtained by X-ray diffraction is 0.6 degrees to 20 degrees, and
   a crystallite size originated in the (111) crystal plane of the crystalline anode active material obtained by X-ray diffraction is from 10 nm to 150 nm.

2. The method of claim 1, comprising roughening the surface of the anode current collector to have a ten point height of roughness profile Rz of 3 μm to 40 μm.

3. The method of claim 1, wherein the anode active material is sprayed onto the anode current collector such that at least part of the anode active material layer and at least part of the surface of the anode current collector are alloyed together.

4. The method of claim 1, wherein the anode active material layer has oxygen as an element and the oxygen content in the anode active material layer is in the range from 1.5 atomic % to 40 atomic %, both inclusive.

5. The method of claim 1, wherein the anode active material includes a metal element selected from the group consisting of iron (Fe), nickel (Ni), molybdenum (Mo), titanium (Ti), chromium (Cr), cobalt (Co), copper (Cu), manganese (Mn), zinc (Zn), germanium (Ge), aluminum (Al), zirconium (Zr), silver (Ag), tin (Sn), antimony (Sb), and tungsten (W).

6. The method of claim 1, wherein the anode active material is sprayed such that at least a portion of the anode active material layer has a flat shape with a plurality of the crystalline anode active material particles each having a long axis in a direction along the surface of the anode current collector which is greater than a short axis in a direction crossing the surface, the plurality of crystalline anode active material particles overlapping on each other in the direction along the surface of the anode current collector and contacting each other thereby imparting the flat shape.

7. A method of forming a battery, comprising:
   forming an anode as set forth in claim 1;
   providing a cathode;
   providing an electrolytic solution; and
   assembling the anode, cathode, and electrolytic solution in a container.

8. The method of claim 7, wherein the cathode, the anode, and the electrolytic solution are contained in a cylindrical or square package member.

9. The method of claim 8, wherein the package member contains iron or an iron alloy.

10. The method of claim 7, wherein the electrolytic solution contains a solvent comprising:
   (a) a chain ester carbonate having halogen as an element represented by Chemical formula 1,
   (b) a cyclic ester carbonate having halogen as an element represented by Chemical formula 2,
   (c) a cyclic ester carbonate having an unsaturated bond represented by any of Chemical formula 3 to Chemical formula 5,
   (d) a sultone, and
   (e) an acid anhydride, wherein, Chemical formulae 1 to 5 are:

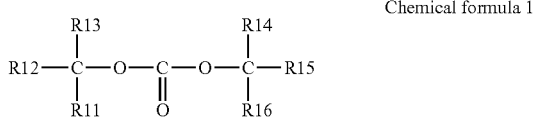

Chemical formula 1 where R11 to R16 each represent a hydrogen group, a halogen group, an alkyl group, or an alkyl halide group, and at least one of R11 to R16 is the halogen group or the alkyl halide group;

Chemical formula 2

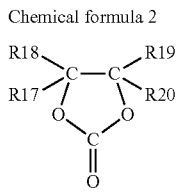

where R17 to R20 each represent a hydrogen group, a halogen group, an alkyl group, or an alkyl halide group, and at least one of R17 to R20 is the halogen group or the alkyl halide group;

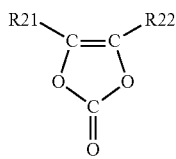

Chemical formula 3 where R21 and R22 each represent a hydrogen group or an alkyl group;

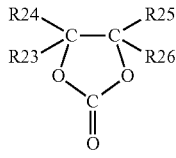

Chemical formula 4 where R23 to R26 each represent a hydrogen group, an alkyl group, a vinyl group, or an aryl group, and at least one of R23 to R26 is the vinyl group or the aryl group; and Chemical formula 5

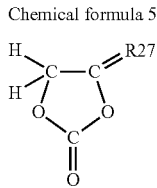

where R27 is an alkylene group.

11. The method of claim 10, wherein:
the chain ester carbonate having halogen as an element represented by the Chemical formula 1 is fluoromethyl methyl carbonate, bis(fluoromethyl) carbonate, or difluoromethyl methyl carbonate,
the cyclic ester carbonate having halogen as an element represented by the Chemical formula 2 is 4-fluoro-1,3-dioxolane-2-one or 4,5-difluoro-1,3-dioxolane-2-one,
the cyclic ester carbonate having an unsaturated bond represented by the Chemical formula 3 is vinylene carbonate,
the cyclic ester carbonate having an unsaturated bond represented by the Chemical formula 4 is vinylethylene carbonate, and
the cyclic ester carbonate having an unsaturated bond represented by the Chemical formula 5 is methylene ethylene carbonate.

12. The method of claim 7, wherein the electrolytic solution contains an electrolyte salt containing at least one selected from the group consisting of lithium hexafluorophosphate ($LiPF_6$), lithium tetrafluoroborate ($LiBF_4$), lithium perchlorate ($LiClO_4$), lithium hexafluoroarsenate ($LiAsF_6$), the compounds represented by any of Chemical formulae 6-8 and the compounds represented by any of the Chemical formulae 9-11, Chemical formulae 6-11 being:

Chemical formula 6

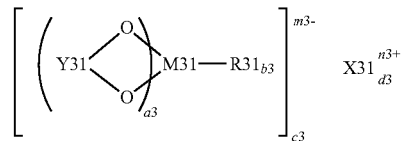

where,
X31 represents a Group 1 element or a Group 2 element in the long period periodic table or aluminum (Al),
M31 represents a transition metal element, a Group 13 element, a Group 14 element, or a Group 15 element in the long period periodic table,
R31 represents a halogen group, Y31 is —(O=)C—R32—C(=O)—, —(O=)C—C(R33)$_2$—, or —(O=)C—C(=O)—,
R32 represents an alkylene group, an alkylene halide group, an arylene group, or an arylene halide group,
R33 represents an alkyl group, an alkyl halide group, an aryl group, or an aryl halide group,
a3 is one of integer numbers 1 to 4, b3 is 0, 2, or 4, and c3, d3, m3, and n3 are one of integer numbers 1 to 3, Chemical formula 7

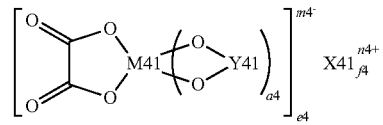

where,
X41 represents a Group 1 element or a Group 2 element in the long period periodic table,
M41 represents a transition metal element, a Group 13 element, a Group 14 element, or a Group 15 element in the long period periodic table,
Y41 represents a —(O=)C—(C(R41)$_2$)$_{b4}$—C(=O)—, —(R43)$_2$C—(C(R42)$_2$)$_{c4}$—C(=O)—, —(R43)$_2$C—(C(R42)$_2$)$_{c4}$—C(R43)$_2$—,
—(R43)$_2$C—(C(R42)$_2$)$_{c4}$—S(=O)$_2$—,
—(O=)$_2$S—(C(R42)$_2$)$_{d4}$—S,(=O)$_2$—, or —(O=)C—(C(R42)$_2$)$_{d4}$—S(=O)$_2$—, R41 and R43 each represent a hydrogen group, an alkyl group, a halogen group, or an alkyl halide group, at least one of R41 and R43 is respectively the halogen group or the alkyl halide group, R42 is a hydrogen group, an alkyl group, a halogen group, or an alkyl halide group, a4, e4, and n4 are 1 or 2, b4 and d4 are one of integer numbers 1 to 4, c4 is one of integer numbers 0 to 4, and f4 and m4 are one of integer numbers 1 to 3, Chemical formula 8

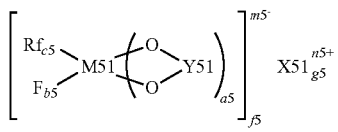

where,

X51 represents a Group 1 element or a Group 2 element in the long period periodic table, M51 represents a transition metal element, a Group 13 element, a Group 14 element, or a Group 15 element in the long period periodic table, Rf represents a fluorinated alkyl group with the carbon number in the range from 1 to 10, both inclusive, or a fluorinated aryl group with the carbon number in the range from 6 to 10, both inclusive, Y51 is —(O=)C—(C(R51)$_2$)$_{d5}$—C(=O)—, —(R52)$_2$C—(C(R51)$_2$)$_{d5}$—C(=O)—, —(R52)$_2$C—(C(R51)$_2$)$_{d5}$—C(R52)$_2$—, —(R52)$_2$C—(C(R51)$_2$)$_{d5}$—S—(=O)$_2$—, —(O=)$_2$S—(C(R51)$_2$)$_{e5}$—S(=O)$_2$—, or —(O=)C—(C(R51)$_2$)$_{e5}$—S(=O)$_2$—, R51 represents a hydrogen group, an alkyl group, a halogen group, or an alkyl halide group, R52 is a hydrogen group, an alkyl group, a halogen group, or an alkyl halide group, and at least one thereof is the halogen group or the alkyl halide group, a5, f5, and n5 are 1 or 2, b5, c5, and e5 are one of integer numbers 1 to 4, d5 is one of integer numbers 0 to 4, and g5 and m5 are one of integer numbers 1 to 3, LiN(C$_m$F$_{2m+1}$SO$_2$)(C$_n$F$_{2n+1}$SO$_2$)  Chemical formula 9 where, m and n are an integer number of 1 or more,

Chemical formula 10

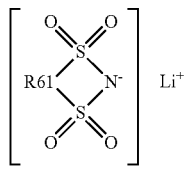

where,

R61 represents a straight chain or branched perfluoro alkylene group with the carbon number in the range from 2 to 4, both inclusive, and LiC(C$_p$F$_{2p+1}$SO$_2$)(C$_q$F$_{2q+1}$SO$_2$)(C$_r$F$_{2r+1}$SO$_2$)  Chemical formula 11 where, p, q, and r are an integer number of 1 or more.

13. The method of claim 12, wherein:

the compound represented by the Chemical formula 6 is a compound represented by Chemical formulas 12(1) to 12(6), the compound represented by the Chemical formula 7 is a compound represented by Chemical formulas 13(1) to 13(8), and the compound represented by the Chemical formula 8 is a compound represented by Chemical formula 14, where chemical formulae 12(1) to 12(6), 13(1) to 13(8), and 14 are:

Chemical formulae 12(1)-12(6)

(1)

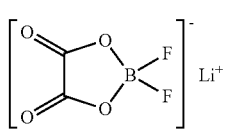

(2)

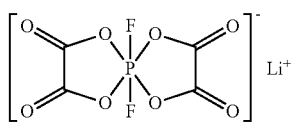

(3)

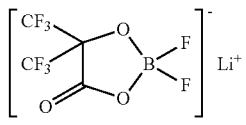

(4)

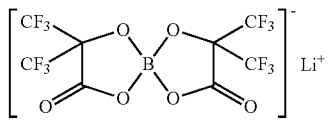

(5)

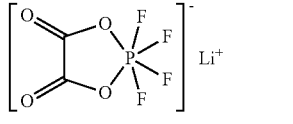

(6)

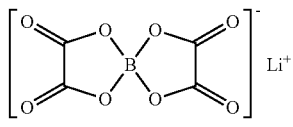

Chemical formulae 13(1)-13(8)

(1)

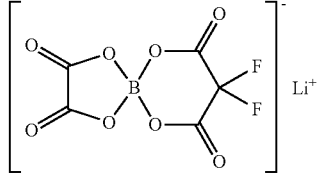

(2)

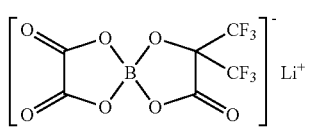

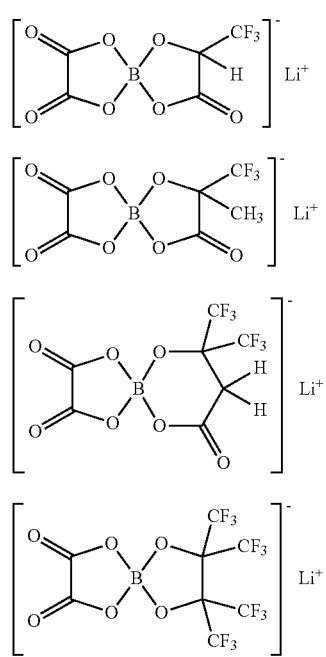
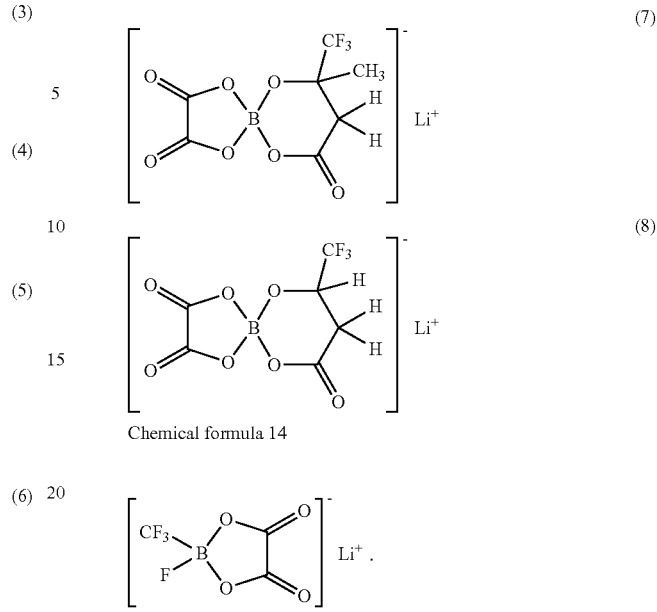
Chemical formula 14